United States Patent
Jang et al.

(10) Patent No.: US 7,206,045 B2
(45) Date of Patent: *Apr. 17, 2007

(54) REFLECTION TYPE LIQUID CRYSTAL DISPLAY AND A METHOD FOR MANUFACTURING THE SAME

(75) Inventors: Yong-Kyu Jang, Suwon-si (KR); Kee-Han Uh, Yongin-ci (KR); Jae-Hyun Kim, Kwangyeok-si (KR); Bang-Sil Choi, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/928,210

(22) Filed: Aug. 30, 2004

(65) Prior Publication Data
US 2005/0018112 A1    Jan. 27, 2005

Related U.S. Application Data

(62) Division of application No. 09/985,031, filed on Nov. 1, 2001, now Pat. No. 6,801,279.

(30) Foreign Application Priority Data
Nov. 11, 2000  (KR)  ............................... 2000-66972
Feb. 7, 2001   (KR)  ............................... 2001-5966

(51) Int. Cl.
 G02F 1/1335  (2006.01)
 G02F 1/1333  (2006.01)
(52) U.S. Cl. ..................................... 349/113; 349/138
(58) Field of Classification Search ........ 349/138–139, 349/113
See application file for complete search history.

(56) References Cited

U.S. PATENT DOCUMENTS 5,949,507 A * 9/1999 Shimada et al. ............ 349/113

(Continued)

FOREIGN PATENT DOCUMENTS

JP   2000-122094   4/2000

(Continued)

OTHER PUBLICATIONS

English Abstract for Publication No.: 2000-122094.
English Abstract for Publication No.: 1020000031460 A.
English Abstract for Publication No.: 1020000059471 A.

*Primary Examiner*—Dung T. Nguyen
(74) *Attorney, Agent, or Firm*—F. Chau & Associates, LLC

(57) ABSTRACT

Disclosed is a reflection type liquid crystal display (LCD) and a manufacturing method thereof. A first substrate on which a pixel array is formed is prepared. A second substrate is formed facing the first substrate. A liquid crystal layer is formed between the first and second substrates. A reflective electrode is formed on the first substrate. The reflective electrode includes a plurality of first regions and a plurality of second regions having a height difference relative to the first regions, in which a first total sum in length components of the second regions arranged along a direction perpendicular to a first direction is greater than a second total sum in length components of the second regions arranged along a direction perpendicular to a second direction such that the second regions have higher reflectivity in the first direction relative to the second direction. A reflective electrode of oriented micro lenses defined by the first grooves and the second grooves is provided to enhance a reflection efficiency. The contrast and image quality are improved remarkably. The micro lenses are suitable for electronic displays that need a high reflectivity towards a specific direction. Since the reflective electrodes may be formed by an improved exposure and development process, the manufacturing cost and time would be reduced.

15 Claims, 44 Drawing Sheets

U.S. PATENT DOCUMENTS

| | | | |
|---|---|---|---|
| 6,384,885 B1 | 5/2002 | Kim et al. | 349/113 |
| 6,441,873 B2 | 8/2002 | Young | 349/43 |
| 6,801,279 B2 * | 10/2004 | Jang et al. | 349/113 |
| 2002/0051107 A1 * | 5/2002 | Nagayama et al. | 349/113 |

FOREIGN PATENT DOCUMENTS

| | | |
|---|---|---|
| KR | 1020000031460 A | 6/2000 |
| KR | 1020000059471 A | 10/2000 |

* cited by examiner

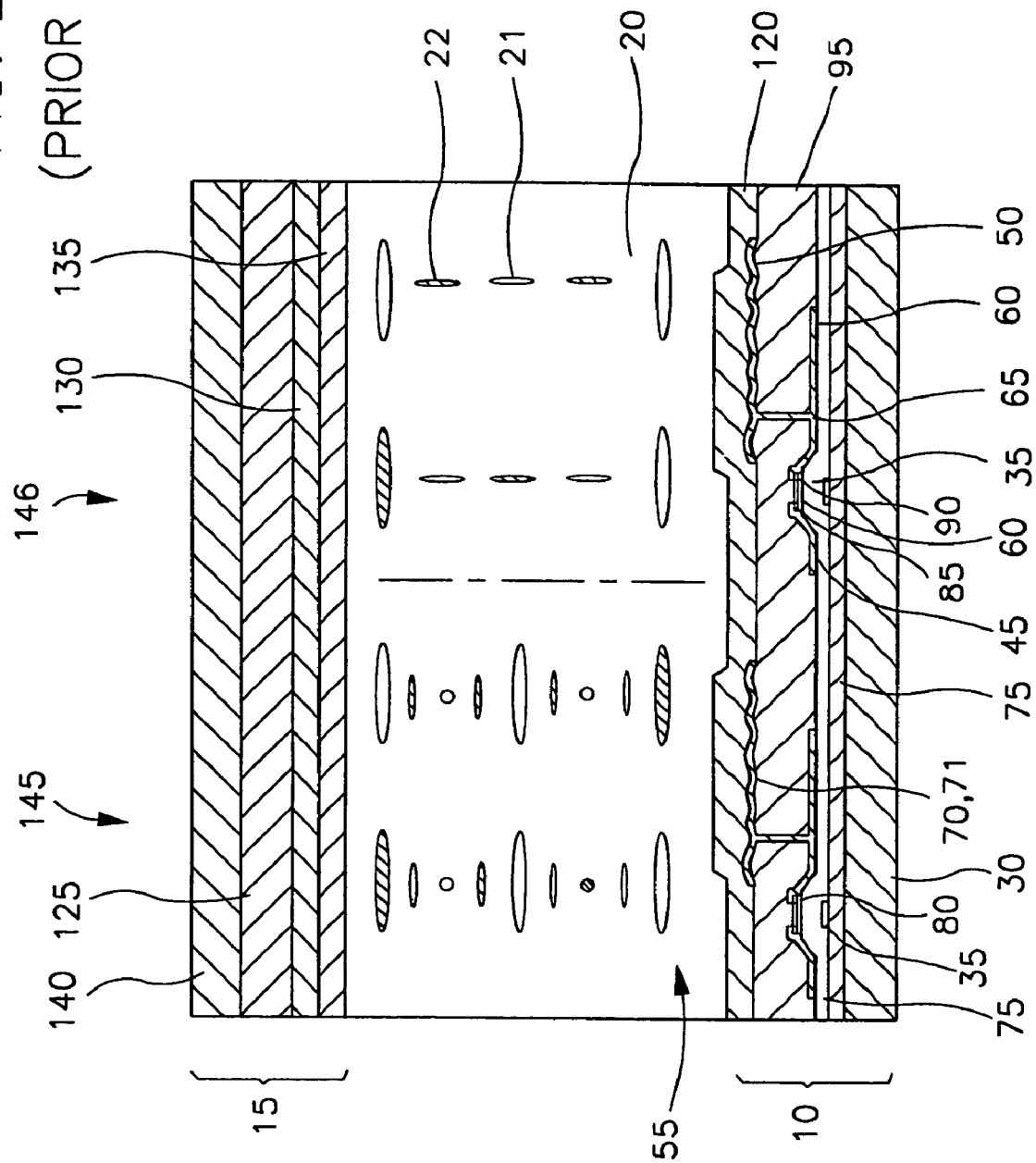

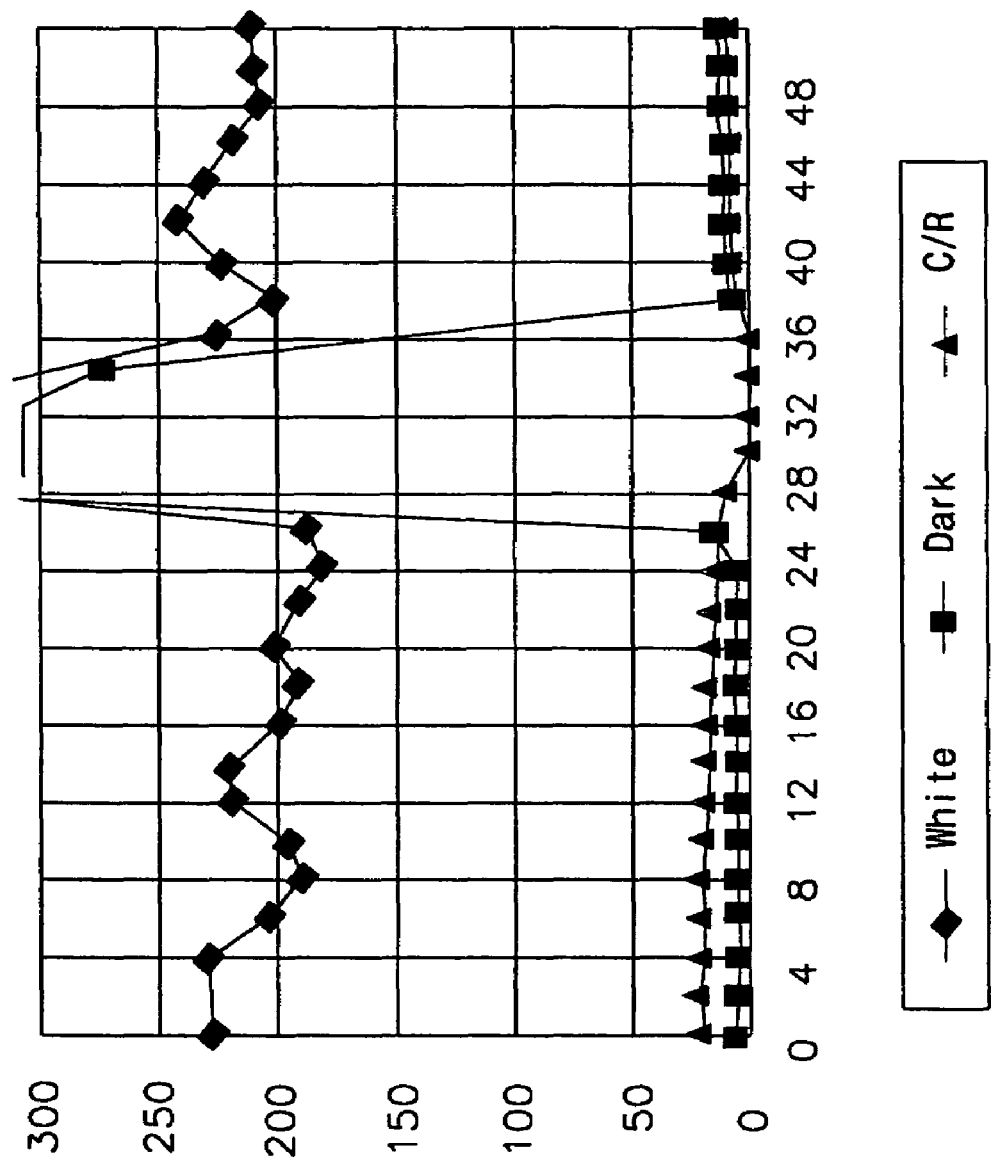

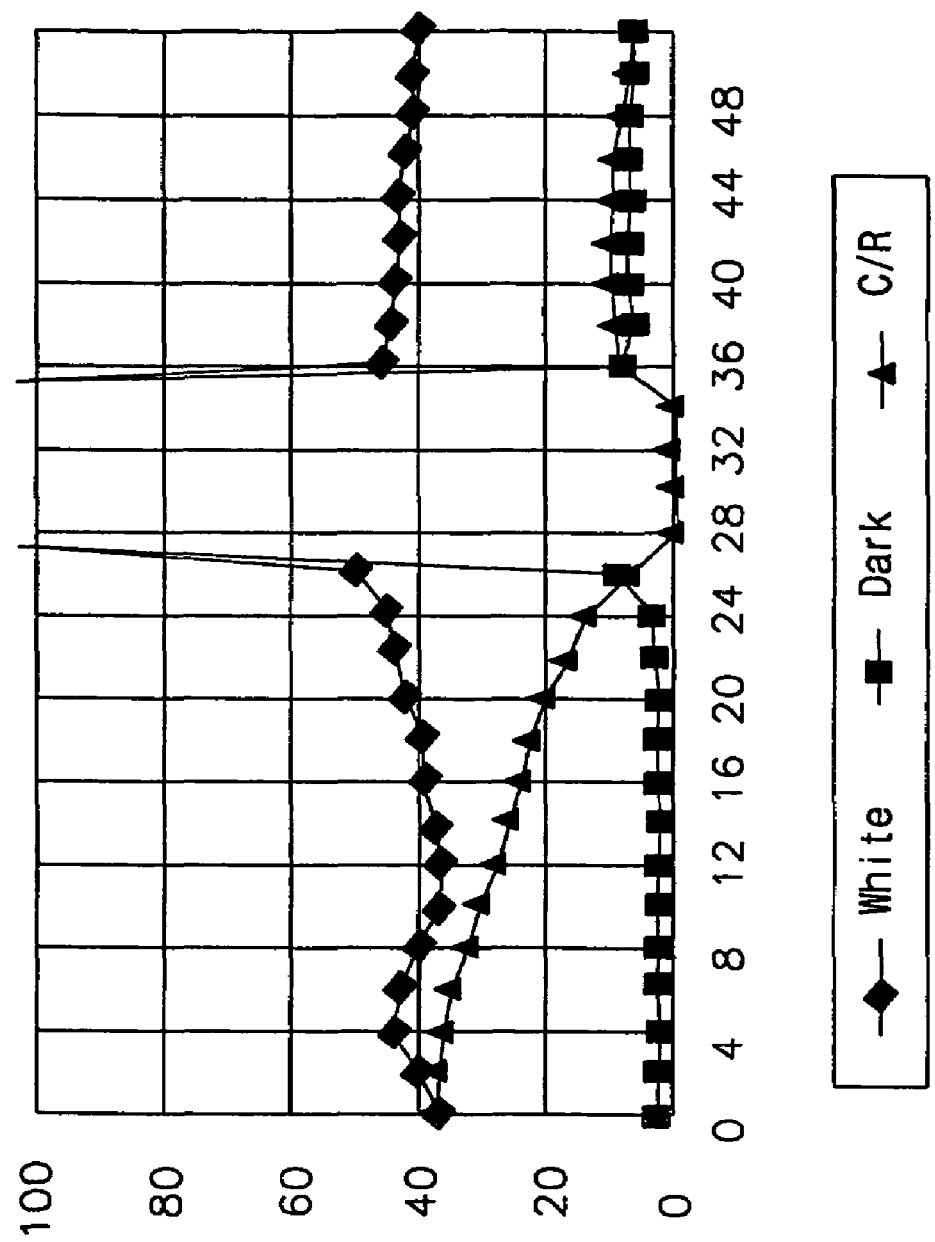

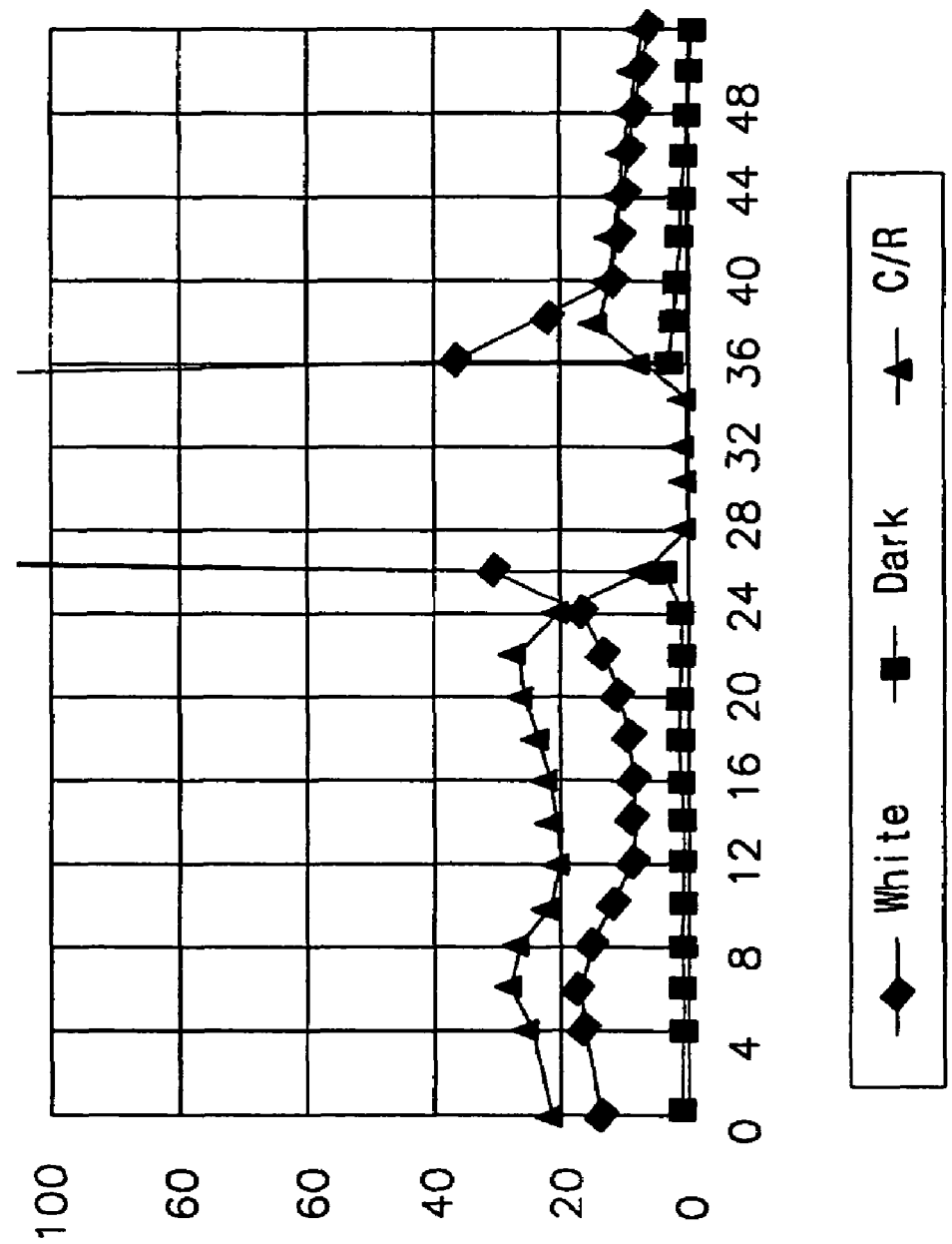

REFLECTION TYPE LIQUID CRYSTAL DISPLAY AND A METHOD FOR MANUFACTURING THE SAME

CROSS REFERENCE

This application is a divisional application of Applicant's U.S. patent application Ser. No. 09/985,031 filed on Nov. 1, 2001, now U.S. Pat. No. 6,801,279, which is herein specifically incorporated by reference in its entirety.

BACKGROUND OF THE INVENTION

1. Field of the Invention

The present invention relates to a reflection type liquid crystal display and a method for manufacturing the same, and more specifically, to a reflection type liquid crystal display having a plurality of aligned micro lens and a method for manufacturing the same.

2. Description of the Related Art

In an information-oriented society these days, the role of an electronic display is becoming more important. All kinds of electronic displays are widely used in various industrial fields. As techniques of the electronic display field are continuously developed, various electronic displays having new functions are provided corresponding to diverse requirements of the information society.

Generally, electronic display device is an apparatus for visually transmitting information to a person. That is, an electronic display device can be defined as an electronic apparatus, which converts an electrical information signal output from various electronic equipment into a visually recognizable optical information signal. Also, it may be defined as an electronic apparatus serving as a bridge for connecting the person and the electronic equipment.

These electronic displays are classified into an emissive display in which the optical information signal is displayed by a light-emitting method, and a non-emissive display in which the signal is displayed by an optical modulation method such as light-reflecting, dispersing and interference phenomena, etc. As the emissive display called an active display, for example, there are a CRT (Cathode Ray Tube), a PDP (Plasma display panel), an LED (Light emitting diode) and an ELD (Eelectroluminescesnt Display), etc. The non-emissive display is called a passive display. an LCD (Liquid Crystal Display) and an EPID (Eelectrophoretic Image Display), etc fall in that category.

The CRT has been used in an image display such as a television receiver and a monitor, etc., over the longest period of time. The CRT has the biggest market share because of its high displaying quality and low price, but also has many disadvantages such as heavy weight, large volume and high power consumption.

Meanwhile, as various kinds of electronic devices are small in size and lighter in weight and use lower voltage and less power in driving the electronic devices due to rapid advancement of semiconductor technologies, demands have been increased for a flat panel type display being slimmer and lighter property as well as lower driving voltage and consuming less power.

Among flat panel type displays, the LCD is much slimmer and lighter than any other displays and it requires lower driving voltage and less power consumption. Also, the LCD has the displaying quality similar to the CRT. Therefore, the LCD is widely used in various electronic devices. Further, since the LCD can be manufactured relatively easily, its application area becomes wider.

The LCD is classified into a transmissive type LCD, which displays an image using an external light source and a reflection type LCD, which displays the image using ambient lights instead of the external light source.

The reflection type LCD has an advantage because it consumes less power and shows an excellent display at outdoor compared to the projection type LCD. Further, the reflection type LCD is thin and light because an additional light source such as backlight device is not required.

However, the current reflection type LCD shows darker image than its competition and fails to show a high resolution and multicolor images. Therefore, the reflection type LCDs are restrictively used for a product that requires a simple pattern display, such as, numbers or simple characters.

To use a reflection type LCD for various electronic displays, a high resolution and a multicolor display together with an enhanced reflection luminance are necessary. In addition, a proper brightness, rapid response time and higher contrast are necessary.

In current reflection type LCDs, two technologies are combined to enhance the brightness. One is enhancing the reflection efficiency of the reflective electrode, and the other is achieving an ultra high aperture ratio.

There is disclosed a method for enhancing the reflection efficiency by forming bumps to a reflective electrode in U.S. Pat. No. 5,610,741 (issued to Naofumi Kimur) entitled "Reflection type liquid crystal display device with bumps on the reflector."

FIG. 1 is a partial plan view of the reflection type LCD device provided in the '741 U.S. Patent and FIG. 2 is a sectional view of the reflection type LCD device of FIG. 1.

Referring to FIG. 1 and FIG. 2, the reflection type LCD device has a first substrate 10, a second substrate 15 disposed facing the first substrate 10 and a liquid crystal layer 20 interposed between the first substrate 10 and the second substrate 15.

The first substrate 10 includes a first insulating substrate 30 on which a plurality of gate bus wirings 25 are formed. Gate electrodes 35 branch off from the gate bus wirings 25. Additionally a plurality of source bus wirings 40 are provided so as to cross the gate bus wirings 25. The source bus wirings are insulated from the plurality of gate bus wirings 25 by means of an insulating layer. Source electrodes 45 branch off from the source bus wirings 40.

Reflective electrodes 50 are formed between the first substrate 10 and the liquid crystal layer 20 and are disposed in a plurality of rectangular regions formed by crossing the plurality of gate bus wirings 25 and the plurality of source bus wirings 40.

The reflective electrode 50 is connected with thin film transistor (TFT) 55 formed on the first substrate 10. The TFT 55 serves as a switching device with the gate bus wiring 25 and the source bus wiring 40.

A plurality of dents 70 and 71 are provided on the surface of the reflective electrode 50, making the surface rugged.

The plurality of dents 70 and 71 are irregularly arranged on the entire surface. The reflective electrode 60 and a drain electrode of the TFT device 55 are connected to each other through a contact hole 65.

The gate bus wiring 25 and the gate electrode 35 are formed on the first insulating substrate 30 made of, for example, glass by depositing tantalum (Ta) film using a sputtering method and patterning the deposited Ta film using a photolithography method.

Next, the gate insulating film 75 is formed to cover the gate bus wiring 25 and the gate electrode 35. The gate insulating film 75 is formed, for example, to a thickness of 4000 Å by depositing a SiNx film through a plasma CVD (Chemical Vapor Deposition) method.

A semiconductor layer 80 of amorphous silicon (a-Si) is formed on the gate insulating film 75 over the gate electrode 35. Contact layers 85 and 90 of n+ type impurity-doped a-Si layer are formed on the semiconductor layer 80.

Subsequently, molybdenum (Mo) film is formed on the first insulating substrate 30 to cover the resultant structure formed in the above-mentioned manner and then the Mo film is patterned to form a source bus wiring 40, a source electrode 45 and a drain electrode 60. In such a manner, TFT 55 is manufactured.

On the entire surface of the insulating substrate 30 in which the TFT device 55 was formed are formed an organic insulating film 95 and a reflective electrode 50 each having a rugged surface.

FIGS. 3A, 3B and 3C are sectional views showing the steps of forming the organic insulating film and the reflective electrode in the device shown in FIG. 2.

Referring to FIG. 3A, a resist film 100 is formed on the surface of the first insulating substrate 30 to cover the TFT device 55 by a spin coating method. After that, the resist film 100 is pre-baked.

Next, a mask 110 where a light transmitting region 105 and a light shielding region 106 are formed in a predetermined pattern is arranged over the applied resist film 100 and exposure and development treatments are carried out. Thereby, bumps 115 corresponding to the pattern of the mask 110 are formed. Thermal treatment to such a substrate is carried out, whereby a bump 115 whose angles are rounded off is formed as shown in FIG. 3B.

Referring to FIG. 3C, an organic insulating film 95 is applied to cover the bumps 115, for example, by the spin coating method and thereby the surface of the formed organic insulating film 95 becomes rugged due to the bump 115.

Subsequently, the inorganic insulating film 95 is patterned using a mask (not shown) to form a contact hole 65 exposing a surface of the drain electrode 60 of the TFT device 55. A metal film of aluminum (Al) or nickel (Ni) as a reflective electrode 50 is formed on the organic insulating film 95. At this time, the contact hole 65 is filled with the reflective electrode material. The reflective electrode material is formed by the vacuum sputtering method. As a result, dents 70 and 71 are formed on the surface of the reflective electrode 50 such that they have shapes corresponding to those of the organic insulating film 95.

Returning to FIG. 2 again, a first orientation film 120 is formed on the reflective electrode 50 and the inorganic insulating film 95, whereby the first substrate 10 is completed.

The second substrate 15 includes a second insulating substrate 140 on which a color filter 125, a common electrode 130 and a second orientation film 135 are formed.

The second insulating substrate 140 is comprised of glass. A color filter 125 corresponding to each of pixels 145 and 146 is formed on the second insulating substrate 140. On the color filter 125, is formed a common electrode 130 of a transparent material such as ITO (Indium tin oxide), etc., and on the common electrode 130 is formed a second orientation film 135. These elements make the second substrate 15.

The second substrate 15 is aligned over the first substrate such that the second substrate 15 faces the first substrate 10. Then, a liquid crystal layer 20 including liquid crystal and pigment is injected into a space between the first substrate 10 and the second substrate 15 using a vacuum injection method, thereby completing a reflection type LCD.

However, although the conventional LCD enhances the reflection efficiency by forming such a plurality of dents at the reflective electrode, it has some problems as follows:

First, the conventional reflection type LCD has hemispherically shaped dents serving as micro lenses and having different sizes in order to enhance the reflection efficiency but the ridge portions where the dents are not formed have different sizes depending on their positions rendering the reflection efficiency non-uniform. In other words, different sizes of the ridge portions as well as different heights in a region having different sizes of the dents cause different reflection ratios depending on the regions. This makes the reflection ratio of the reflective electrode non-uniform. Thus, the lowering of the reflection uniformity in the reflective electrode results in the uniformity in the orientation of liquid crystal substance, which acts as a factor lowering the contrast of an image displayed on an LCD. Also, there is a high probability that the non-uniformity in the orientation of liquid crystal substance induces fog failure as well as light leakage and afterimage.

In addition, the conventional reflection type LCD has a drawback because different sizes of the dents and different sizes of the regions between the dents makes it difficult to precisely control the sizes of the dents and the space between the dents to meet the specification in real world.

Furthermore, although the dents of different sizes overlap each other, the semispherical shapes of dents make it difficult to completely block a scattered reflection of an incident light at the dents portion and thus it is limited to enhance the image quality.

Moreover, since the conventional reflection type LCD has a regular quadrilateral pixel shape, it has drawbacks in that not only a design should be performed from the start point so as to apply it to displays which request respective different pixel sizes and alteration of pixel sizes depending on the variety of information telecommunication apparatus such as hand-held terminals or liquid crystal television receivers but also a process condition should be newly secured. Especially, it is very difficult to apply it to electronic displays such as a mobile phone requesting to show a high reflectivity along a specific direction.

SUMMARY OF THE INVENTION

Therefore, it is an object of the present invention to provide a reflection type LCD including a reflective electrode having a plurality of oriented micro lenses so as to enhance the reflection efficiency.

It is another object of the present invention to provide a method for forming a reflective electrode of an LCD that is especially suitable for the oriented lens type reflection type LCD and enables to considerably decrease the process time and costs.

It is still another object of the present invention to provide an electronic display device including a reflective electrode having a high reflection rate along a specific direction.

It is further still another object of the present invention to provide a method for manufacturing an electronic display which is especially suitable for the manufacturing of the electronic display device including a reflective electrode having a high reflection rate along a specific direction.

It is yet still another object of the present invention to a reflection type LCD capable of resolving a problem occurring due to a stepped portion of a boundary portion between an inner region of a pixel and an outer region of the pixel and thereby obtaining a uniform image quality.

It is yet further still another object of the present invention to provide an electronic display device including a reflective electrode capable of resolving a problem occurring due to a stepped portion of a boundary portion between an inner region of a pixel and an outer region of the pixel and thereby obtaining a uniform image quality.

To achieve the aforementioned one object of the present invention, there is provided a reflection type LCD comprising: a first substrate on which a pixel array is formed; a second substrate formed facing the first substrate; a liquid crystal layer formed between the first and second substrates; and a reflective electrode formed on the first substrate and including a plurality of first regions and a plurality of second regions having a height difference relative to the first regions, a first total sum in first lengths of the second regions arranged perpendicular to a first direction being greater than a second total sum in second lengths of the second regions arranged perpendicular to the second direction such that the second regions have higher reflectivity in the first direction than the second direction.

To accomplish the aforementioned another objects of the present invention, there is provided a method for manufacturing a reflection type LCD comprising the steps of: forming a pixel array on a first substrate; forming an organic insulating film on the resultant structure of the first substrate, wherein the organic insulating film comprises a plurality of first regions and a plurality of second regions having a height difference relative to the first regions, wherein the second regions are formed so that a first total sum in first length components of the second regions arranged along a direction perpendicular to a first direction is greater than a second total sum in second length components of the second regions arranged along a direction perpendicular to a second direction such that the second regions have a higher reflectivity in the first direction than the second direction; forming a reflective electrode on the organic insulating film; forming a second substrate facing the first substrate; and forming a liquid crystal layer between the first substrate and the second substrate.

To accomplish the aforementioned still another object of the present invention, there is provided an electronic display device comprising: an insulating substrate on which a pixel array is formed; and reflective means connected to the pixel array and including a plurality of first regions and a plurality of second regions having a height difference relative to the first regions, wherein the second regions are formed so that a first total sum in first length components of the second regions arranged along a direction perpendicular to a first direction is greater than a second total sum in second length components of the second regions arranged along a direction perpendicular to a second direction and thus the second region has higher reflectivity in the first direction than the second direction.

To accomplish the aforementioned still another object of the present invention, there is provided a method of manufacturing an electronic display device comprising the steps of: forming a pixel array on an insulating substrate; and forming a reflective means on the resultant structure of the first substrate, wherein the reflective electrode is connected to the pixel array and comprises a plurality of first regions and a plurality of second regions having a height difference relative to the first regions, wherein the second regions are formed so that a first total sum in first length components of the first regions arranged along a direction perpendicular to a first direction is greater than a second total sum in second length components of the second regions arranged along a direction perpendicular to a second direction and thus the second regions have a higher reflectivity in the first direction relative to the second direction.

To accomplish the aforementioned yet still another object of the present invention, there is provided a reflection type LCD comprising: a first substrate on which a pixel array is formed; a second substrate formed facing the first substrate; a liquid crystal layer formed between the first and second substrates; a reflective electrode formed on the first substrate and including a plurality of first regions and a plurality of second regions having a height difference relative to the first regions for light scattering, wherein a first total sum in first length components of the second regions arranged along a direction perpendicular to a first direction is greater than a second total sum in second length components of the second regions arranged along a direction perpendicular to a second direction such that the second regions have higher reflectivity in the first direction relative to the second direction; and an organic insulating film arranged between the first substrate and the reflective electrode and having a same surface structure as that of the reflective electrode, wherein the surface structure of the organic insulating film extends to outside a boundary of a unit pixel.

To accomplish the aforementioned yet further still another object of the present invention, there is provided an electronic display device comprising: an insulating substrate on which a pixel array is formed; reflective means connected to the pixel array and including a plurality of first regions and a plurality of second regions having a height difference relative to the first regions for light scattering, wherein a first total sum in first length components of the second regions arranged along a direction perpendicular to a first direction is greater than a second total sum in second length components of the second regions arranged along a direction perpendicular to a second direction such that the second regions have a higher reflectivity in the first direction relative to the second direction; and an organic insulating film arranged between the first substrate and the reflective electrode and having the same surface structure as that of the reflective electrode, wherein the surface structure of the organic insulating film extends to outside a boundary of a unit pixel.

In accordance with the present invention, a plurality of first grooves arranged continuously along the horizontal direction, a plurality of second grooves arranged discontinuously along the vertical direction and a reflective electrode of oriented micro lenses defined by the first grooves and the second grooves are formed to thereby have an enhanced reflection efficiency with respect to a specific direction compared with the conventional reflection type LCD. Accordingly, the contrast and image quality may be improved remarkably. Also, since the micro lenses are oriented along the horizontal or vertical direction of the pixel, it is suitable for electronic displays that need a high reflectivity with respect to a specific direction. Further, since the reflective electrodes may be formed by an improved exposure and development process, the manufacturing cost and time would be reduced. When the groove filling member having a variety of shapes is formed at the crossing points of the grooves in the reflective electrode, the reflectivity of the reflective electrode may be improved more highly to largely improve the contrast and image quality. When forming the organic insulating film, the grooves are formed at an outer region between pixels in the same manner as in the inner region of the pixel. Thus, a height difference between the pixel region and the outer region between pixels becomes minimal. Accordingly, the light leakage induced after-image or distortion phenomenon in orientation of liquid crystal may be eliminated.

BRIEF DESCRIPTION OF THE DRAWINGS

The above objects and other advantages of the present invention will become more apparent by describing preferred embodiments thereof in detail with reference to the attached drawings.

FIG. 2 is a sectional view of the conventional reflection type LCD of FIG. 1.

FIGS. 19A and 19B are graphs showing variations in the reflectivity measured by using an LCD having the reflective electrode shown in FIG. 18A.

FIGS. 20A and 20B are graphs showing a variation in the reflectivity measured in a view angle using an LCD having the reflective electrode shown in FIG. 18B.

FIGS. 21A and 21B are graphs showing a variation in the reflectivity measured in a view angle using an LCD having the reflective electrode shown in FIG. 18C.

DETAILED DESCRIPTION OF THE PREFERRED EMBODIMENTS

Now, reflection type LCDs and manufacturing methods thereof in accordance with preferred embodiments of the present invention will be described in detail with reference to the accompanying drawings.

Embodiment 1

Figure 4:
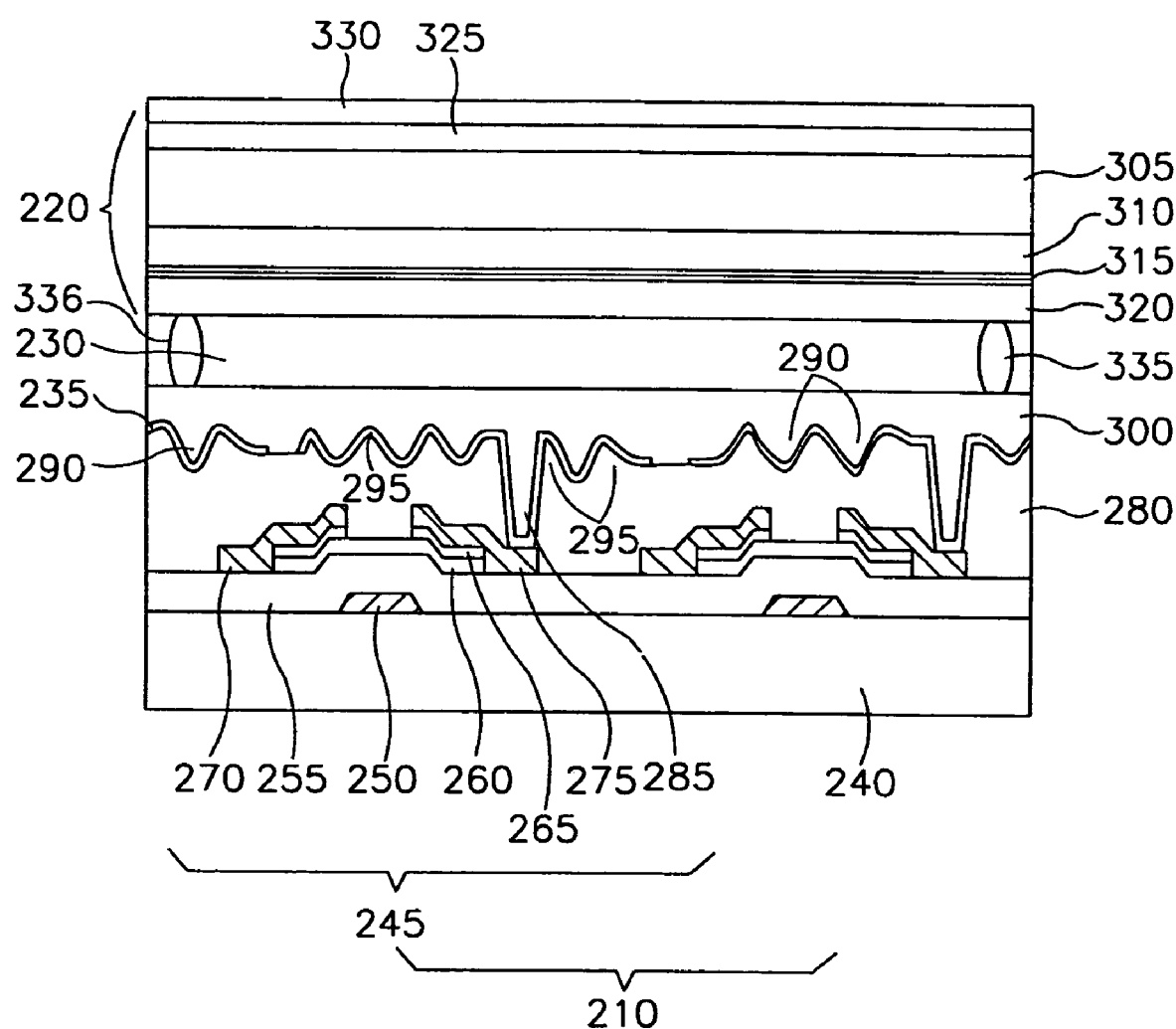
FIG. 4 is a sectional view of a reflection type LCD in accordance with a first embodiment of the present invention.

FIG. 4 is a sectional view of a reflection type LCD in accordance with a first embodiment of the present invention.

Referring to FIG. 4, a reflection type LCD includes a first substrate 210 on which a pixel array is formed, a second substrate 220 formed facing the first substrate 210, a liquid crystal layer 230 formed between the first substrate 210 and the second substrate 220, and a reflective electrode 235 functioning as pixel electrode, which is formed between the first substrate 210 and the liquid crystal layer 230.

The first substrate 210 includes a first insulating substrate 240 and a thin film transistor (TFT) 245 as a switching device formed on the first insulating substrate 240.

The first substrate 210 is comprised of a nonconductive material, for instance, glass, ceramic, etc. The TFT 245 includes a gate electrode 250, a gate insulating film 255 a semiconductor layer 260, an ohmic contact layer 265, a source electrode 270 and a drain electrode 275.

The gate electrode 250 is formed branched from a gate line (not shown) on the first insulating substrate 240 and has a double layered structure in which a lower layer is comprised of chromium (Cr) and an upper layer is comprised of aluminum (Al).

The gate insulating film 255 is comprised of silicon nitride ($Si_xN_y$) and is formed on the entire surface of the first insulating film 240 on which the gate electrode 250 is formed. On the gate insulating film 255 are formed the semiconductor layer 260 of amorphous silicon and the ohmic contact layer 265 of n+amorphous silicon sequentially.

The source electrode 270 and the drain electrode 275 are formed on the ohmic contact layer 265 and the gate insulating film 275. The gate electrode 250 is disposed between the source electrode 270 and the drain electrode 275, thereby completing the TFT 245. The source electrode 270 and the drain electrode 275 are comprised of a metal such as tantalum (Ta), molybdenum (Mo), titanium (Ti), chromium (Cr), etc.

On the first insulating substrate 240 on which the TFT 245 is formed, deposited is an organic insulating film 280 comprised of a resist material. A contact hole 285 is formed in the organic insulating film 280, to expose a portion of the drain electrode 275.

On the organic insulating film 280 including the contact hole 285 is formed the reflective electrode 235. The reflective electrode 235 is connected to the drain electrode 275 through the contact hole 285 and thus the TFT 245 is electrically coupled to the reflective electrode 235.

Figure 5A:
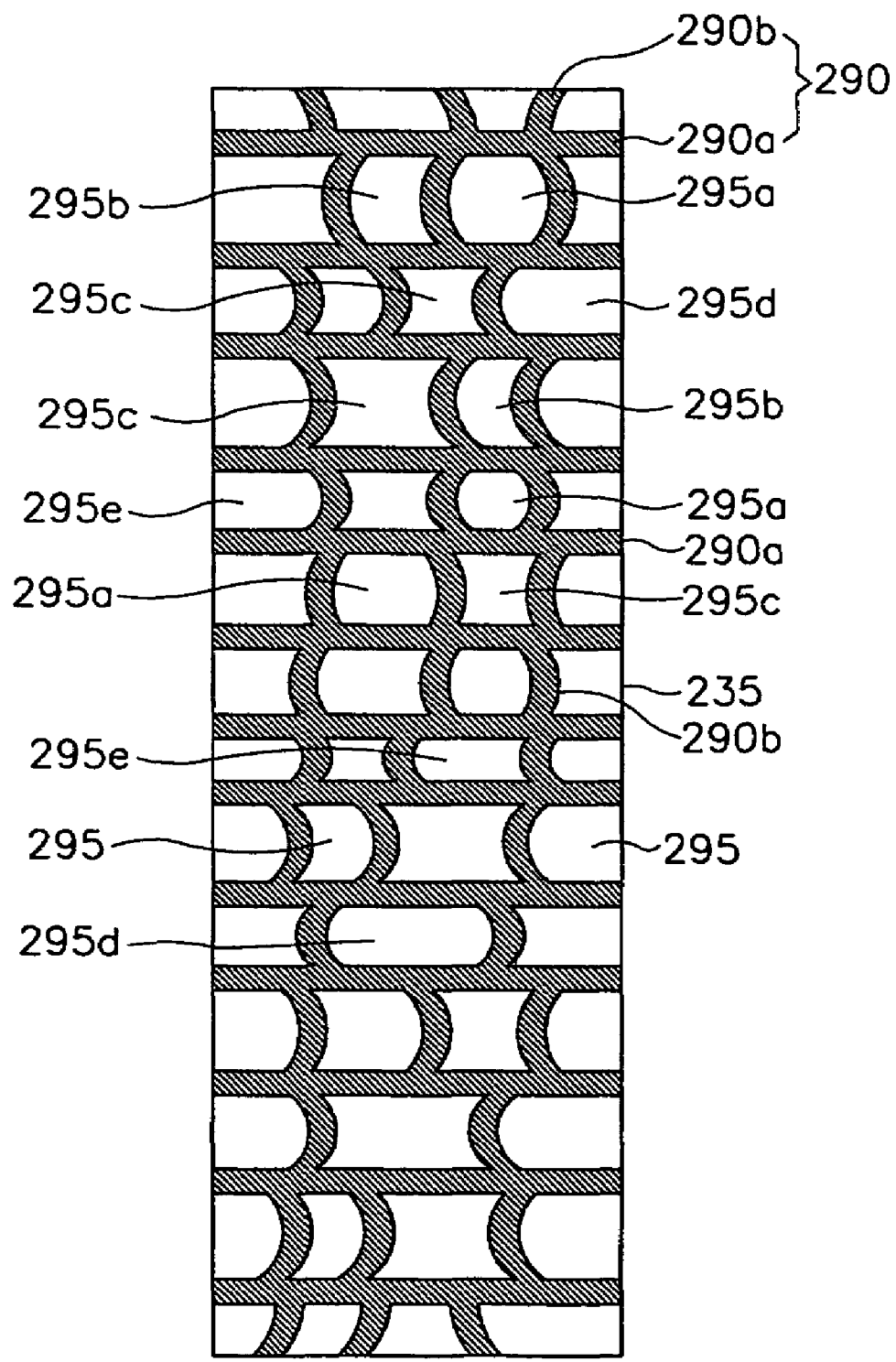
FIG. 5A is a plan view of the reflective electrode in the LCD of FIG. 4

FIG. 5A is a detailed plan view of the reflective electrode corresponding to a unit pixel in the device of FIG. 4.

As shown in FIG. 5A, the reflective electrode 235 in accordance with the present embodiment includes a plurality of first region portions 290 and a plurality of second region portions 295 having a height difference relative to the first region portions 290. A first total sum in first length components of the second region portions 295 arranged along a second direction (horizontal direction) perpendicular to a first direction (vertical direction) is greater than a second total sum in second length components of the second region portions 295 arranged along the first direction perpendicular to the second direction such that the second region portions 295 have higher reflectivity in the first direction relative to the second direction.

For example, the first regions 290 may have a recess shape lower in height relative to the second region portions 295 and the second region portions 295 have a protrusion shape higher in height relative to the first region portions 290 or, the first region portions 290 may have a protrusion shape higher in height relative to the second region portions 295 and the second region portions 295 have a recess shape lower in height relative to the first region portions 290.

The first region portions 290 include first plural grooves 290a formed in succession along the horizontal direction. Also, between the adjacent first grooves 290a are formed second plural grooves 290b discontinuously along the vertical direction. In FIG. 5A, the second grooves 290b are formed in the form of an arc such that an incident light can be reflected to various directions as well as to the first direction and the second direction. The second grooves 290b can be also made to have an arbitrary form such as a straight line shape, a ring shape, etc.

Preferably, the second grooves 290b are arranged to miss each other on the way with an adjacent groove while arranged along the vertical direction. Preferably, the number of the second grooves formed along the vertical direction is 0.5 to 5 per each horizontal line of the unit pixel.

The second region portions 295 include a plurality of protruded portions functioning as micro lens. In other words, the first region portions 290 consisting of continuous recesses in the reflective electrode 235 are leveled to a certain depth at a lower place relative to the second region portions 295 which are protruded. Also, the second region portions 295 consisting of protruded portions relative to the first region portions 290 are formed to have a certain height on the first substrate 210. The second region portions 295 serving as the micro lens for enhancing the reflection efficiency are surrounded by the first region portions 290 consisting of the first grooves 290a and the second grooves 290b together with a boundary of a unit pixel. In other words, one of the second region portions 295 is defined by first two grooves 290a adjacent to each other and second two grooves 290b at the center potion of a unit pixel region. The second region portions 295 adjacent to the boundary of the unit pixel region are defined by first two grooves 290a adjacent to each other, one of the second grooves 290b and a part of the boundary of the unit pixel.

Due to the directionality of the first region portions 290, the protruded portions of the second region portions 295 are oriented along the first direction of the horizontal direction of a unit pixel and the second direction of the vertical direction of the unit pixel. Accordingly, LCDs in accordance with the present embodiment are applicable to displays that request a relatively higher reflectivity along a specific direction than to other directions.

According to the present embodiment, the plurality of protruded portions of the second region portions 295 have various shapes such as an ellipse shape 295a, a waxing crescent moon shape or a waning moon shape 295b, a sectional surface shape of a concave lens 295c, a track shape 295d, a hemi-track shape 295e, etc. Also, although the protruded portions of the second region portions 295 have the same shape, they have different sizes from each other.

Both the first groove 290a and the second groove 290b in the first region portions 290 have a width range of approximately 2–5 μm. The protruded portions of the second region portions 295 have various sizes within a range of approximately 4–20 μm. An interval between the center lines of the first grooves 290a formed parallel to each other along the horizontal direction is set in the range of 5–20 μm and approximately 8.5 μm in average. An interval between the ridges of the protruded portions of the second region portions 295 is set in the range of 12–22 μm, approximately 17 μm in average. Thus, shapes and sizes of the protruded portions of the second region portions 295 change variously, minimizing interference of light reflected by the reflective electrode.

Figure 5B:
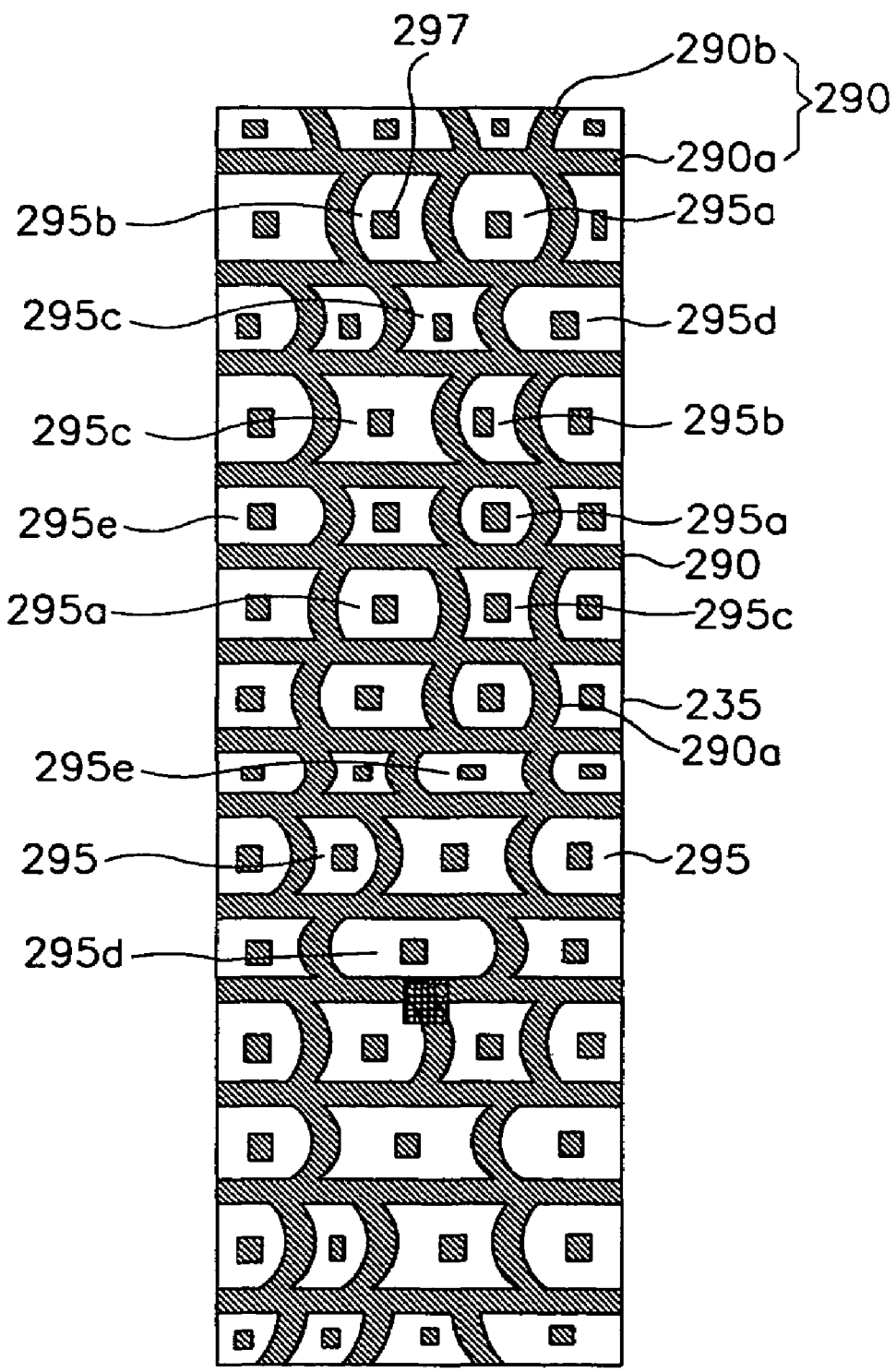
FIG. 5B is a plan view of the reflective electrode in accordance with another embodiment of the present invention.

FIG. 5B is a detailed plan view of a reflective electrode in accordance with another preferred embodiment of the present invention.

The reflective electrode of FIG. 5B is the same as that of FIG. 5A except for a scattering recess 297 formed at the center portion of each of the second region portions 295. The scattering recess 297 prevents direct reflection of incident light and scatters the incident light. The size of the scattering recess 297 is preferably in the range of 2–3 μm.

Returning to FIG. 4, a first orientation film 300 is disposed on the reflective electrode 235 with a structure as mentioned before.

The second substrate 220 facing the first substrate 210 includes a second insulating substrate 305, a color filter 310, a common electrode 315, a second orientation film 320, a phase difference plate 325 and a polarizing plate 330.

The second insulating substrate 305 is comprised of glass or ceramic material, which is the same material as the first insulating substrate 240. The phase difference plate 325 and the polarizing plate 330 are formed on the second insulating substrate 305 in the named order. The color filter 310 is disposed below the second insulating substrate 305 and the common electrode 315 and the second orientation film 320 are formed below the color filter 310 in the named order, thereby completing the second substrate 220. The second orientation film 320 pre-tilts liquid crystal molecules of the liquid crystal layer 230 together with the first orientation film of the first substrate 210.

Spacers 335 and 336 are interposed between the first substrate 210 and the second substrate 220 to thus form a certain space between the first substrate 210 and the second substrate 220 and the liquid crystal layer 230 is filled in the space formed by the spacers 335 and 336, thereby completing a reflection type LCD 200 in accordance with the present embodiment.

Hereinafter, a method for manufacturing a reflection type LCD in accordance with the present embodiment is in detail described with reference to the accompanying drawings.

FIGS. 6A, 6B, 6C and 6D are sectional views illustrating a method for manufacturing the reflection type LCD shown in FIG. 4 in accordance with the first embodiment of the present invention. Throughout FIGS. 6A, 6B, 6C and 6D, the same elements are designated by the same reference numerals.

Figure 6A:
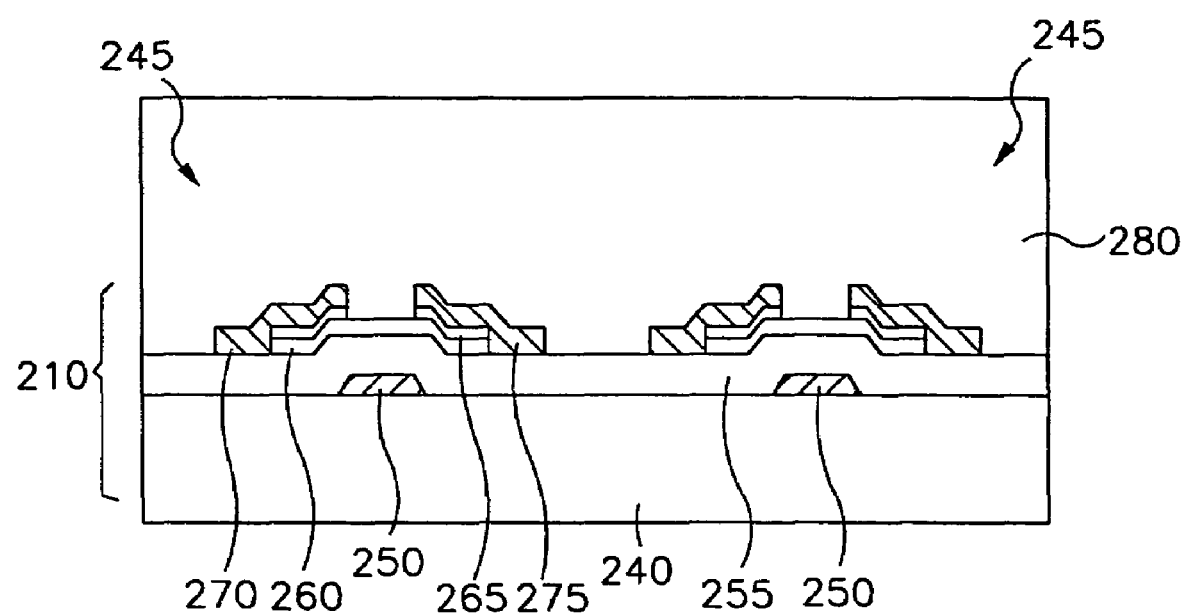
FIGS. 6A, 6B, 6C and 6D are sectional views illustrating a manufacturing process of the reflection type LCD shown in FIG. 4.

Referring to FIG. 6A, on a first insulating substrate of glass or ceramic is deposited a metal layer such as tantalum (Ta), titanium (Ti), molybdenum (Mo), aluminum (Al), chromium (Cr), copper (Cu), tungsten (W), etc. Thereafter, the deposited metal layer is patterned to form a gate line and a gate electrode 250. At this time, the gate electrode 250 and the gate line may be comprised of an alloy of Al—Cu or Al—Si—Cu. Afterwards, a silicon nitride film is deposited on the entire surface of the first insulating substrate 240 including the gate electrode 250 by a plasma chemical vapor deposition method and thus a gate insulating film 255 is formed.

On the gate insulating film 255 are formed an amorphous silicon film and in-situ-doped n+ amorphous silicon film in the named order by a plasma chemical vapor deposition method. Thereafter, the amorphous silicon film and in-situ-doped n+ amorphous silicon film are patterned to sequentially form a semiconductor layer 260 and an ohmic contact layer 265 on the gate insulating film 255 on which the gate electrode 250 is placed. Subsequently, a metal layer is formed of metal such as tantalum (Ta), titanium (Ti), molybdenum (Mo), aluminum (Al), chromium (Cr), copper (Cu), tungsten (W), etc. Then, the metal layer is patterned to form a source electrode 270 and a drain electrode 275 as well as a source line. Thus, a thin film transistor 245 including the gate electrode 250, the semiconductor layer 260, the ohmic contact layer 265, the source electrode 270 and the drain electrode 275 is completed. At this time, the gate insulating film 255 is interposed between the gate line and the source line, thereby preventing the gate line from contacting the source line.

Next, a photoresist film is coated on the first insulating substrate having the thin film transistor 245 to a thickness of approximately 1–3 μm by a spin coating method. Then, an organic insulating film 280 is formed to thereby complete the first substrate 210. At this time, the organic insulating film 280 may be comprised of, for example, acryl resin containing a PAC (Photo-active compound), etc.

Figure 6B:
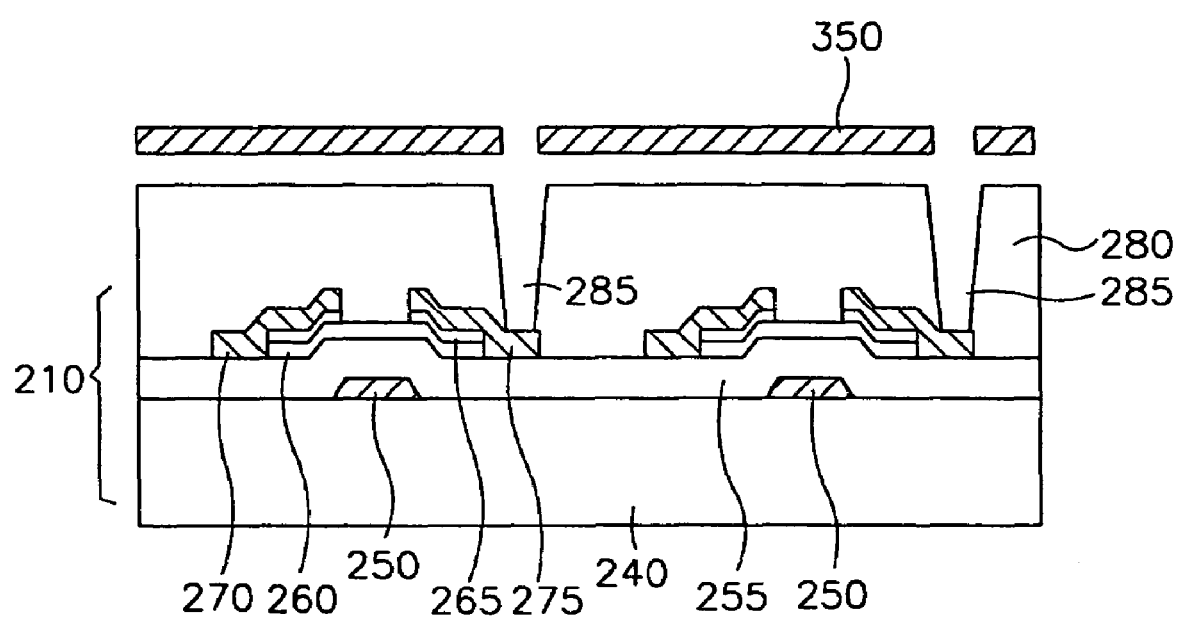

Referring to FIG. 6B, a first mask 350 is aligned over the organic insulating film 280 to form a contact hole 285 and then the organic insulating film is patterned through an exposure and development process to thereby form the contact hole 285 partially exposing the drain electrode 275 and a plurality of grooves.

A process of forming the contact hole 285 at the organic insulating film 280 and a process of forming the plurality of grooves are described as follows.

Figure 7A:
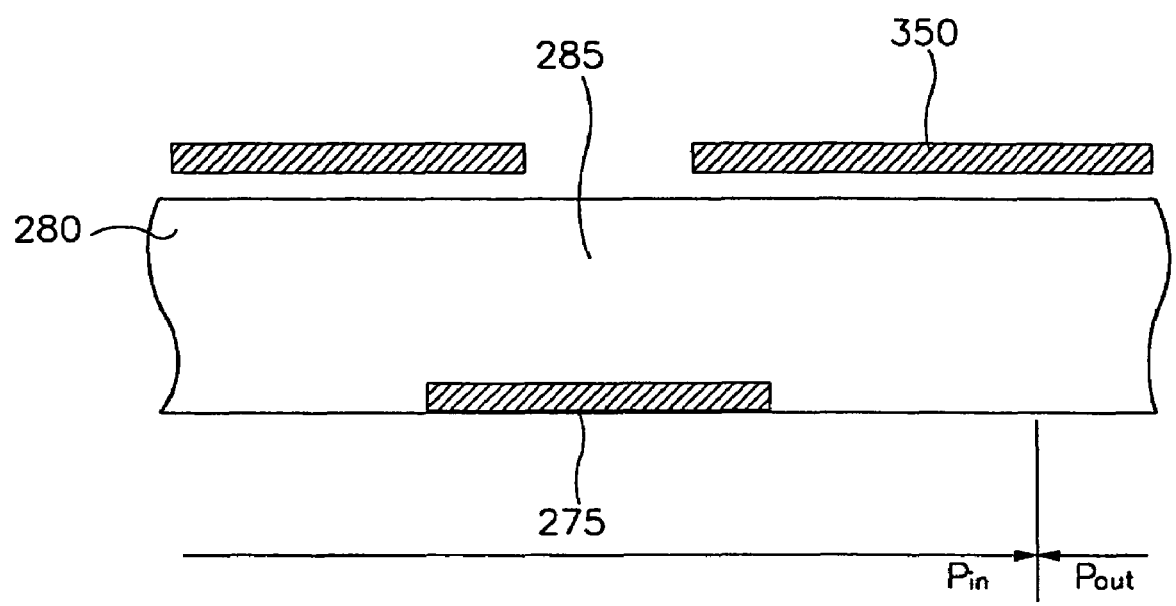
FIGS. 7A and 7B are sectional views particularly showing steps of forming a contact hole and a plurality of grooves at an upper surface of the organic insulating film as shown in FIG. 6B.
Figure 7B:
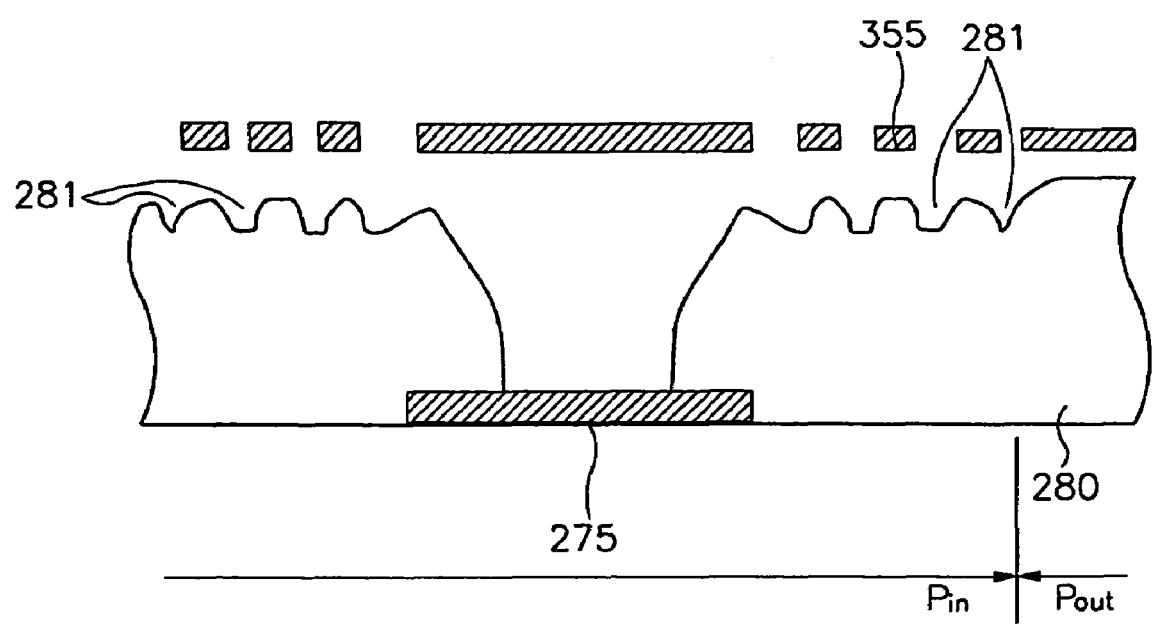

FIG. 7A and FIG. 7B are sectional views for describing a process of forming the contact hole and the plurality of grooves at the organic insulating film 280.

Referring to FIG. 7A and FIG. 7B, the first mask 350 is aligned over the organic insulating film 280 so as to form the contact hole 285. The first mask 350 has a pattern corresponding to the contact hole 285. Afterwards, the organic insulating film 280 is subject to a first full exposure process to thereby expose the portion of the organic insulating film 280 on the source/drain electrode 275. Thereafter, the exposed organic insulating film 280 is developed to form the contact hole 285 exposing the source/drain electrode 275 in the organic insulating film, as shown in FIG. 7A.

Next, in order to form the plurality of grooves, a second mask 355 having a pattern corresponding to the grooves and for forming micro lens is aligned over the organic insulating film 280, as shown in FIG. 7B. At this time, the second mask 355 includes the same pattern as the reflective electrode 235 shown in FIGS. 5A and 5B. Also, depending on the types of resist, the second mask 355 may have a pattern having a reversed shape to the reflective electrode 235 of FIG. 5A and FIG. 5B.

Specifically, the second mask 355 is fabricated by forming a mask pattern corresponding to the first region shown in FIG. 5A on a transparent substrate. Also, as shown in FIG. 5B, the second mask 355 may further have a center recess pattern having a size of 2–3 μm. Thus, by forming the center recess at the center portion of the organic insulating film, the reflection efficiency can be improved.

After exposing the organic insulating film 280 except the contact hole portion 285 using the second mask 355, it is developed to form a plurality of irregular grooves 281 at the surface of the organic insulating film 280. In other words, there are formed a plurality of continuous grooves 281 consisting of first grooves having a constant width along the first direction of the horizontal direction of the unit pixel and the second grooves irregularly arranged along the second direction of the vertical direction of the unit pixel at the organic insulating film 280. Thus, the surface of the organic insulating film 280 is classified into the first region portions consisting of a plurality of continuous grooves and the second region portions consisting of a plurality of protruded portions surrounded by boundary portions of the unit pixels and the first region portions.

In other words, after forming a plurality of grooves having a constant width along the horizontal direction of the unit pixel, a plurality of grooves are formed at protruded portions relative to these grooves along the vertical direction of the unit pixel, thus protruded portions defined by the plurality of grooves are formed at the organic insulating film 280. Preferably, the vertically formed grooves have a semi-spherical sectional shape.

As aforementioned, the first grooves formed along the horizontal direction of the unit pixel and the second grooves formed along the vertical direction of the unit pixel have a size of 2–5 μm and the protruded portions defined by these grooves have a size of 4–20 μm. Also, the number of the second grooves formed along the vertical direction relates to the reflectivity in the first direction of the horizontal direction and the reflectivity in the second direction of the vertical direction, so that the number can be varied and is preferably 0.52–5 every single horizontal line of a pixel unit. The shapes of the second grooves affect on all types of reflectivity except the vertical reflectivity of the pixel. To this end, when equivalent reflectivity is requested with respect to all directions, it is advantages to add a straight line component in a direction perpendicular to a desired direction. Accordingly, it is advantage that the protruded portions 280 formed at the organic insulating film have a shape in which their lengths extend in various sizes along the vertical direction, for example, straight line or arc shape. Upon considering the reflectivity of the pixel in a specific direction, it is preferable to allow the grooves formed along the vertical direction not to meet with the adjacent grooves formed along the vertical direction. (refer to FIG. 5) Also, the second grooves can be formed connected with the first grooves or separated from the first grooves.

In addition, by further forming a groove having a crater shape at the protruded portion of the organic insulating film 280 using the mask shown in FIG. 5, the reflectivity of the reflective electrode 235 formed on the organic insulating film 280 can be enhanced more highly.

Figure 6C:
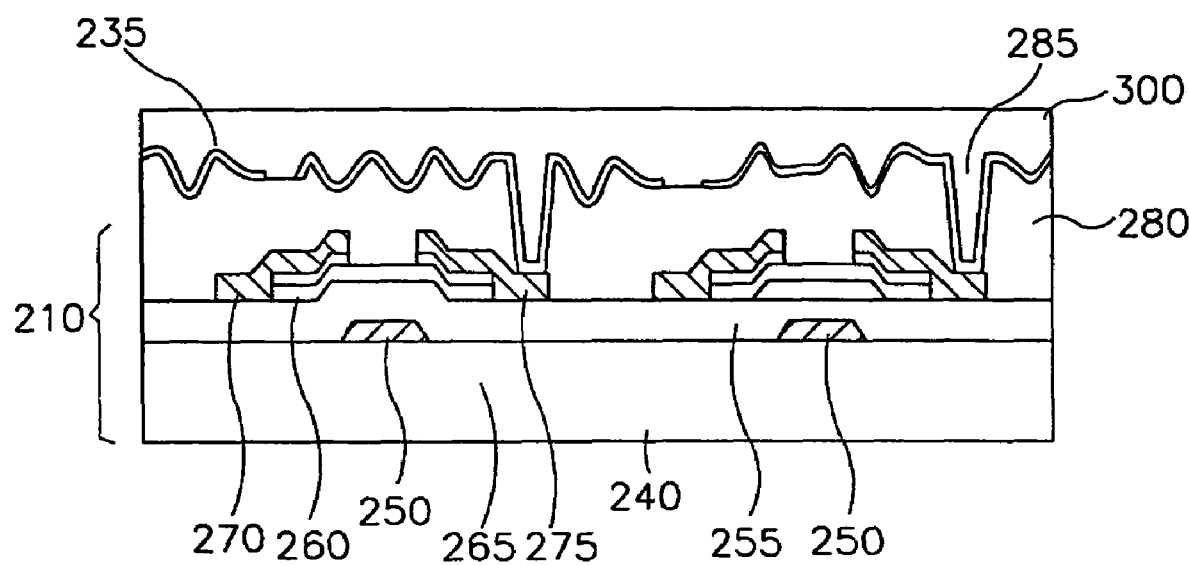

Referring to FIG. 6C, as aforementioned, after a metal layer having a good reflectivity such as aluminum (Al), nickel (Ni), chromium (Cr), silver (Ag), etc., is deposited on the organic insulating film 280 in which a plurality of grooves 281 are formed, the deposited metal layer is patterned in a pixel shape to thereby form a reflective electrode 235. Subsequently, a resist is coated on the reflective electrode 235 and is then rubbed to thereby form a first orientation film 300, which allows liquid crystal molecules in the first liquid crystal layer to be pre-tilted by a selected angle.

The reflective electrode 235 has the same shape as the surface of the organic insulating film 280. In other words, the first region 290 corresponding to the groove 281 of the organic insulating film 280 has a structure in which a plurality of groves formed along the first direction of the horizontal direction with a certain width are continuously arranged together with a plurality of grooves formed irregularly along the second direction of the vertical direction. The directionality of the reflective electrode 235 in the first region and the protruded portions of the second region 295 aligned along the first direction of the vertical direction of the pixel and the second direction of the horizontal direction of the pixel highly enhance the reflectivity in a specific direction such as the vertical direction.

The reflective electrode 235 is divided into first region portions 290 of a plurality of grooves formed on the groove 281 of the organic insulating film 290 and second region portions 295 of micro lenses regions which are a plurality of protruded portions. Here, the first region portions 290 are continuous grooves and are leveled at a low place relative to the second region portions 295. Since the second region portions 295 are surrounded by the first region portions 290, the reflective electrode 235 has a structure defined by the first region portions 290 that are continuous grooves of the second region portions.

In the present embodiment, the plurality of grooves composing the first region portions of the reflective electrode 235 have a width of approximately 2–5 μm and the plurality of grooves composing the second region portions 290 have a variety of shapes and at the same time have a size of approximately 4–20 μm as shown in FIGS. 5A and 5B.

Figure 6D:
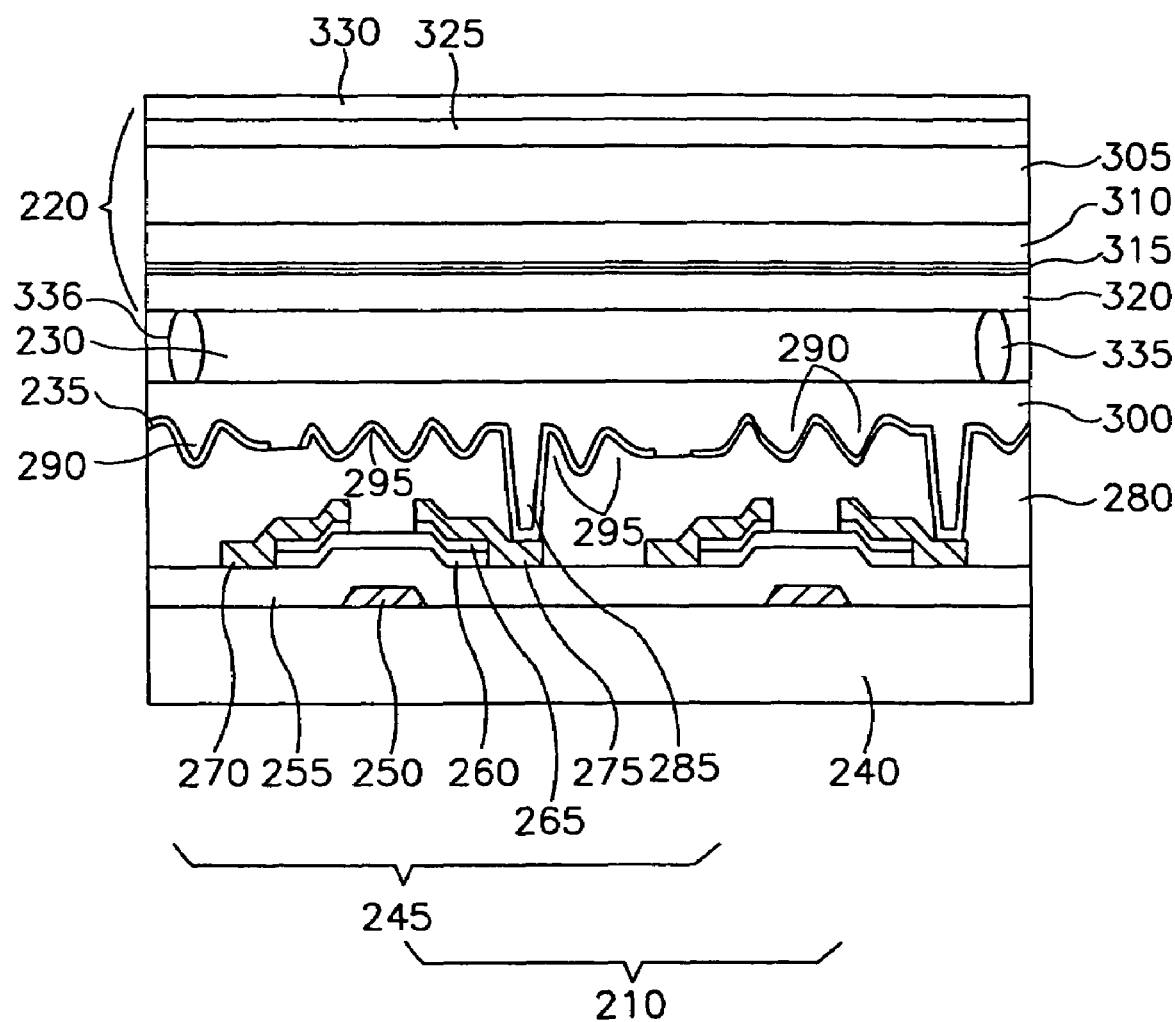

Referring to FIG. 6D, a color filter 310, a transparent common electrode 310 and a second orientation film 320 are formed in the named order on a second insulating substrate 305, thereby completing the second substrate 220. Thereafter, the second substrate 220 is disposed to face the first substrate. The first substrate 210 and the second substrate 220 are coupled to each other with interposing spacers 335 between the first substrate 210 and the second substrate 220, so that a space is formed between the first substrate 210 and the second substrate 220. Then, as liquid crystal is injected into the space between the first substrate 210 and the second substrate 220 using a vacuum injection method and thus the liquid crystal layer 230 is formed, thereby completing the reflection type LCD 200 in accordance with the present embodiment. Also, if necessary, a polarizing plate 330 and a phase difference plate 325 can be attached on the front surface of the second substrate 220. Although not shown in the drawings, a black matrix can be arranged between the second insulating substrate 305 and the color filter 310.

Embodiment 2

Unlike the aforementioned Embodiment 1, the present embodiment allows the contact hole and the plurality of grooves to be formed at the organic insulating film by using a masking work only once.

Generally, there are two kinds of method in manufacturing the reflective electrode serving as the reflection plate of an LCD. One is a process using a single layered organic insulating film and the other is a process using double organic insulating films.

In these two methods, the latter process using the double organic insulating films repeats a process of coating, exposing and developing the organic insulating film twice. In other words, after the first coated organic insulating film is fully exposed to form the protruded portions at the first coated organic insulating film, a second organic insulating film is coated on the first organic insulating film, is exposed and is patterned, to thereby form a contact hole exposing the source/drain electrode. This method can produce a reflective electrode of high reflectivity formed on the organic insulating film but its process is complicated and expensive.

Because of these drawbacks, the method using single organic insulating film is mainly used to form the reflective electrode.

As shown in FIG. 7A and FIG. 7B, after the organic insulating film 280 is coated on the entire surface of the first insulating substrate including the source/drain electrode 275, the first mask 350 for forming the contact hole is loaded in an exposure apparatus and then a portion corresponding to the contact hole of the organic insulating film 280 is firstly exposed using the first mask 350. After the first exposing step is completed, a second mask 355 for forming lenses is loaded into the exposure apparatus and portions which micro lenses are being formed except for the contact hole 285 are secondly exposed. The first and secondly exposed portions are then developed to thereby form the contact hole 285 and micro lenses portions at the same time.

However, since the aforementioned process needs to load the masks twice and needs to be exposed twice to form the contact hole and lens forming portions, there is increasing likelihood of an unnecessary work failure along with an increase in the whole exposure time.

The present embodiment is for enhancing the efficiency in the exposure process and has the following manufacturing process.

Figure 8A:
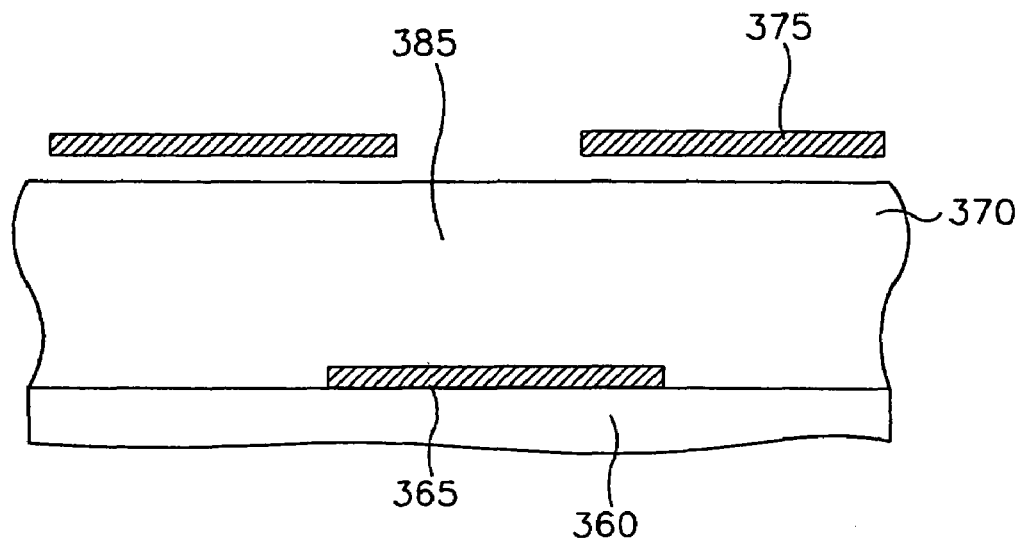
FIGS. 8A, 8B and 8C are sectional views illustrating a process of forming a reflective electrode in accordance with a second embodiment of the present invention.
Figure 8B:
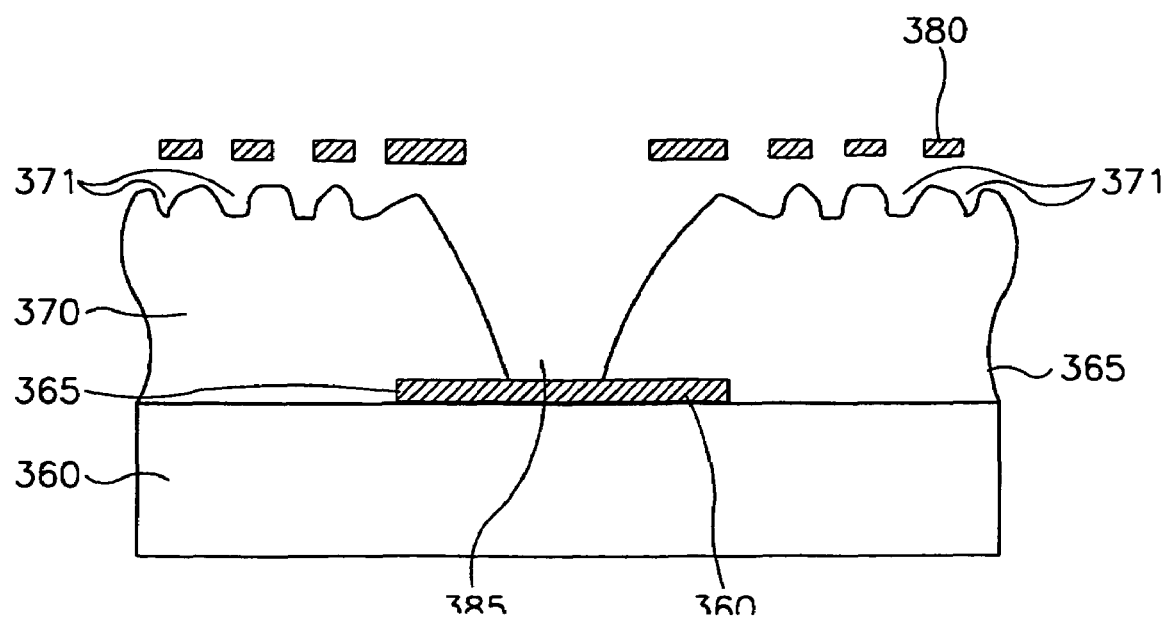
Figure 8C:
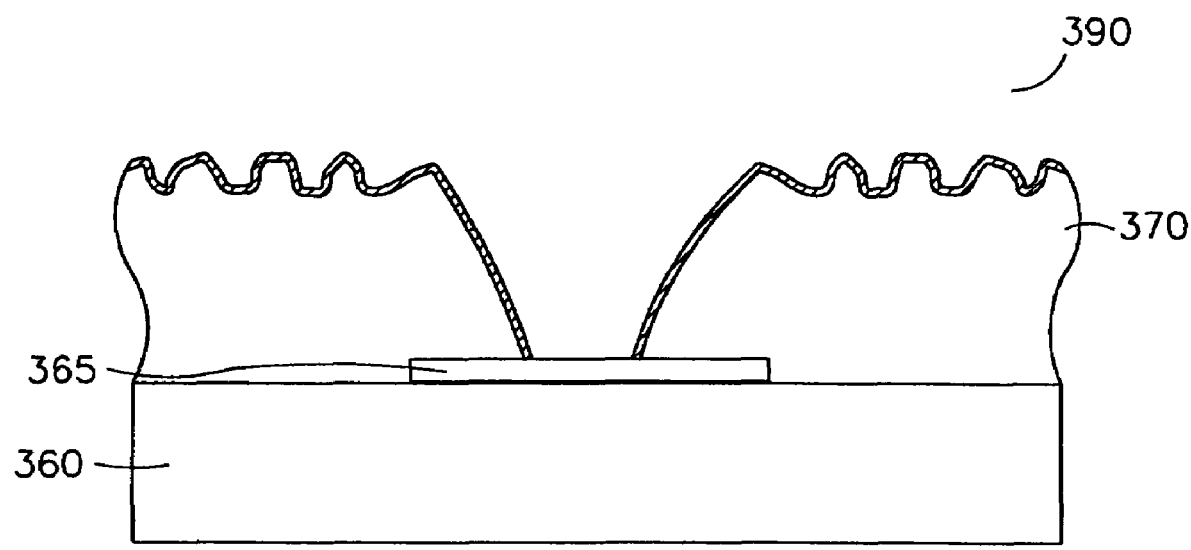

FIGS. 8A, 8B and 8C are sectional views for describing a process for forming a reflective electrode in accordance with the present embodiment.

Referring to FIG. 8A, an organic insulating film 370 is formed to a thickness of approximately 1–3 μm by a spin coating method on the entire surface of an insulating substrate 360 on which source/drain electrode 365 is formed. Then, a first mask 375 having a certain pattern is aligned over the organic insulating film 370 so as to form a contact hole 385. Afterwards, the organic insulating film 370 is subject to a partial exposure process. At this time, a partial exposure amount of the organic insulating film 370 through the first mask 375 becomes a value which a lens exposure amount is subtracted from the full exposure amount described in FIGS. 6C and 6D. In other words, when the partial exposure amount is "P," the full exposure amount is "F" and the lens exposure amount is "R," the partial exposure amount is obtained from the following Equation 1:

$$P = F - R \qquad \text{Eq. 1}$$

In this case, it is preferable that the partial exposure amount "P" is approximately 50% of the full exposure amount "F." According to this partial exposure, the contact hole 385 is formed at the organic insulating film 370 by half of a target depth.

As shown in FIG. 8B, in order to form micro lenses at the upper surface of the organic insulating film 370 as partially exposed, a second mask 380 having a predetermined pattern is aligned over the organic insulating film 370. Then, the organic insulating film 370 is exposed to the light through the second mask 380 to form a plurality of grooves 371 at the surface of the organic insulating film 370 and at the same time to form the contact hole 385 exposing source/drain electrode 360. Here, the second mask 380 has a pattern capable of exposing the contact hole portion 385 together with the micro lenses portion. Thus, the portion of the organic insulating film 370 corresponding to the contact hole 385 is exposed twice and thus is hollowed out deeper than the portion where the plurality of grooves 371 are formed, so that the plurality of grooves 371 can be formed simultaneously with the contact hole 385 that exposes the source/drain electrode 360.

In other words, according to the present embodiment, after loading the insulating substrate 360, the first mask 375 for forming the contact hole and the second mask 380 for forming the micro lenses, the contact hole portion of the organic insulating film 370 is firstly exposed using the first mask 375 for forming the contact hole by partially exposing the organic insulating film 370 with an exposure amount in which the lens exposure amount suitable for forming the lenses is subtracted from the full exposure amount suitable for forming the contact hole. Thereafter, the lens forming portion and the contact hole forming portion of the organic insulating film 370 are exposed simultaneously using the second mask 380 for forming the lenses, so that the portion of the organic insulating film 370 where the contact hole 385 is being formed is exposed twice and thus is hollowed out deeper than the portion where the plurality of grooves 371 are formed, but the groove portion, i.e., the portions where the lenses are being formed is exposed shallower relative to the contact hole portion, so that the plurality of grooves 371 can be formed simultaneously with the contact hole 385 at the organic insulating film 370. Thus, since one work file allows two processes, an exposure time is saved by once loading time of the insulating substrate and mask and a time in which the lens exposure amount is subtracted from the full exposure amount, so that time and costs taken in performing the processes are saved to a large degree. Particularly, since the number of shoots per substrate is high in the small and middle sized reflection type LCDs such as hand-held terminals or LCD television receivers, for instance, the exposure time can be saved by 30% and more compared with that by the conventional art, totally the process time can be remarkably shortened.

Referring to FIG. 8C, as described previously, a metal layer having an excellent reflectivity such as aluminum (Al), nickel (Ni), chromium (Cr), silver (Ag), etc., is deposited on the resultant organic insulating film 370 including the contact hole 385 and then patterned to form a reflective electrode 390. In this case, the reflective electrode 390 is formed in a structure matched with the structure of the underlying organic insulating film 370 as aforementioned. Since processes forming the reflective electrode are the same as those of Embodiment 1 shown in FIGS. 6C and 6D, their descriptions would be omitted.

Embodiment 3

Figure 9:
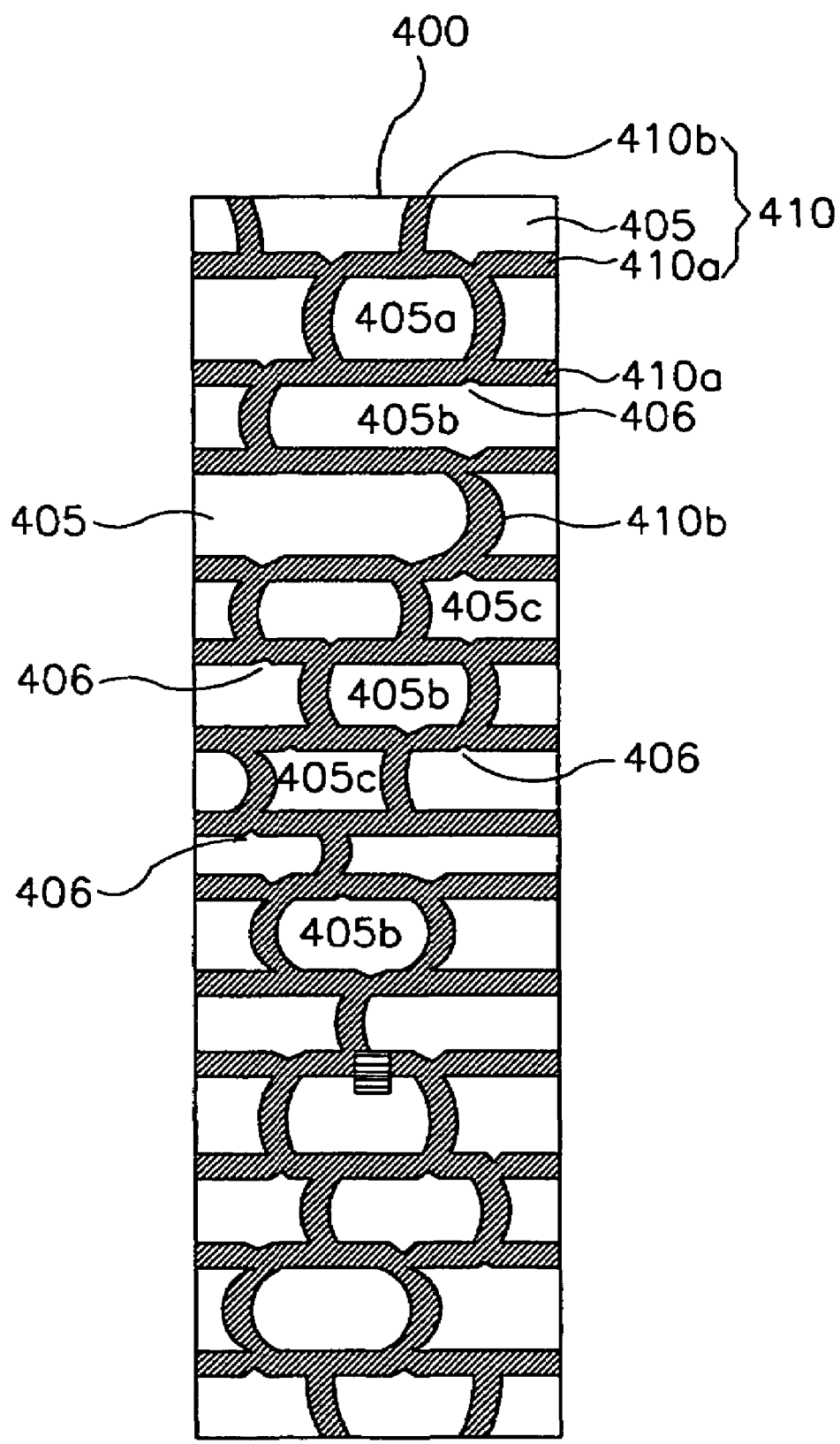
FIG. 9 is a plan view of a reflective electrode in accordance with a third embodiment of the present invention.
Figure 10A:
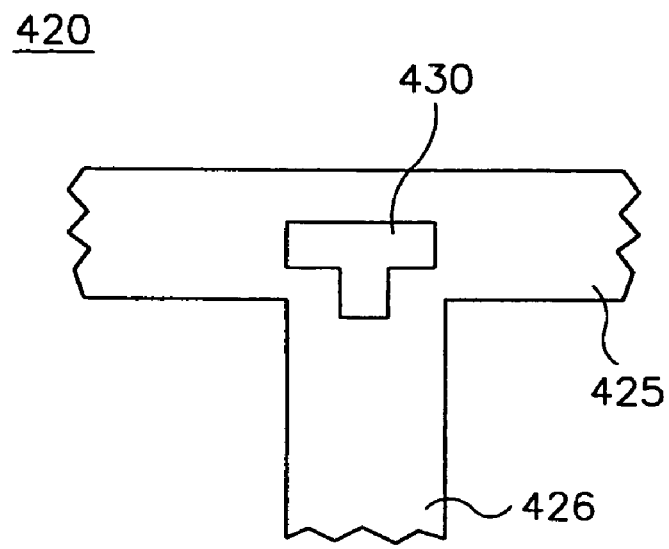
FIGS. 10A, 10B, 10C and 10D are partially enlarged views of a reflective electrode in accordance with a fourth embodiment of the present invention.
Figure 10B:
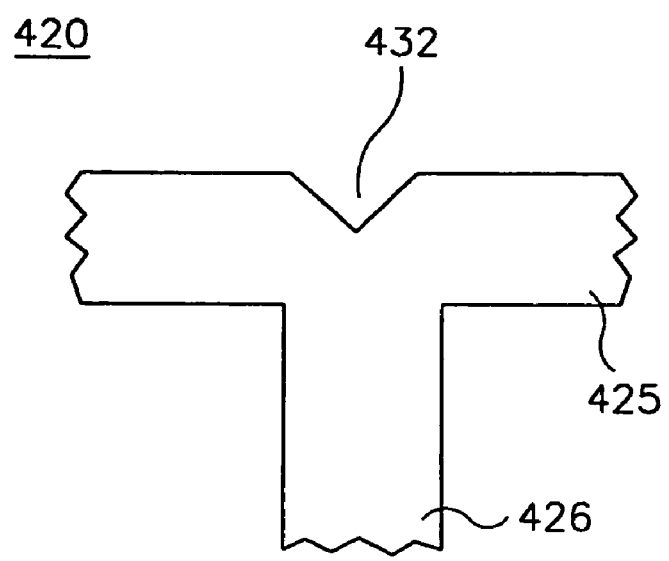
Figure 10C:
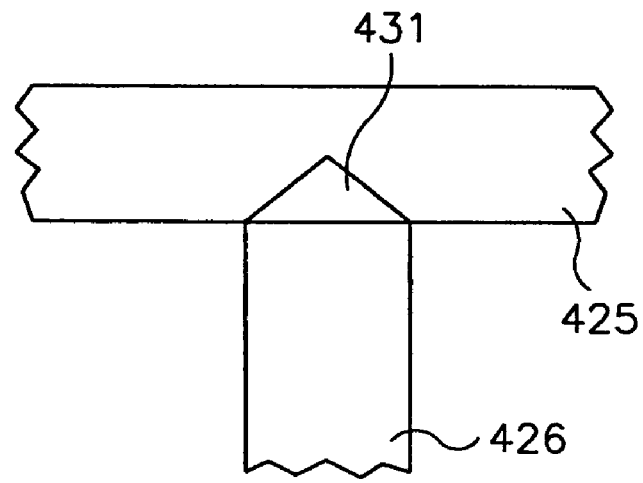
Figure 10D:
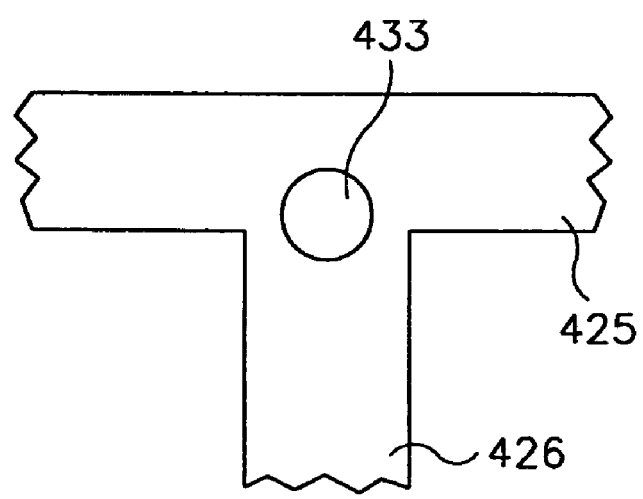

FIG. 9 is a plan view showing the pattern of a reflective electrode in accordance with the present embodiment. In the present embodiment, since elements other than the profile of the reflective electrode 400 and the profile of the organic insulating film deciding the shape of the reflective electrode 400 are the same as in Embodiment 1, their descriptions would be omitted.

Referring to FIG. 9, the pattern of the reflective electrode 400 in accordance with the present embodiment includes a plurality of first region portions 410 and a plurality of second region portions 405. The first region portions 410 have a plurality of first grooves 410a formed parallel to each other along the horizontal direction of the pixel and a plurality of second grooves 410b formed discontinuously along the vertical direction of the pixel. The second region portions 405 consist of a plurality of protruded portions surrounded by the first region portions 410 together with the boundary line of the pixel. The protruded portions 405a, 405b, 405c, etc. which form the second region portions 405 are defined by the plurality of grooves formed along the horizontal and vertical direction and thus have an island-like shape. A groove filling protrusion 406 is formed at a selected respective protruded portions 405a, 405b and 405c. The protruded portions of the second region portions 405 are largely divided into those which the groove filling protrusion is formed and those which the groove filling protrusion is not formed.

In the present embodiment, the shapes of the plurality of grooves, the plurality of protruded portions 405a, 405b, 405c and the groove filling protrusion 406 for forming the reflective electrode 400 are decided depending on the pattern of the mask for patterning the organic insulating film that is formed under the reflective electrode 400. In other words, FIG. 9 shows a pattern shape of the reflective electrode 400 but it can be also described as the pattern shape of the organic insulating film or the pattern shape of the mask for patterning the organic insulating film. As shown in FIG. 9, the mask also has patterns corresponding to the plurality of grooves and further includes groove filling patterns for forming the groove filling protrusions 406 at the crossing points of the first grooves 410a and the second grooves 410b.

In order to form the reflective electrode in accordance with the present embodiment, a process for exposing the underlying organic insulating film is performed in accordance with the process as in Embodiment 2 but the exposure process can be also performed in accordance with the process as in Embodiment 1.

The plurality of grooves composing the first region portions 410 that are recessed portions relative to the second region portions 405 have a width of approximately 2–5 μm respectively. These continuous grooves are irregularly arranged at a constant width along the horizontal direction of the pixel and are formed such that grooves formed along the vertical direction do not meet with an adjacent groove on a straight line in the vertical direction. In other words, the vertically arranged grooves crossing the protruded portions of the second region portions 405 are formed such that they do not meet each other in a straight line. Since the number of these grooves crossing the protruded portions of the second region portions 405 relate to the reflectivity in the horizontal and vertical directions, it varies depending on the size of the pixel but it is preferably approximately 0.5–5 per single horizontal line of a pixel. Also, the grooves arranged along the vertical direction and formed so as to cross the protruded portions are preferably in a hemispherical sectional shape. Since the shape of the vertically arranged grooves affects the reflectivity in all directions except for the vertical reflectivity of the reflective electrode 400, it is preferable to be shaped of hemisphere so as to show the same reflectivity with respect to the whole directions. However, in order for the reflective electrode 400 to show an asymmetrically high reflectivity along a specific direction, it is desirous to add a straight line component along a direction perpendicular to a desired direction. Also, the groove filling protrusions 406 extending from the protruded portions of the second region portions 405 are positioned at the crossing points of the vertically arranged second grooves 410b and the horizontally arranged first grooves 410a. These groove filling protrusions 406 allow the grooves formed at the organic insulating film to have a uniform depth during the exposure and developing process of the organic insulating film prior to the process for forming the reflective electrode 400. In other words, since the line width of the patterns at the crossing points where the horizontally arranged first grooves 410a meet with the vertically arranged second grooves 410b becomes relatively larger than that of the patterns at other portions, the crossing points portion is etched relatively deeper than other portions under the same exposure condition, a planar profile different from the mask pattern shape may be obtained. Accordingly, by forming the groove filling groove 406 together with the mask pattern during forming the mask pattern, an over-etch of the organic insulating film at the crossing points with respect to other portions is prevented to a certain degree, thereby forming grooves having uniform depths at the upper surface of the organic insulating film 370. In other words, the first region portions may be formed so as to have a uniform (or the same) depth.

The protruded portions 405a, 405b, 405c composing the second region portions have a track shape 405a, 405b or a concave lens shape 405c extending along the horizontal direction. However, although the protruded portions 405a, 405b, 405c have the same shape, they have different sizes within a range of approximately 4–20 µm. This can minimize the light interference reflected from the reflective electrode 400. In the present embodiment, as shown in FIG. 5B, the reflectivity of the reflective electrode 400 is more enhanced by forming grooves having a crater shape at the protruded portions 405a, 405b, 405c of the second region portions 405.

Embodiment 4

FIGS. 10A, 10B, 10C and 10D are enlarged plan views of a reflective electrode in accordance with a fourth embodiment of the present invention and show an enlarged picture of the crossing points of the horizontally arranged grooves and the vertically arranged grooves of the pixels. In the present embodiment, as a whole, the reflective electrode 420 preferably has the same shape as that disclosed in Embodiment 1 of the present invention. However, it may also have the same shape as in Embodiment 3. Since a process for forming the reflective electrode of the present embodiment is the same as in Embodiment 1 or Embodiment 2, its description would be omitted.

Figure 1:
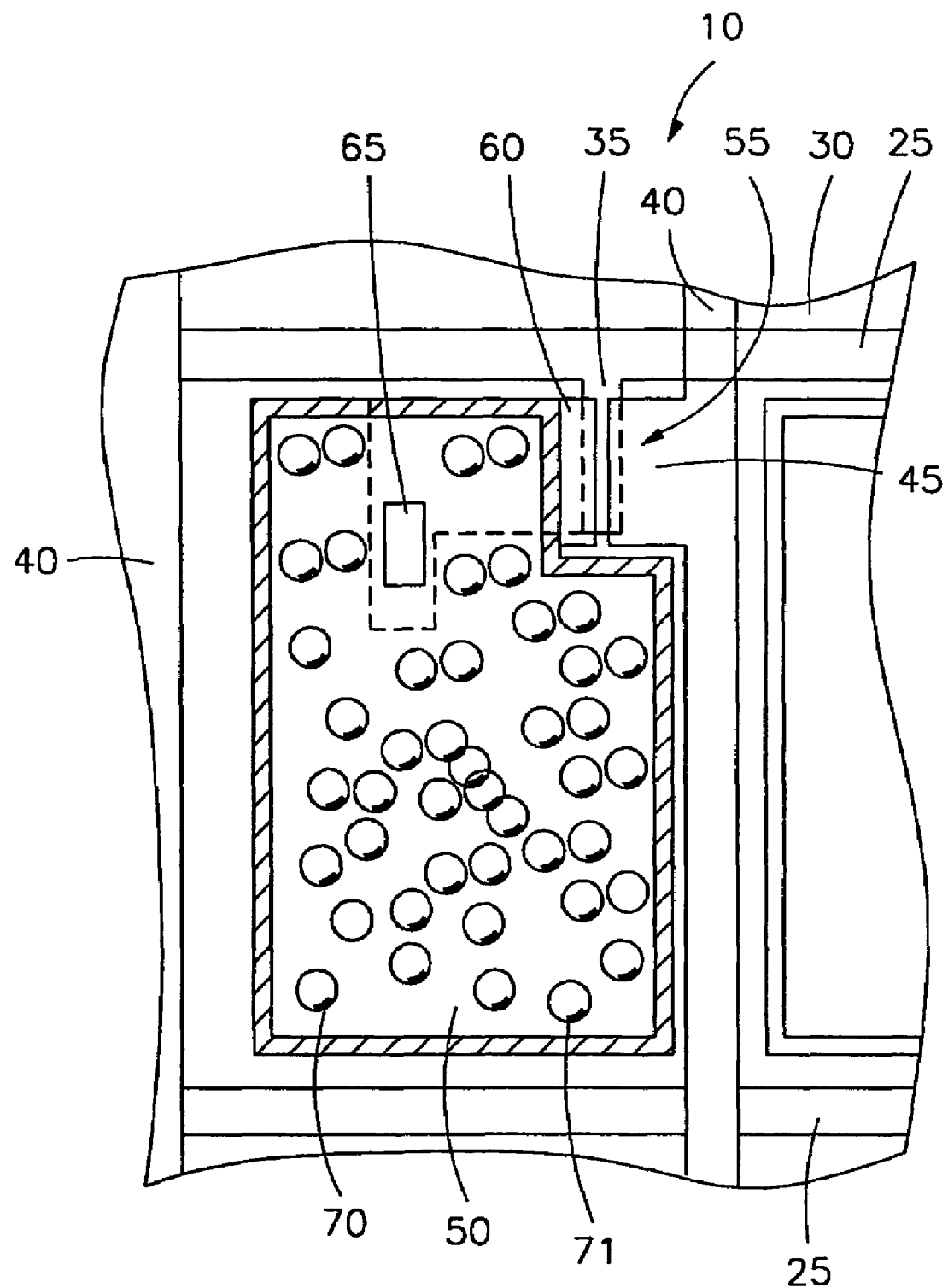
FIG. 1 is a partial plan view of a conventional reflection type LCD.
Figure 3A:
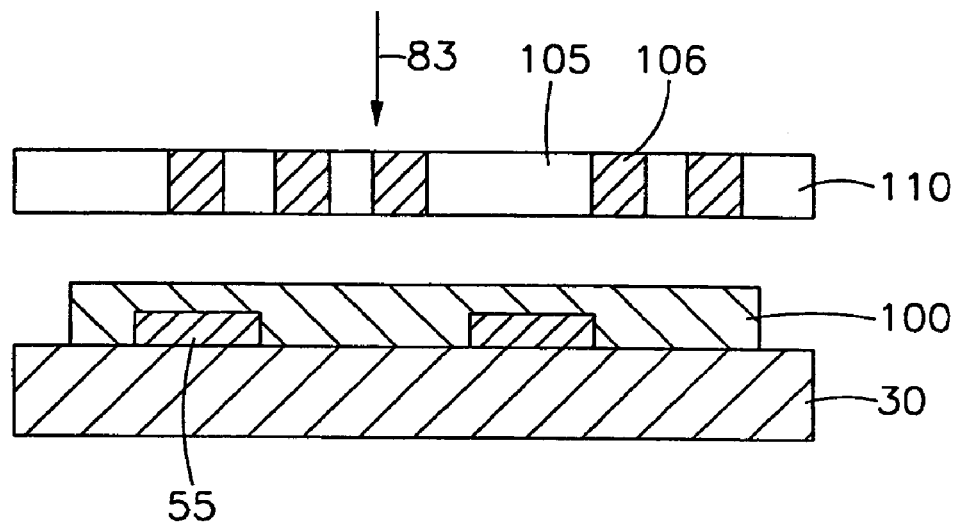
FIGS. 3A, 3B and 3C are sectional views illustrating a process for forming organic insulating film and reflective electrode in the LCD of FIG. 2.
Figure 3B:
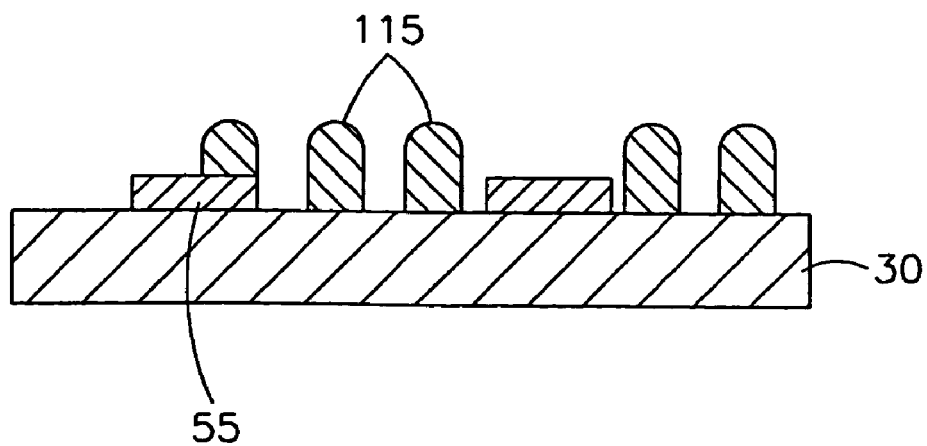
Figure 3C:
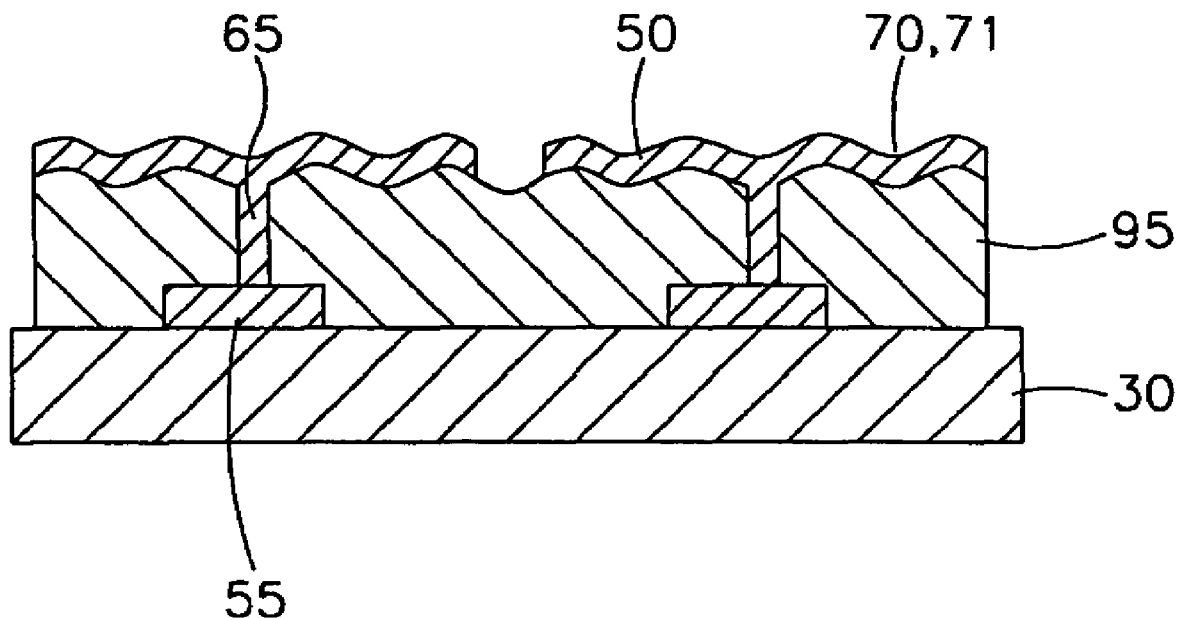

As shown in FIGS. 10A, 10B, 10C and 10D, within a portion where a horizontally arranged groove 425 crosses a vertically arranged groove 426 is formed a groove filling member 430, 431, 432, 433 such as T shape (FIG. 1A), a triangle shape (FIG. 10C), a circle shape (FIG. 10D) and an inverse triangle shape (FIG. 10B) which is formed at outer portion of the crossing point. These groove filling members 430, 431, 432, 433 are formed using a mask pattern that is used while exposing and developing the organic insulating film so as to form the reflective electrode 420. In other words, instead of the groove filling member 406 provided in Embodiment 3, a mask pattern is formed on the mask as shown in FIGS. 10A, 10B, 10C and 10D.

The groove filling member 430, 431, 432, 433 formed at the portion where the first horizontally arranged groove 425 crosses the second vertically arranged groove 426 allow the groove to be formed at the same depth as the groove filling member 430, 431, 432, 433 on the entire surface of the pixel after the organic insulating film is exposed and developed so as to form the reflective electrode 420. Generally, depths of the first groove 425 and the second groove 426 formed by the organic insulating film which are prepared under the same exposure amount and the same development condition relate to the width of the first and second grooves 425 and 426. In case where the first and second grooves 425 and 426 have a width of approximately 5 µm or less, the relationship of the depth of the first and second grooves 425 and 426 with respect to the width of the first and second grooves 425 and 426 more highly increases. Under an exposure amount of approximately 3,700 ms, experimental results of the depths of the first and second grooves 425 and 426 depending on the widths of the first and second grooves 425 and 426 are shown in the following Table 1.

TABLE 1

| Width of groove | 2 µm | 3 µm | 4 µm |
|---|---|---|---|
| Depth of groove | 2,100 Å | 8,700 Å | 10,600 Å |

Referring to Table 1, when the widths of the first groove 425 and the second groove 426 vary ranging 2 µm, 3 µm, 4 µm respectively, the depths of the first groove and the second groove change abruptly. To this end, the crossed portions of the first horizontally arranged groove 425 and the second vertically arranged groove 426 are more deeper than other portions and the reflective electrode 420 formed on the organic insulating film has the same problem as the organic insulating film. Thus, the orientation of a liquid crystal substance at the crossed portions is distorted, generating a domain as well as light leakage due to the deflection of the liquid crystal material. Also, since the light polarization is deformed to a large degree at such portions, an optical condition of liquid crystal. Changes, lowering the reflectivity of the reflective electrode as well as the contrast and picture quality of an image to a large degree. However, the present embodiment forms the groove filling members 430, 431, 432 and 433 having various shapes and a size of 1–3 µm at the crossed portion of the first horizontally arranged groove 425 of the reflective electrode 420 and the second vertically arranged groove 426 through a modification of the mask pattern, thereby resolving the aforementioned problems.

Embodiment 5

Figure 11:
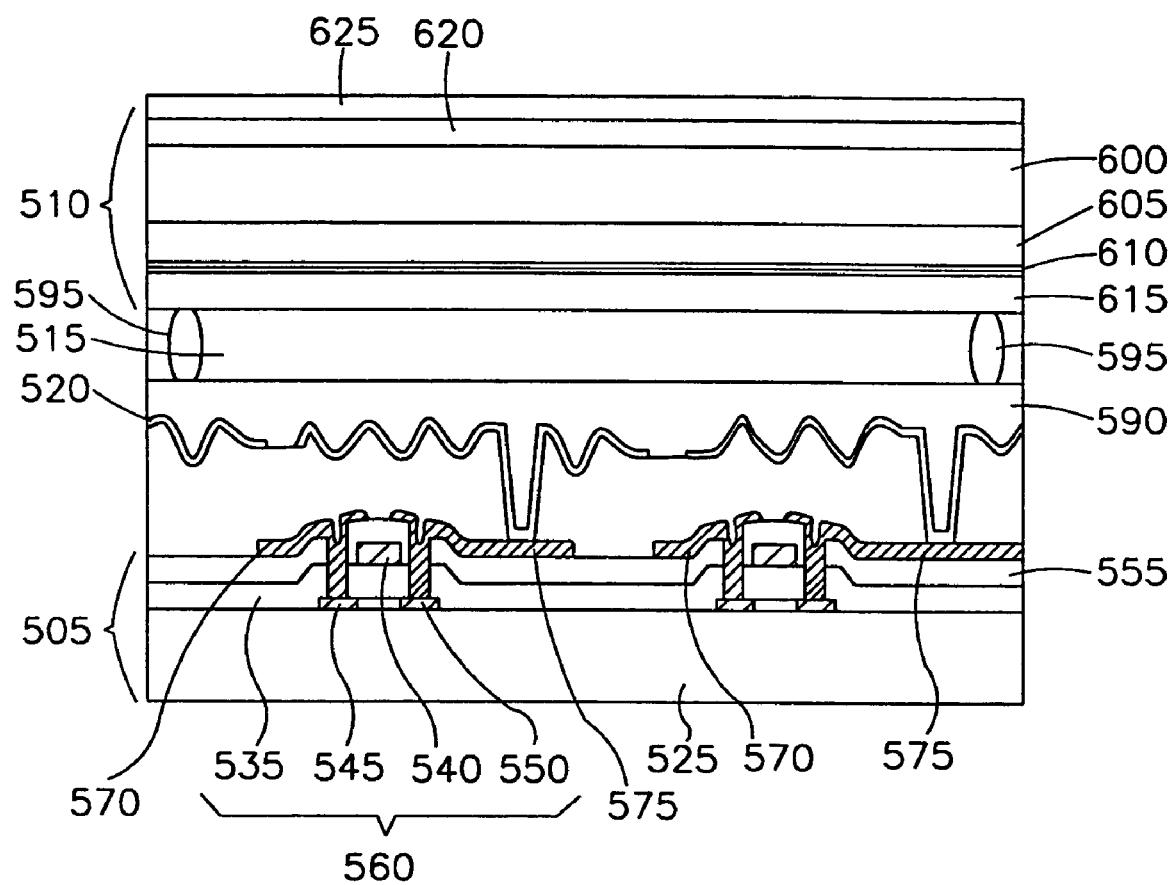
FIG. 11 is a sectional view of a reflective electrode in accordance with a fifth embodiment of the present invention.

FIG. 11 is a sectional view of a reflection type LCD in accordance with a fifth embodiment of the present invention. In the present embodiment, except a thin film transistor 560 formed on a first insulating substrate 525 and a method for forming the thin film transistor, the remaining elements of the reflective electrode and the method in accordance with the present embodiment are the same as in Embodiment 1.

Referring to FIG. 11, a reflection type LCD 500 in accordance with the present embodiment includes a first substrate 505, a second substrate facing the first substrate 510, a liquid crystal layer 515 interposed between the first substrate 505 and the second substrate 510 and a reflective electrode formed between the first substrate 505 and the liquid crystal layer 515.

The first substrate 505 includes a first insulating substrate 525 and a thin film transistor 560 formed on the first insulating substrate 525. The thin film transistor 560 includes a gate electrode 540, a source and drain region 545, 550 formed below the gate electrode 540, a gate insulating film 535 formed between the gate electrode 540 and the source and drain region 545, 550, an oxide layer 555 formed on the gate electrode 540, a source electrode 570 connected to the source region 545 and a drain electrode 575 connected to the drain region 550.

An organic insulating film 580 is formed on the entire surface of the first substrate 505 on which the thin film transistor is formed and continuously a reflective electrode 520 having a plurality of grooves and protruded portions is formed on the organic insulating film 580. The reflective electrode 520 in accordance with the present embodiment can have the same shapes as in Embodiment 1, Embodiments 3 and 4 depending on the mask pattern used. On the reflective electrode 520 is formed an orientation film 590.

The second substrate 510 includes a second insulating substrate 600. Beneath the second insulating substrate 600 are formed a color filter 605, a transparent common electrode 610 and a second orientation film 615 in the named order. On the second insulating substrate 600, are formed a phase difference plate 620 and a polarizing plate 625 in the named order. The liquid crystal layer 515 is formed between the first orientation film 590 formed on the first substrate 505 and the second orientation film 615 formed beneath the second substrate 510. Since these members are the same as in Embodiment 1, their detailed descriptions would be omitted.

Figure 12A:
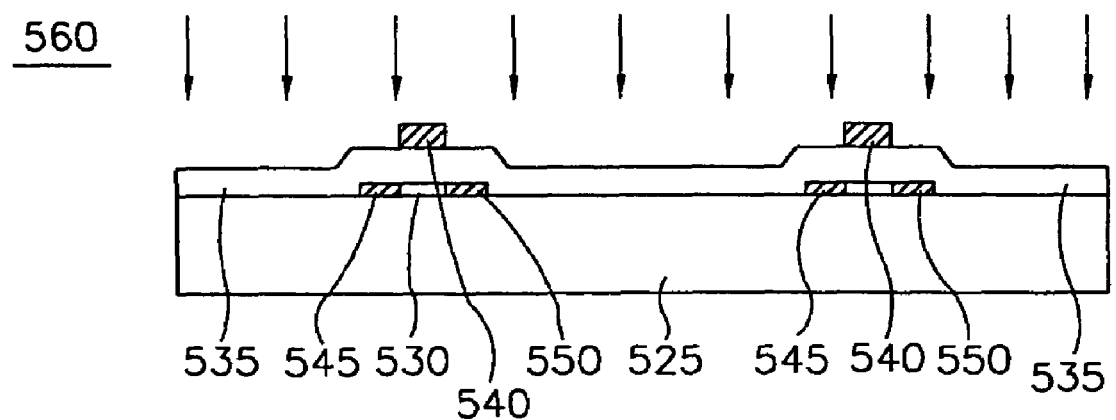
FIGS. 12A, 12B and 12C are sectional views illustrating a manufacturing process of the LCD shown in FIG. 11.
Figure 12B:
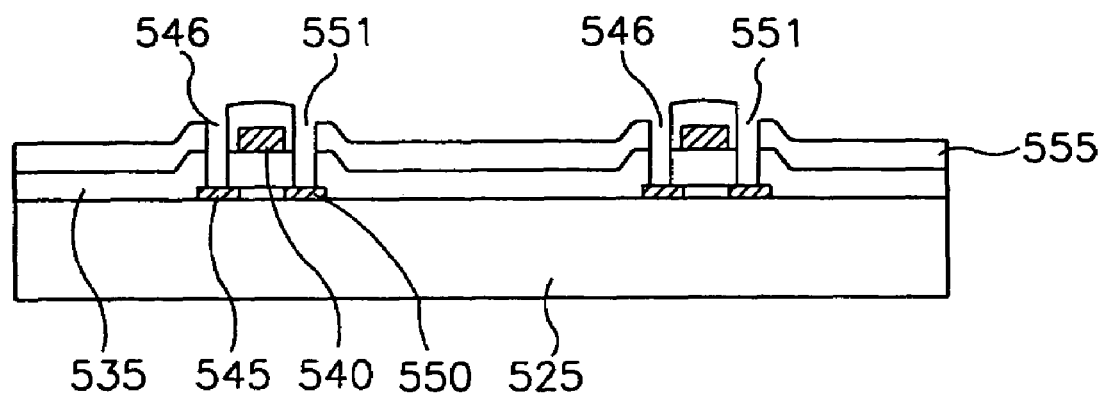
Figure 12C:
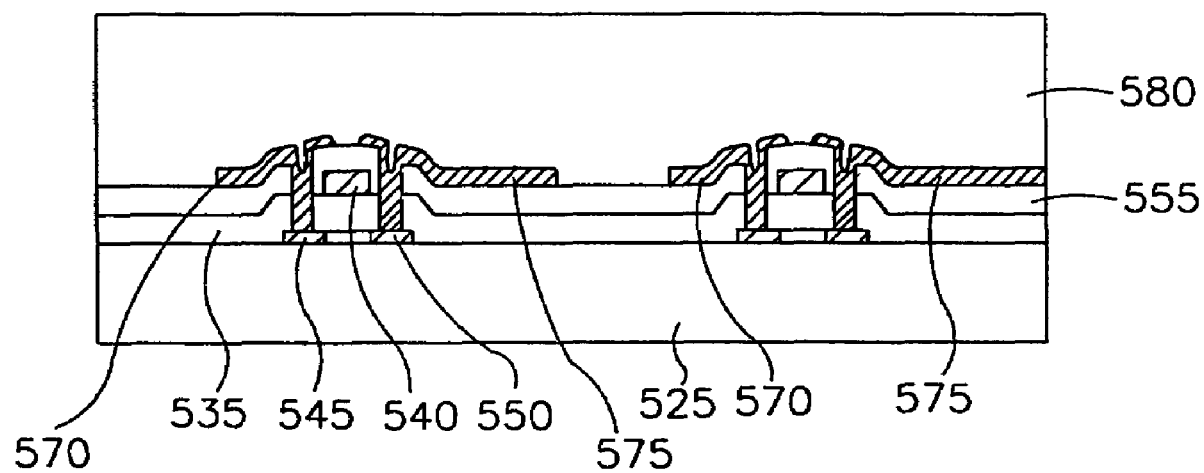

FIGS. 12A, 12B and 12C are sectional views for describing a manufacturing process of the reflection type LCD shown in FIG. 11.

Referring to FIG. 12A, polysilicon is deposited on an insulating substrate 525 of glass or ceramic and the like by a low pressure chemical vapor deposition method and is then patterned to thereby form a polysilicon layer 530 on the insulating substrate 525.

Thereafter, silicon nitride is deposited on the insulating substrate 525 on which the polysilicon layer 530 is formed, by a plasma chemical vapor deposition method, to thereby form a gate insulating film 535.

Afterwards, on the gate insulating film 535 is deposited a metal layer such as tantalum (Ta), titanium (Ti), molybdenum (Mo), aluminum (Al), chromium (Cr), copper (Cr), tungsten (W), etc. The deposited metal layer is then patterned to form a gate electrode 540 branched from a gate line.

Thereafter, P-typed ions are doped into the polysilicon layer 530 through an ion implantation process to thereby form a source region 545 and a drain region 550 for a thin film transistor 560. During the ion implantation process, the gate electrode 540 serves as a mask.

Referring to FIG. 12B, an oxide film 555 is deposited on the insulating substrate 525 on which the gate electrode 540 is formed and the deposited oxide film 555 and the underlying gate insulating film 535 are partially etched to thereby form openings 546 and 551 exposing the source region and drain region 545 and 550 for the thin film transistor 560.

While FIG. 12A and FIG. 12B show and describe the process for forming the N-channel thin film transistor, it is apparent that P-channel thin film transistor can be formed according to the same method. Also, a PMOS transistor can be formed on a substrate by the steps of forming an isolation film for defining active region and field region using the LOCOS (Local oxidation of silicon) process on the substrate of a P-type silicon wafer, forming a gate region of a conductive material such as an impurity-doped polysilicon on the active region, and forming a $P^+$ source region and drain region.

As shown in FIG. 12C, on the openings 546 and 551 and the oxide film 555 is deposited a metal layer such as tantalum (Ta), titanium (Ti), molybdenum (Mo), aluminum (Al), chromium (Cr), copper (Cr), tungsten (W), etc. Then, the deposited metal layer is patterned to form a source electrode 570 and a drain electrode 575. Thereafter, an organic insulating film 560 is coated on the entire surface of the resultant substrate to a thickness range of approximately 1–3 μm by a spin coating method using a photosensitive resist. Since the method for forming a reflection type LCD 500 including subsequent exposure and development process of the organic insulating film 580 and a process of forming a reflective electrode 520 is the same as in Embodiment 1, its description would be omitted.

Embodiment 6

As aforementioned, according to the reflection plate structure of the LCD provided by the inventors, while the reflection efficiency is enhanced by forming the first region portions surrounding the second region portions at a uniform depth, a region between boundary lines between a pixel and another pixel adjacent to the pixel is in a state that the region is not defined accurately.

Specifically, referring to FIG. 7B, when performing the exposure process using the mask 355, the pixel region is subject to the exposure process while the region between pixels is not exposed. Accordingly, in the underlying organic insulating film 280, there occurs a height difference between the pixel region (Pin) and an outer region of the pixel region (Pout).

The height difference does not allow a uniform rubbing effect during the rubbing process for maintaining the alignment of liquid crystal molecules at a constant level after manufacturing a LCD panel. Especially, since an outer portion placed beyond the boundary of the pixel is highly leveled, the rubbing is performed at a weak level at the start point of the rubbing process, generating a residual image of light leakage property or distortion of the liquid crystal orientation.

Also, in case where spacers are positioned at the outer portion placed beyond the boundary of the pixel and highly leveled in the step of dispersing the spacers prior to injecting liquid crystal, an interval between the first substrate and the second substrate is not constant and thus it is difficult to manufacture a stable LCD.

In addition, in the developing process for forming the first region portions and the second region portions at the organic insulating film, it is difficult to uniformly form the first region portions and the second region portions due to the existence of the boundary wall having a big height difference between pixels.

Moreover, the organic insulating film and the reflection plate or an upper plate and a lower plate are misaligned, the reflectivity becomes greater and thus it is difficult to obtain a uniform picture quality.

Accordingly, the present embodiment is presented in order to resolve the above-described drawbacks.

Figure 13A:
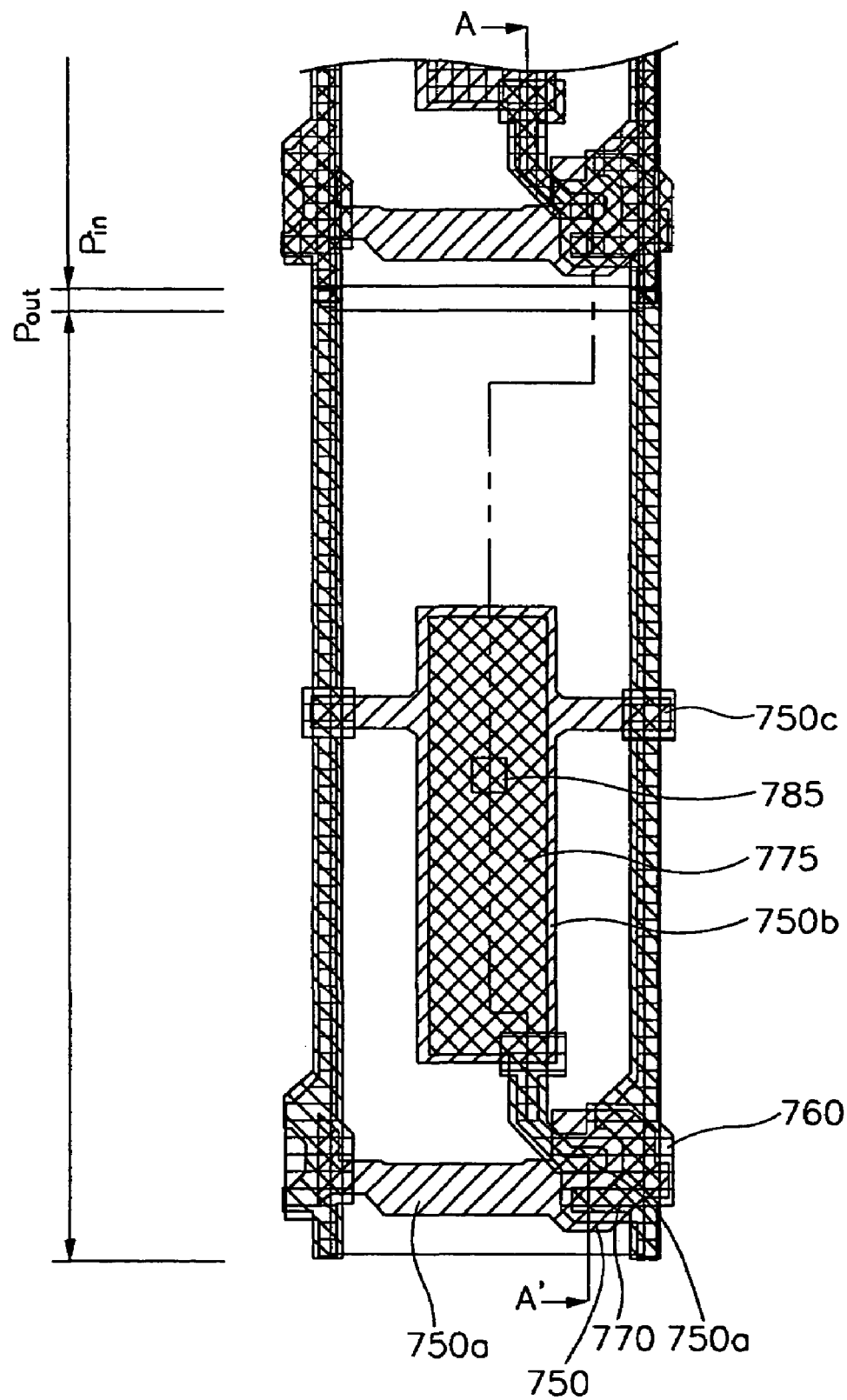
FIG. 13A is a plan layout of a reflection type LCD having a reflective electrode in accordance with a sixth embodiment of the present invention and FIG. 13B is a schematic sectional view taken along the line A–A'.
Figure 13B:
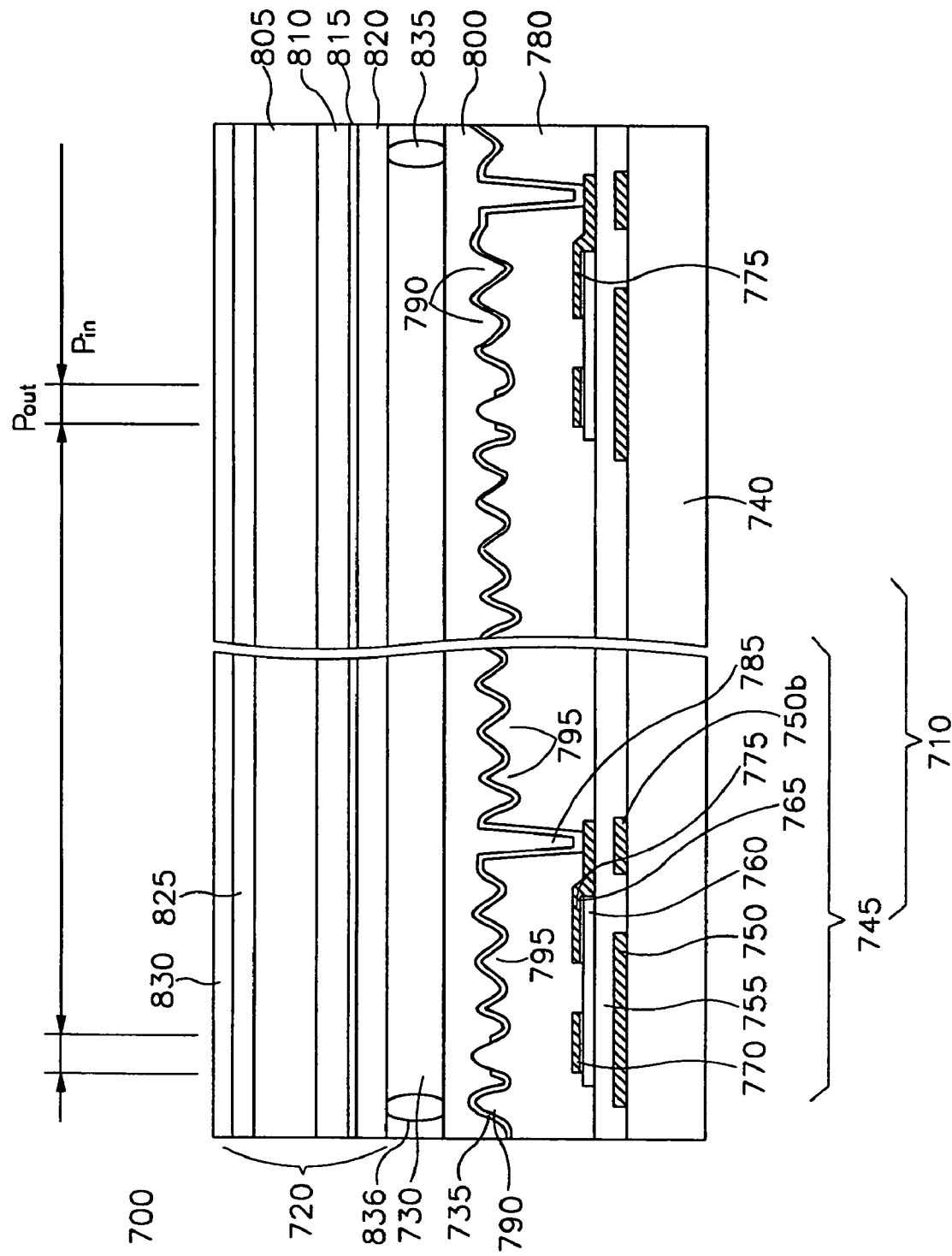

FIG. 13A is a plan layout of a reflection type LCD having a reflective electrode in accordance with a sixth embodiment of the present invention and FIG. 13B is a schematic view of a section face taken along the line A–A'.

Referring to FIG. 13A and FIG. 13B, a reflection type LCD 700 includes a first substrate 710 on which a pixel array is formed, a second substrate 720 disposed facing the first substrate, a liquid crystal layer 730 formed between the first substrate 710 and the second substrate 720 and a reflective electrode 735 as the pixel electrode formed between the first substrate 710 and the liquid crystal layer 730.

The first substrate 710 includes a thin film transistor 745 as the switching device formed on the first insulating substrate 740.

The first substrate 740 is made of non-conductive material, for instance, glass or ceramic and the like. The thin film transistor 745 includes a gate electrode 750 formed from a gate line 750a, a gate insulating film 755, a semiconductor layer 760, an ohmic contact layer 765, a source electrode 770 and a drain region 775. Also, beneath the drain electrode 775 and at the same time on the first insulating substrate 740 is formed a storage electrode 750b which is formed parallel to the gate line 750a.

The gate electrode 750 is formed branched from a gate line (not shown in the drawings) on the first insulating substrate 740 and has a double-layered structure consisting of a lower layer of chromium (Cr) and an upper layer of aluminum (Al).

The gate insulating film 755 of silicon nitride ($Si_xN_y$) is stacked on the entire surface of the first insulating substrate 740 on which the gate electrode 750 is formed. On the gate insulating film 755 beneath which the gate electrode 750 is disposed are subsequently formed the semiconductor layer of amorphous silicon and the ohmic contact layer 765 of $n^+$ amorphous silicon.

The source electrode 770 and the drain electrode 775 are formed on the ohmic contact layer 765 and the gate insulating film centering the gate electrode 750, thereby completing the thin film transistor 745. The source and drain electrodes 770 and 775 are of metal such as tantalum (Ta), molybdenum (Mo), titanium (Ti), chromium (Cr), etc.

On the first insulating substrate 740 on which the thin film transistor 745 is formed is stacked an organic insulating film 780 of a material such as resist. A plurality of first region portions (or grooves) and a plurality of second region portions (or protruded portions) having a height different relative to the first region portions are formed at the pixel region of the organic insulating film 780 for the purpose of light scattering. Also, the first region portions and the second region portions both of which are formed at the pixel region are formed extending to the outer region (Pout) placed between the pixel regions. The organic insulating film 780 includes a contact hole 785 exposing a portion of the drain electrode 775 of the thin film transistor 745.

On the contact hole 785 and the organic insulating film 780 is formed the reflective electrode 735. The reflective electrode 735 is connected to the drain electrode 775 through the contact hole 785 and thus the thin film transistor 745 is electrically connected with the reflective electrode 735.

On the reflective electrode 735 is stacked a first orientation film 800.

The second substrate 720 facing the first substrate 710 includes a second insulating substrate 805, a color filter 810, a common electrode 815, a second orientation film 820, a phase difference plate 825 and a polarizing plate 830.

The second insulating substrate 805 is also made of glass or ceramic. The phase difference plate 825 and the polarizing plate 830 are disposed in the named order on the second insulating substrate 805. The color filter 810 is disposed below the second insulating substrate 805. The common electrode 815 and the second orientation film 820 are formed in the named order below the color filter 810, thus completing the second substrate 720. The second orientation film 820 pre-tilts liquid crystal molecules of the liquid crystal layer 730 by a selected angle together with the first orientation film 800.

Between the first substrate 710 and the second substrate 720 are interposed spacers 835 and 836 to form a space between them. The liquid crystal layer 730 is formed at the space between the first substrate 710 and the second substrate 720, thereby completing the reflection type LCD in accordance with the present embodiment.

Hereinafter, a method for manufacturing the reflection type LCD in accordance with the present embodiment will be described with reference to the accompanying drawings.

FIGS. 14A, 14B, 14C and 14D are sectional views for describing a manufacturing process of the reflection type LCD shown in FIGS. 13A and 13B. Throughout FIGS. 14A, 14B, 14C and 14D, the same elements are designated by the same reference numerals.

Figure 14A:
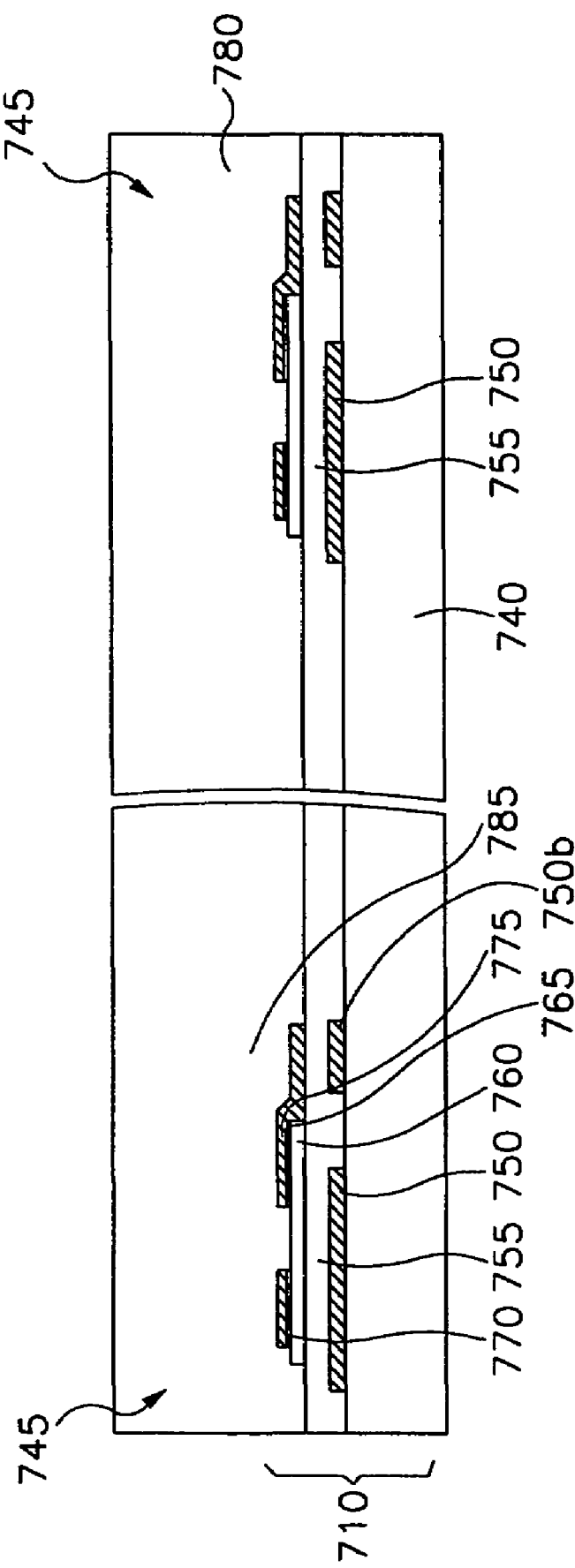
FIGS. 14A, 14B, 14C and 14D are sectional views illustrating a manufacturing process of the reflection type LCD shown in FIGS. 13A and 13B.

Referring to FIG. 14A, on a first insulating substrate 740 of glass or ceramic is deposited a metal layer such as tantalum (Ta), titanium (Ti), molybdenum (Mo), aluminum (Al), chromium (Cr), copper (Cu), tungsten (W), etc. Then, the deposited metal layer is patterned to form a gate line 750a, a gate electrode 750 branched from the gate line 750a and a storage electrode line 750c including a storage electrode 750b. At this time, the gate electrode 750 and the gate line 750a may be comprised of an alloy of Al—Cu or Al—Si—Cu. Thereafter, silicon nitride is deposited on the entire surface of the first insulating substrate 740 including the gate electrode 750 by a plasma chemical vapor deposition method and thus a gate insulating film 755 is formed.

On the gate insulating film 755 are subsequently formed an amorphous silicon film and in-situ-doped $n^+$ amorphous silicon film by a plasma chemical vapor deposition method. Thereafter, the amorphous silicon film and in-situ-doped $n^+$ amorphous silicon film are patterned to form a semiconductor layer 760 and an ohmic contact layer 765 on the gate insulating film 755 on which the gate electrode 750 is placed.

Subsequently, a layer of metal such as tantalum (Ta), titanium (Ti), molybdenum (Mo), aluminum (Al), chromium (Cr), copper (Cu), tungsten (W), etc. is formed. Then, the deposited metal layer is patterned to form a source line (not shown) perpendicular to the gate line, a source electrode 770 branched from the source line and a drain electrode 775. Thus, a thin film transistor 745 including the gate electrode 750, the semiconductor layer 760, the ohmic contact layer 765, the source electrode 770 and the drain electrode 775 is completed. At this time, the gate insulating film 755 is interposed between the gate line and the source line, thereby preventing the gate line from contacting the source line.

Next, a photoresist film is deposited on the first insulating substrate 740 on which the thin film transistor 745 is formed, to a thickness of approximately 1–3 μm by a spin coating method and thus an organic insulating film 780 is formed to thereby complete the first substrate 710. At this time, the organic insulating film 780 is comprised of, for example, an acryl resin containing a PAC (Photo-active compound), etc.

Figure 14B:
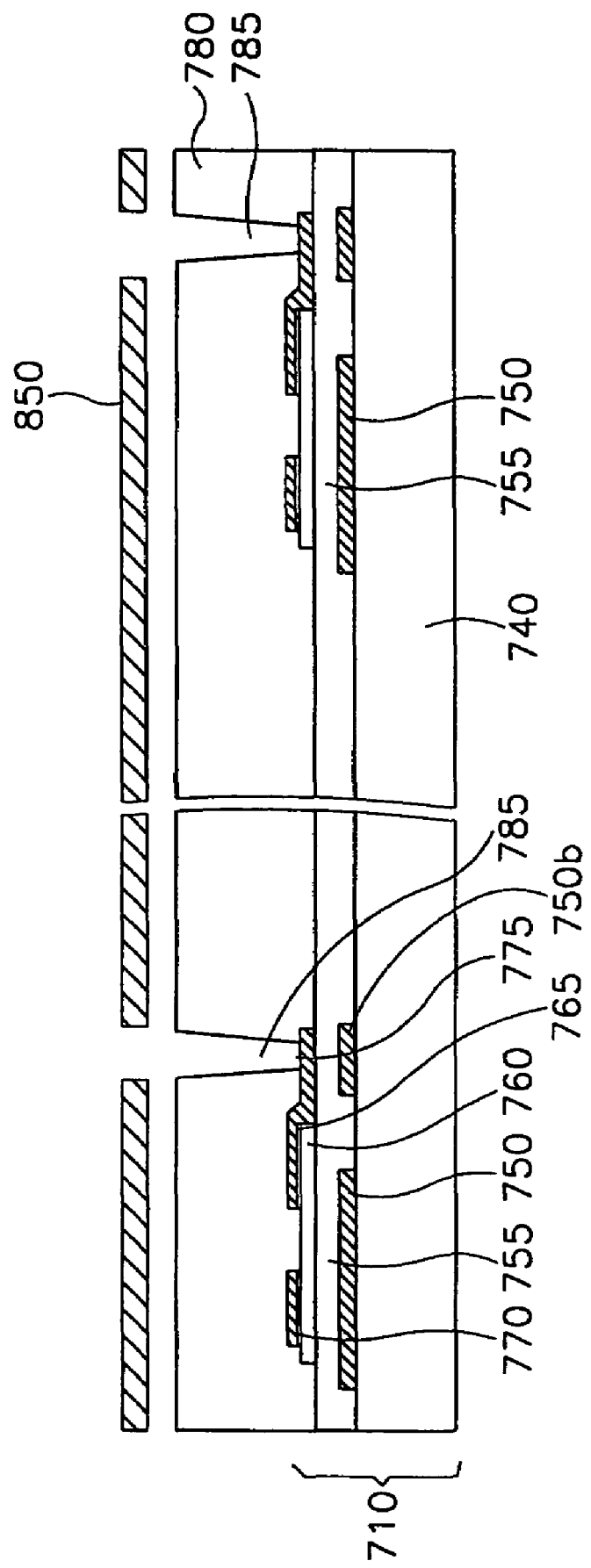
Figure 14C:
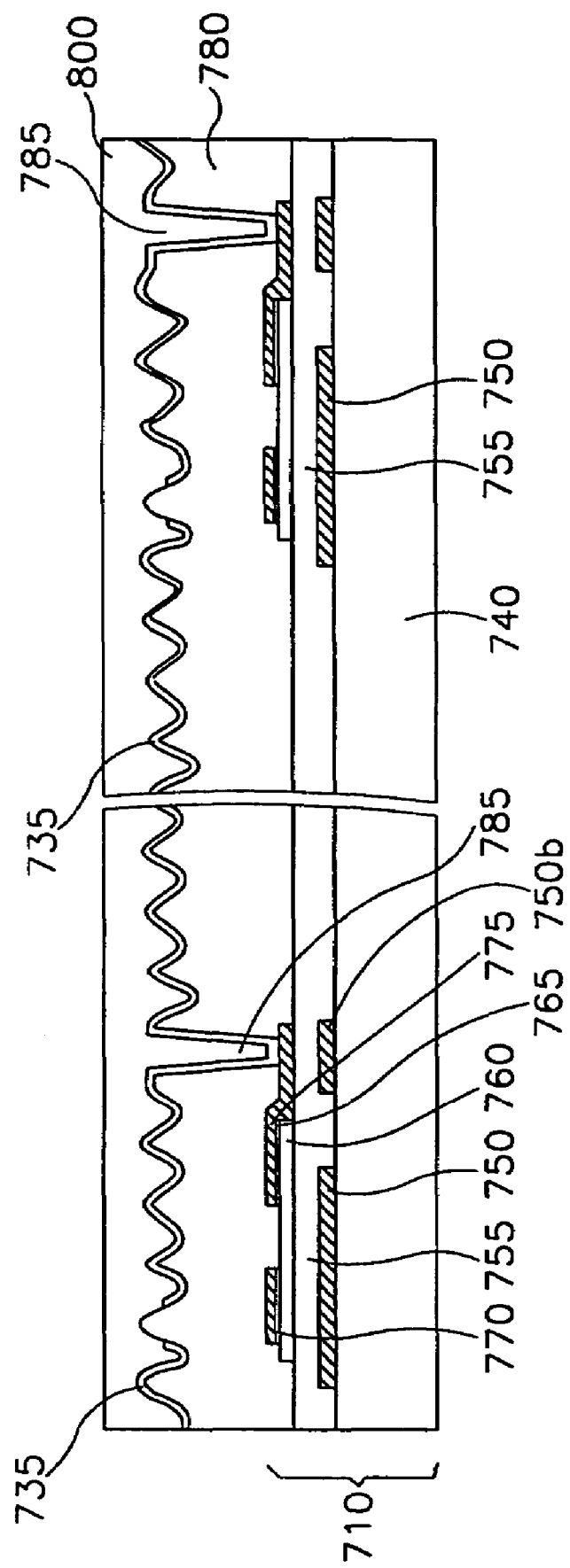

Referring to FIG. 14B, a first mask 850 is aligned over the organic insulating film 780 to form a contact hole 785 and then the organic insulating film is patterned through an exposure and development process to thereby form the contact hole 785 partially exposing the drain electrode 775 and a plurality of grooves.

Next, there is in detail described a process for forming the contact hole 785 and the plurality of grooves at the upper surface of the organic insulating film 780.

Figure 15A:
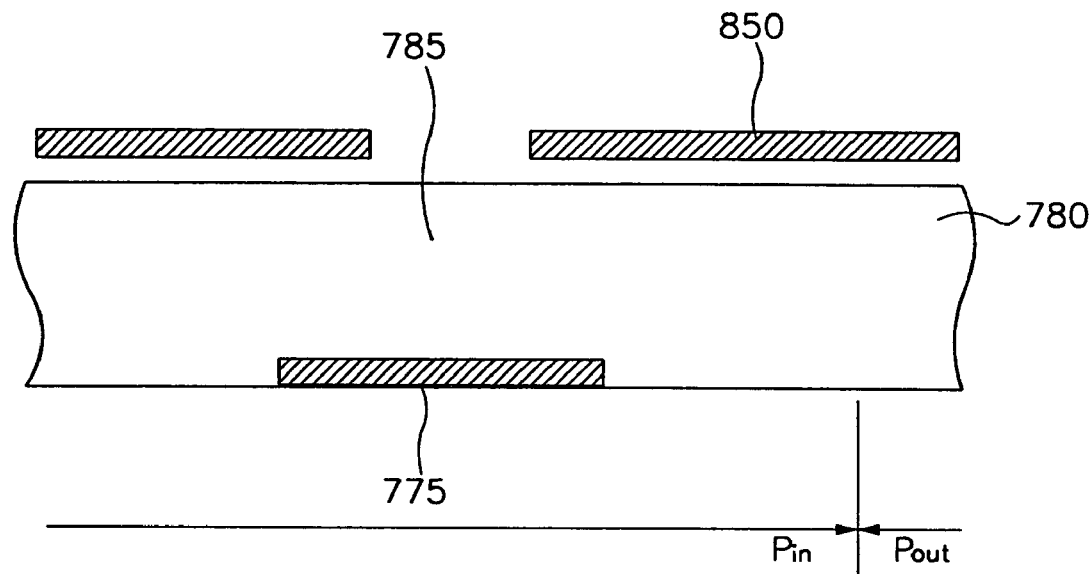
FIGS. 15A and 15B are sectional views particularly illustrating the steps of forming the contact hole and the plurality of grooves at the upper surface of the organic insulating film.
Figure 15B:
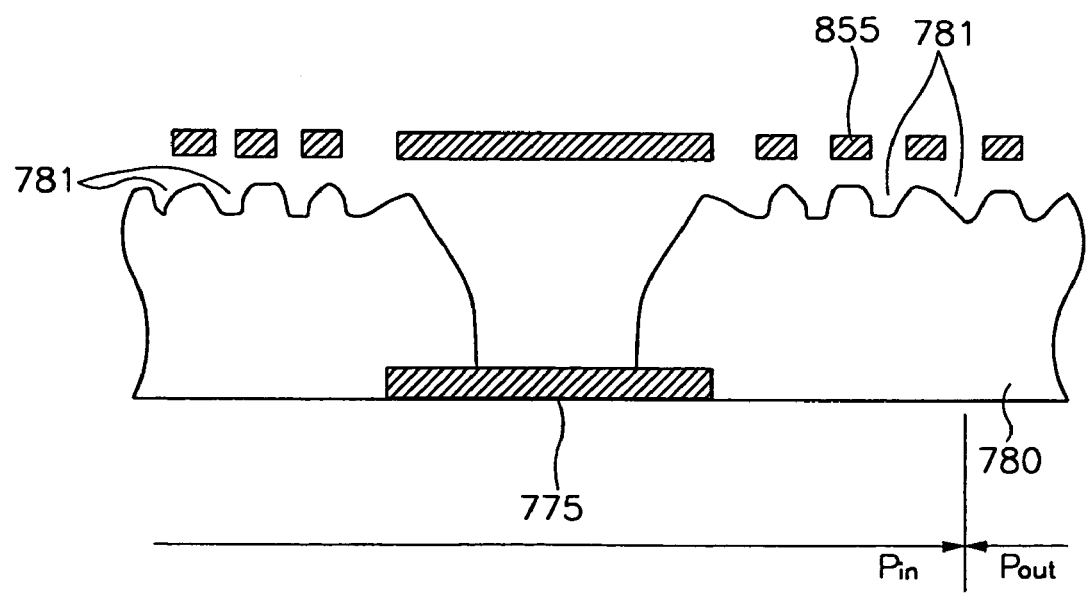

FIGS. 15A and 15B are sectional views specifically showing a process of forming the contact hole and the plurality of grooves at the upper surface of the organic insulating film.

Referring to FIGS. 15A and 15B, a first mask 850 is aligned over the organic insulating film 280 so as to form the contact hole 785 at the organic insulating film 780 of resist. The first mask 850 has a pattern corresponding to the contact hole 785. Afterwards, the organic insulating film 780 is subject to a first full exposure process to thereby expose a portion of the organic insulating film 780 placed on the source/drain electrode 775 to light.

Thereafter, in order to form a plurality of grooves 781 at the organic insulating film 780, a second mask 855 having a pattern corresponding to the grooves 781 and for forming micro lens is aligned over the organic insulating film 780.

Figure 16:
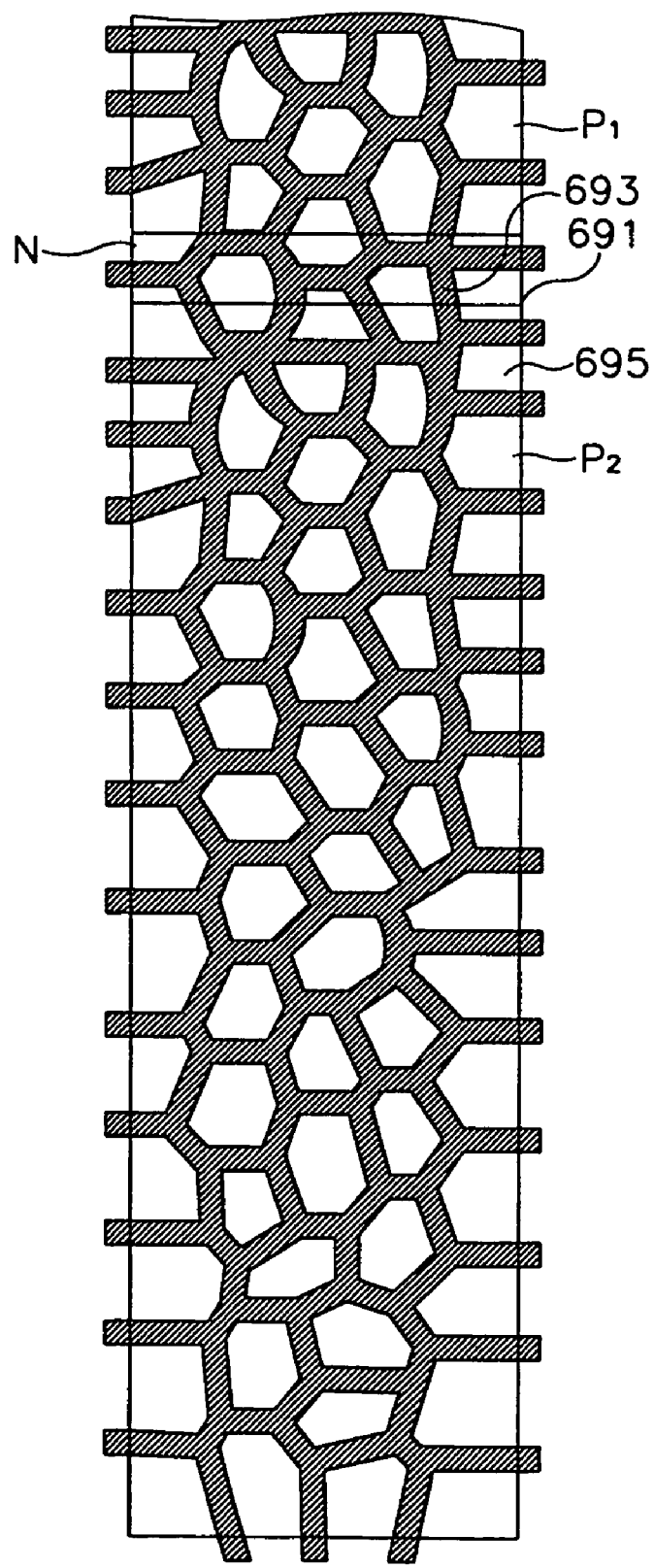
FIG. 16 is a plan view showing a layout of a pattern formed on the second mask.

FIG. 16 is a plan view showing a layout of a pattern formed on the second mask 855.

In the second mask 855 shown in FIG. 16 a pattern for forming the second region portions extends to an outer region placed between pixels beyond the boundary line 691 of a unit pixel.

More particularly, referring to FIG. 16, the pattern of the second mask 855 for forming the reflective electrode within the pixel is divided into first region portions 693 and second region portions 695 having a height difference relative to the first region portions 693 within the boundary 691 of the pixel. The first region portions 693 are formed such that they surround the second region portions 695 in the form of a closed loop. Here, the first region portions 693 have a constant width. The first region portions 693 are formed in the shape of a groove having a height lower than the second region portions 695 relatively and the second region portions 695 are formed in the shape of protruded portion having a height higher than the first region portions 693 relatively such that the second region portions 695 serve as micro lenses. Thus, by forming the first region portions at a constant width, the reflection efficiency is enhanced, improving the image quality of the LCD.

The second mask 855 is, as shown in FIG. 16, manufactured by forming a mask pattern corresponding to the first region on a transparent substrate.

As shown in the figure, a mask pattern corresponding to the first regions is formed at the inner region (Pin) of the pixel and is designed to define the first regions and second regions of the reflective electrode as described above. In the present embodiment, the mask pattern corresponding to the first regions is formed extending from the inner region (Pin) of the pixel to an outer region of the pixel which is a region between the pixels.

The second mask 855 may have a pattern having a shape opposite to the pattern shown depending on the resist type.

Using this second mask 855, the remaining portion of the organic insulating film 780 except for the contact hole portion 785 is exposed to the light through a second exposure process.

Afterwards, the organic insulating film 780 is subject to a developing process and thereby the contact hole 785 exposing the source/drain electrode 775 is formed at the organic insulating film 780 and the plurality of irregular grooves 781 are formed at the upper surface of the organic insulating film 780.

As shown in FIG. 15B, the plurality of irregular grooves 781 formed at the inner region of the pixel are also uniformly formed at the outer region (Pout) of the pixel between the pixels.

Returning to FIG. 14C, as aforementioned, after a metal layer such as aluminum (Al), nickel (Ni), chromium (Cr), silver (Ag), etc., having a good reflectivity is deposited, the deposited metal layer is patterned to a predetermined pixel form to form the reflective electrode 735. Subsequently, a resist is coated on the reflective electrode 735 and is then rubbing-treated to form the first orientation film 800 for pre-tilting liquid crystal molecules of the liquid crystal layer by a predetermined angle. The reflective electrode 835 has the same shape as the upper surface of the organic insulating film 780.

The reflective electrode 735 is divided into first region portions 790 and second region portions 795. The first region portions 790 consists of a plurality of grooves formed at the groove 781 of the organic insulating film 780 and the second region portions 795 consists of a plurality of protruded portions, which are micro lens region. At this time, the first region portions 790 consist of continuous grooves and are leveled at a place lower relative to the second region portions 795 which correspond to the protruded portions and the second region portions 795 are surrounded by the first region portions 790, so that the reflective electrode 735 has a structure defined by the first region portions 790 of the continuous grooves.

In the present embodiment, the plurality of grooves of the first region portions 790 of the reflective electrode 735 have a width of 2–5 μm and the plurality of protruded portions of the second region portions 795 have a size of approximately 4–20 μm, respectively.

Figure 14D:
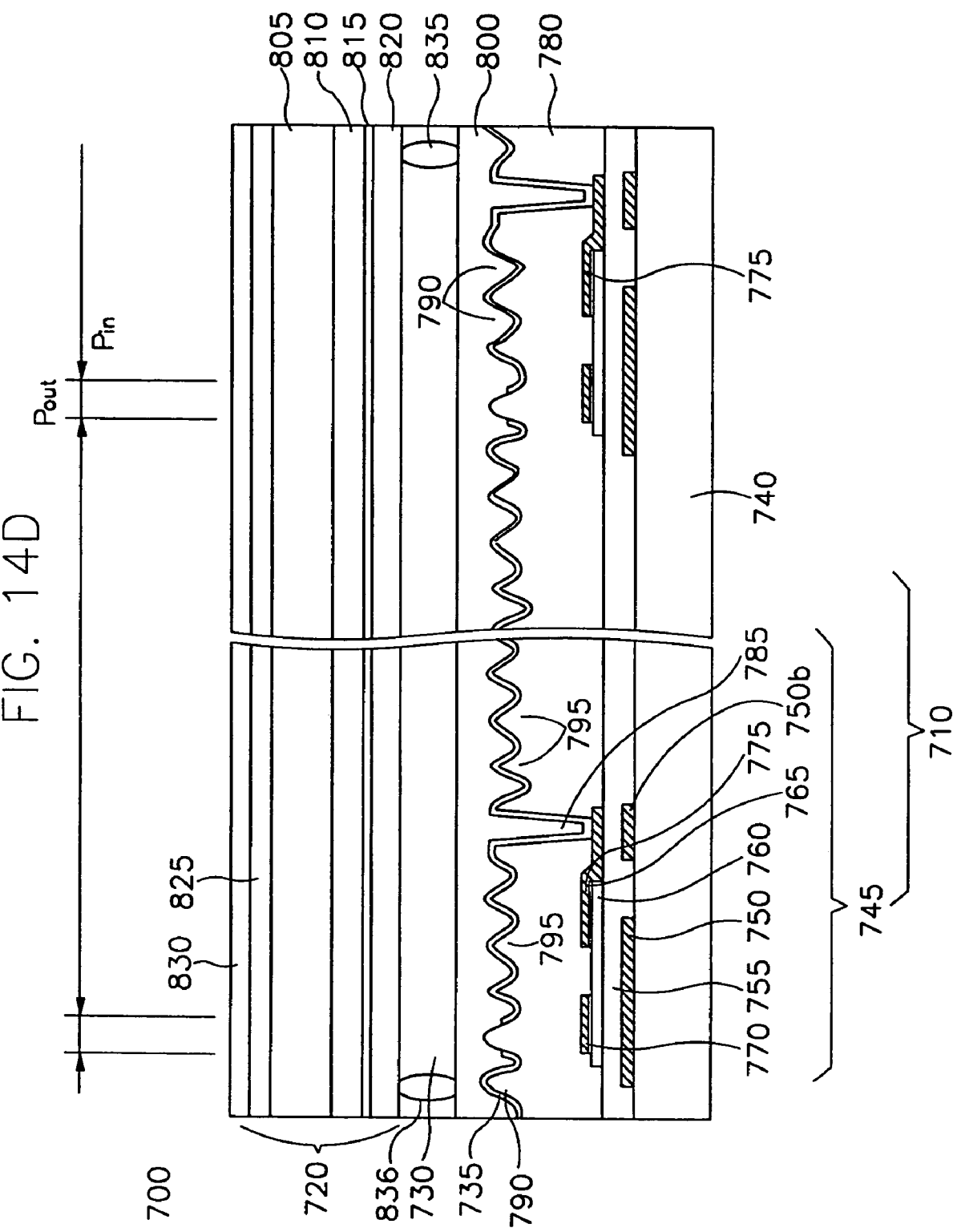

Referring to FIG. 14D, on the second insulating substrate 805 are subsequently formed the color filter 810, the transparent common electrode 815 and the second orientation film 820, thereby completing the second substrate 720. Then, the second substrate 720 is arranged facing the first substrate 710. Thereafter, the first substrate 710 and the second substrate 720 are attached to each other with the spacers interposed between the first substrate 710 and the second substrate 720, so that a certain space is formed between them. Subsequently, a liquid crystal material is injected into the space between the first substrate 710 and the second substrate 720 using a vacuum injection method and thus the liquid crystal layer 730 is formed, thereby completing the reflection type LCD 700 in accordance with the present embodiment. Also, if necessary, the polarizing plate 830 and the phase difference plate 825 may be formed on the entire surface of the second substrate 720. Although not shown in the drawings, black matrix may be disposed between the second insulating substrate 805 and the color filter 810.

FIGS. 17A, 17B, 17C, 17D and 17E are plan views showing mask patterns for forming a reflective electrode in accordance with another embodiments of the present invention.

Figure 17A:
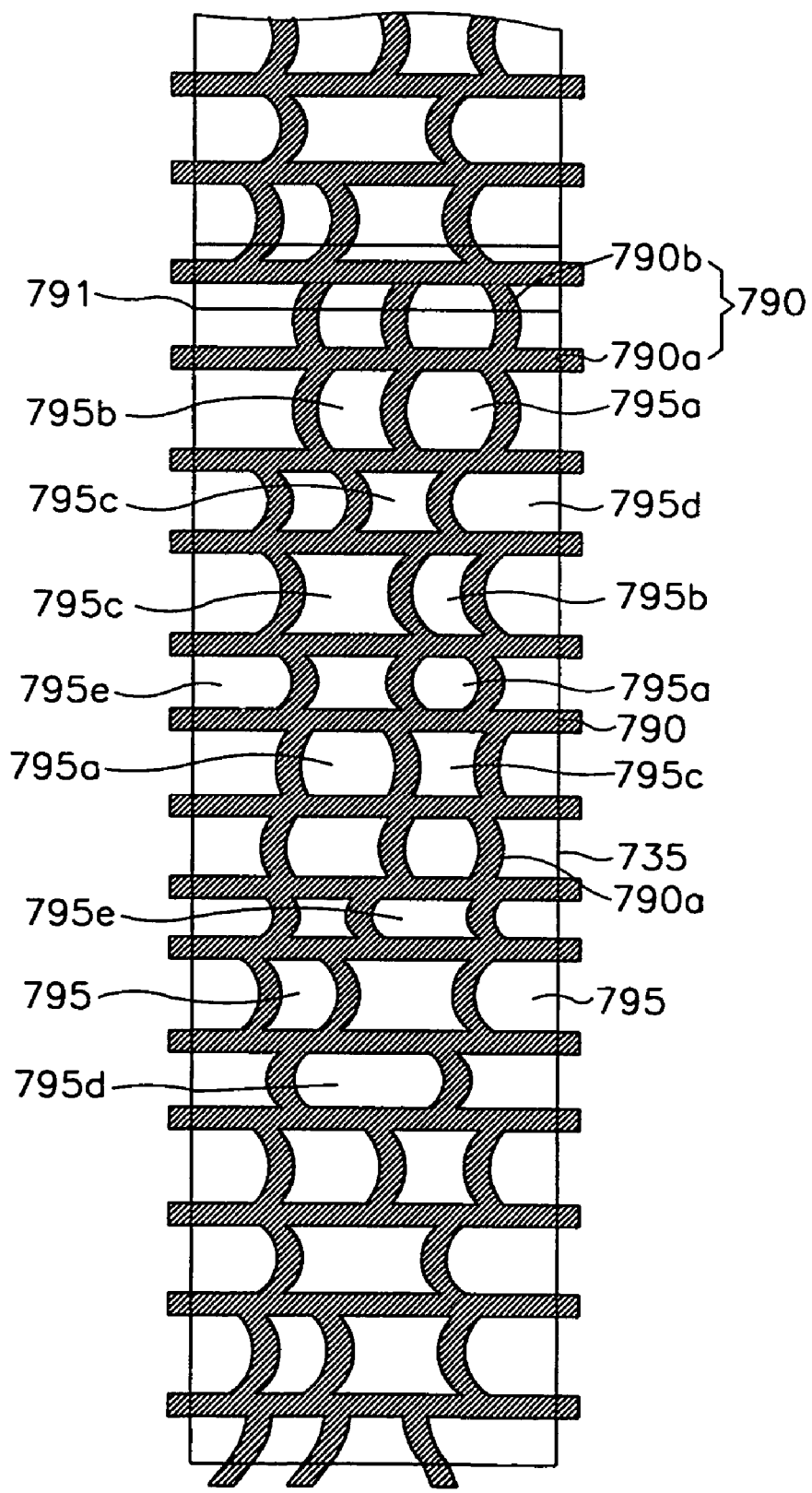
FIGS. 17A, 17B, 17C, 17D and 17E are plan views showing mask patterns for forming a reflective electrode in accordance with another embodiments of the present invention.

First, the mask pattern shown in FIG. 17A is similar to that of FIG. 5A except for that a pattern for forming the second region portions extends to an outer region placed between the pixels beyond the boundary of the pixel.

The mask pattern of FIG. 17A is to form the reflective electrode and is designed such that a selected direction has higher reflectivity than other directions. The reflective electrode manufactured using a mask having the mask pattern shown in FIG. 17A includes a plurality of first region portions 790 and a plurality of second region portions 795 having a height difference relative to the first region portions 790. The second region portions 795 are characterized in that a first total sum in first length components arranged along a second direction (or horizontal direction) perpendicular to a first direction (or vertical direction) is greater than a second total sum in second length components arranged along the first direction perpendicular to the second direction such that the second regions have higher reflectivity in the first direction relative to the second direction. For instance, the first region portions 790 are in a groove shape having a height lower relative to the second region portions 795 and the second region portions 795 are in a protruded shape having a height higher relative to the first region portions 790. To the contrary, it is also possible that the first region portions 790 are in a protruded shape higher than the second region portions 795 and the second region portions 795 are in a recess shape lower than the first region portions 790.

The first region portions 790 include a plurality of first grooves 790a formed continuously along the horizontal direction. A plurality of second grooves 790b are formed discontinuously along the vertical direction between the first grooves 790a adjacent to each other. In the drawing, while the second grooves 790b are formed in the form of an arc such that the light can be reflected toward another direction other than the first and second direction, they can be formed in an arbitrary shape such as a straight line shape, a ring shape, etc.

It is preferable that the second grooves 790b are formed in such a manner that any grooves among the second grooves 790b do not meet in a straight line with an adjacent groove arranged along the vertical direction. Preferably, the number of the second grooves formed along the vertical direction is about 0.5 to 5 every a single horizontal line of the unit pixel.

The second region portions 795 are comprised of a plurality of protruded portions functioning as micro lens. In other words, the first region portions 790 consisting of continuous recesses in the reflective electrode 735 are leveled to a certain depth at a lower place relative to the second region portions 795 protruded. Also, the second region portions 795 consisting of protruded portions relative to the first region portions 790 are formed to a certain height on the first substrate 710. The second region portions 795 serving as the micro lens for enhancing the reflection efficiency are surrounded by the first region portions 790 consisting of the first grooves 790a and the second grooves 790b together with a boundary of a unit pixel. In other words, one of the second region portions 795 positioned at the center potion of a unit pixel region is defined by first two grooves 790a adjacent to each other and second two grooves 790b. The second region portions 795 adjacent to the boundary of the unit pixel region are defined by two first grooves 790a adjacent to each other, one of the second grooves 790b and a part of the boundary of the unit pixel.

Due to the directionality of the first region portions 790 thus formed, the protruded portions of the second region portions 795 are oriented along the first direction of the horizontal direction of a unit pixel and the second direction of the vertical direction of the unit pixel. Accordingly, LCDs in accordance with the present embodiment are applicable to displays that request high reflectivity along a specific direction.

The plurality of protruded portions composing the second region portions 795 have a variety of shapes such as an ellipse shape 795a, a waxing crescent moon or a waning moon shape 795b, a sectional shape 795c of a concave lens, a track shape 795d, a hemitrack shape 795e, etc. Also, although the protruded portions of the second region portions 795 may have the same shape, they have different sizes.

Each of the first and second grooves 790a and 790b in the first region portions 790 has a width range of approximately 2–5 μm. The protruded portions of the second region portions 795 have various sizes within a range of approximately 4–20 μm. An interval between the center lines of the first grooves 790a formed parallel to each other along the horizontal direction is set in a range of 5–20 μm and approximately 8.5 μm in an average. An interval between the ridges of the protruded portions of the second region portions 795 is set in a range of 12–22 μm, approximately 17 μm in an average. Thus, shapes and sizes of the protruded portions of the second region portions 795 change variously, minimizing the interference of light reflected by the reflective electrode.

Figure 17B:
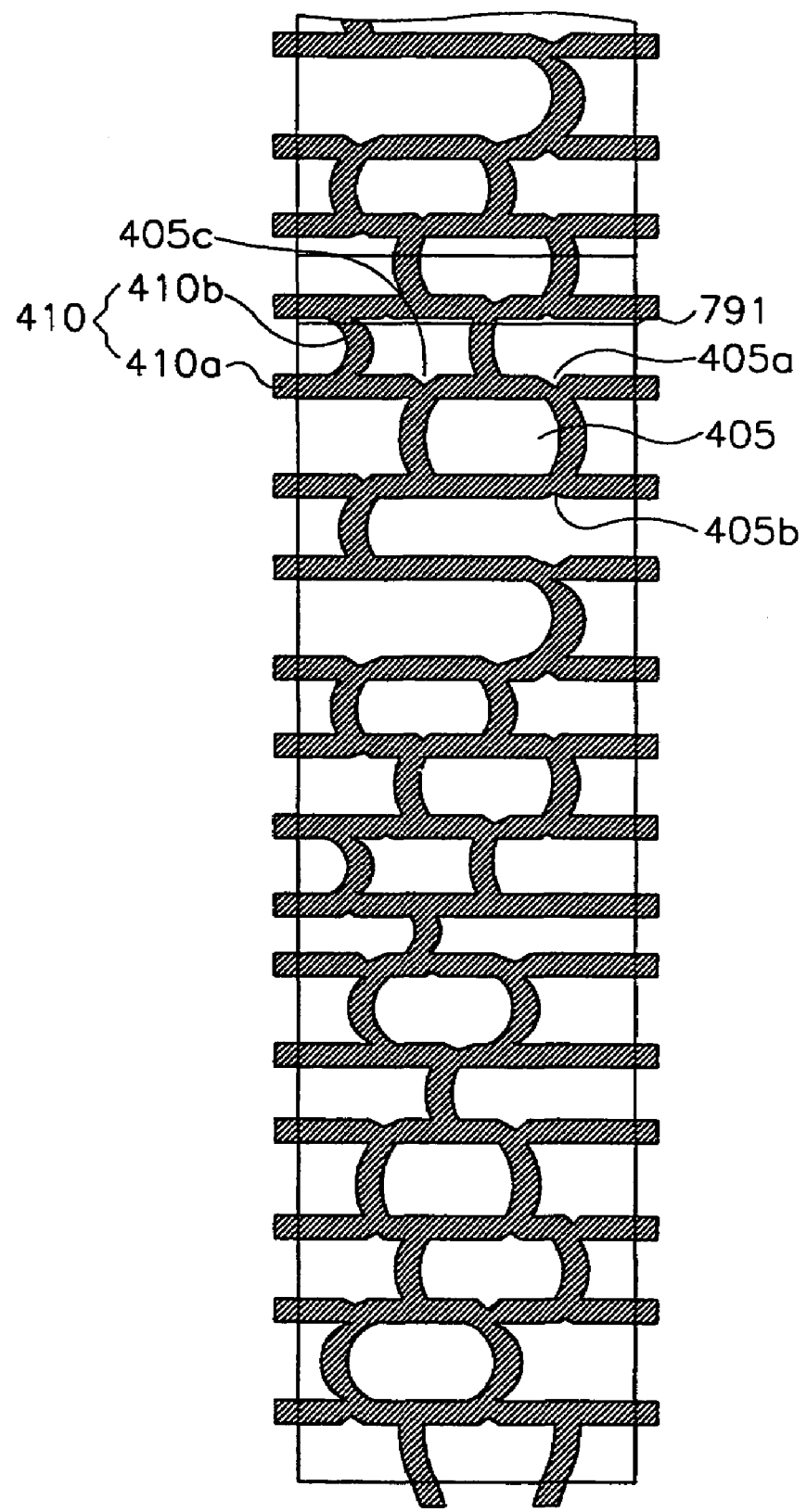

The mask pattern shown in FIG. 17B is similar to that of FIG. 17A except that a groove filling protrusion pattern for forming the first region portions having a uniform depth is formed at a cross point (connection point) of the first region portions in the reflective electrode pattern. Also, the mask pattern shown in FIG. 17B is similar to that of FIG. 9 except that a pattern for forming the second region portions extends to an outer region placed between pixels beyond a boundary line 791 of a unit pixel.

A reflective electrode formed by using the mask pattern shown in FIG. 17B, has a plurality of first region portions 410 and a plurality of second region portions 405. The first region portions 410 has a plurality of first grooves 410a formed parallel to each other along the horizontal direction of the pixel and a plurality of second grooves 410b formed discontinuously along the vertical direction of the pixel. The second region portions 405 has a plurality of protruded portions 405a, 405b and 405c surrounded by the first region portions 410 together with the boundary line 791 of the pixel. The protruded portions 405a, 405b, 405c composing the second region portions 405 are defined by a plurality of first and second grooves 410a, 410b formed along the horizontal and vertical direction and thus have an islands shape. Groove filling protrusions 406 are formed at the selected respective protruded portions 405a, 405b and 405c.

These groove filling protrusions 406 allow recesses to have a constant depth, in which the recesses are formed at the organic insulating film in the processes of exposing and developing the organic insulating film so as to form the reflective electrode 400. In other words, since the line width of the patterns at the crossing points where the horizontally arranged first grooves 410a meet with the vertically arranged second grooves 410b becomes relatively larger than that of the patterns at other portions, the crossing point portion is etched relatively deeper than other portions under the same exposure condition and a planar profile may be obtained unlike the form formed in the mask pattern. Accordingly, by forming the groove filling groove 406 together with the mask pattern during forming the mask pattern, an overetch of the organic insulating film at the crossing points with respect to other portions is prevented to a certain degree, so that grooves having the same depth may be formed at the upper surface of the organic insulating film 370. In other words, the first region portions may be formed so as to have the same depth.

Figure 17C:
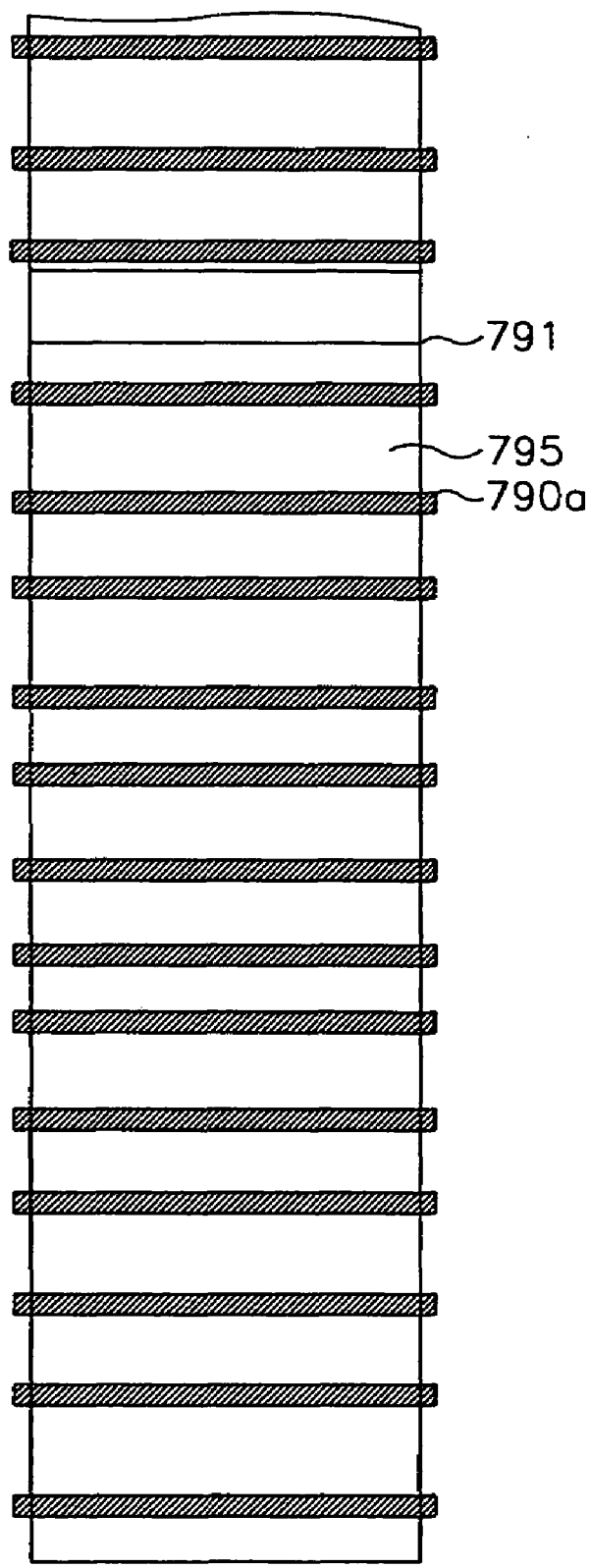
Figure 17D:
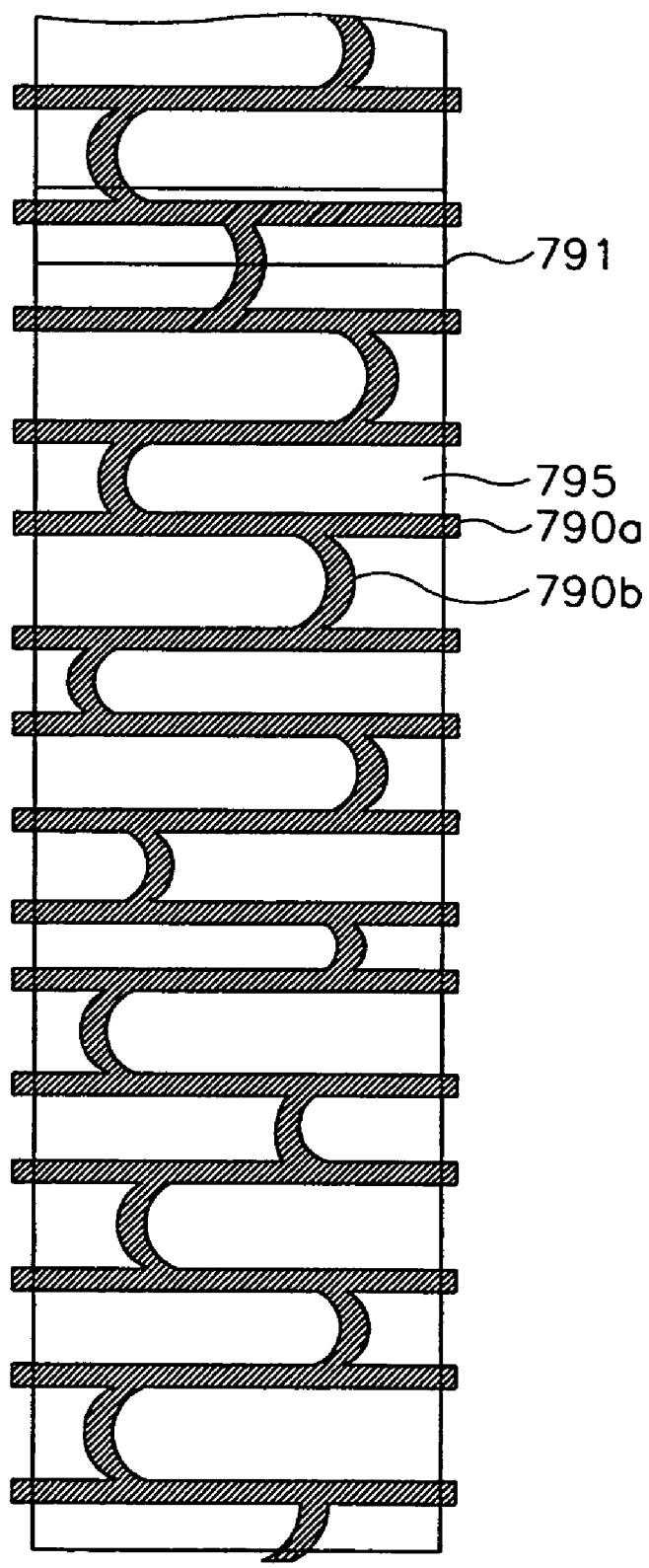
Figure 17E:
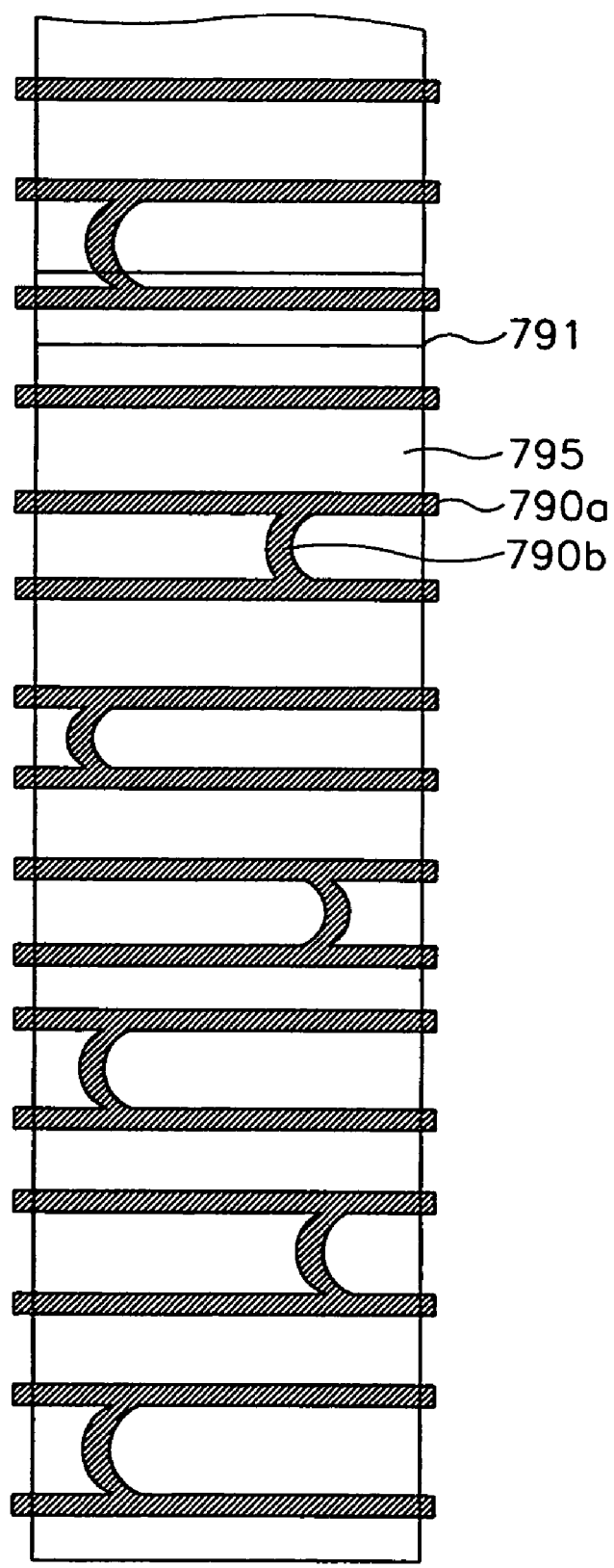

FIGS. 17C, 17D and 17E show mask patterns in accordance with another embodiments of the present invention. The mask pattern shown in FIG. 17C is similar to that of FIG. 17A except that there are not formed vertically arranged patterns for forming the second grooves 790b of the first region portions 790 at the pattern of the reflective electrode. Also, the mask pattern shown in FIG. 17D is similar to that of FIG. 17A except that one vertically arranged pattern for forming the second grooves 790b of the first region portions 790 at the pattern of the reflective electrode is formed between the first grooves of the first region portions adjacent to each other per one pixel. The mask pattern shown in FIG. 17E is similar to that of FIG. 17A except that 0.5 of vertically arranged pattern for forming the second grooves 790b of the first region portions 790 at the pattern of the reflective electrode is formed between the first grooves of the first region portions adjacent to each other per pixel.

According to the aforementioned embodiment, when forming an organic insulating film prior to forming a reflective electrode, a groove is formed at an outer region of a pixel placed between pixels in the same manner as in the pixel region. As a result, there is not formed a height difference between the pixel region and the outer region of the pixel region. Accordingly, light leakage induced residual images or distortion phenomenon in the liquid crystal orientation can be reduced. Further, after the spacers are dispersed, a uniform gap is maintained between the first substrate and the second substrate.

Furthermore, the LCD in accordance with the present invention is provided with a plurality of first grooves arranged continuously along the horizontal direction, a plurality of second grooves arranged discontinuously along the vertical direction and a reflective electrode of micro lenses defined and oriented by the first grooves and the second grooves, thereby having a reflection efficiency enhanced largely along a specific direction compared with the conventional reflection type LCD. Accordingly, the contrast and image quality are remarkably improved.

Reflectivity Measurements

Figure 18A:
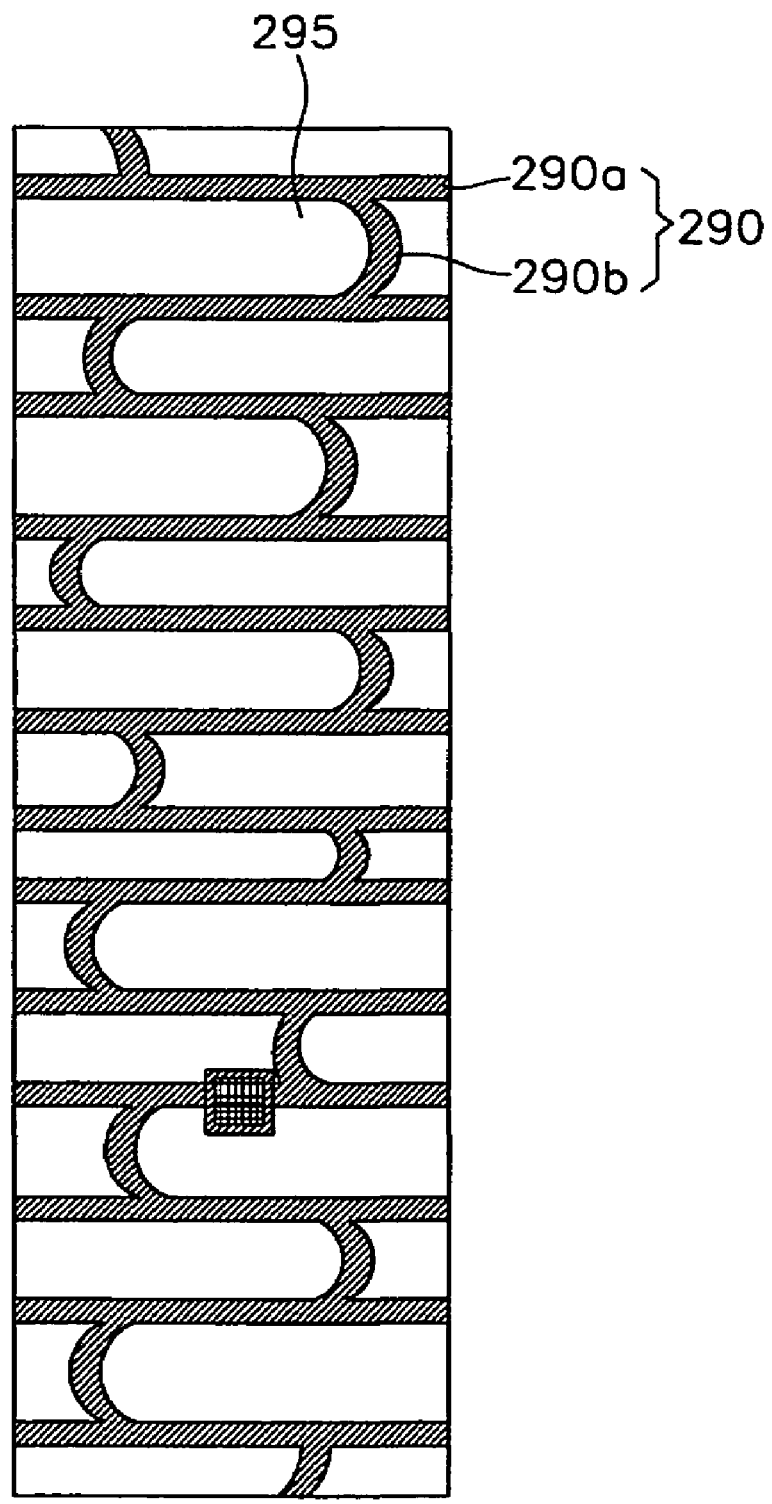
FIGS. 18A, 18B, and 18C are plan views of reflective electrodes (or mask patterns) corresponding to a unit pixel in order to form a reflective electrode in accordance with embodiments of the present invention.
Figure 18B:
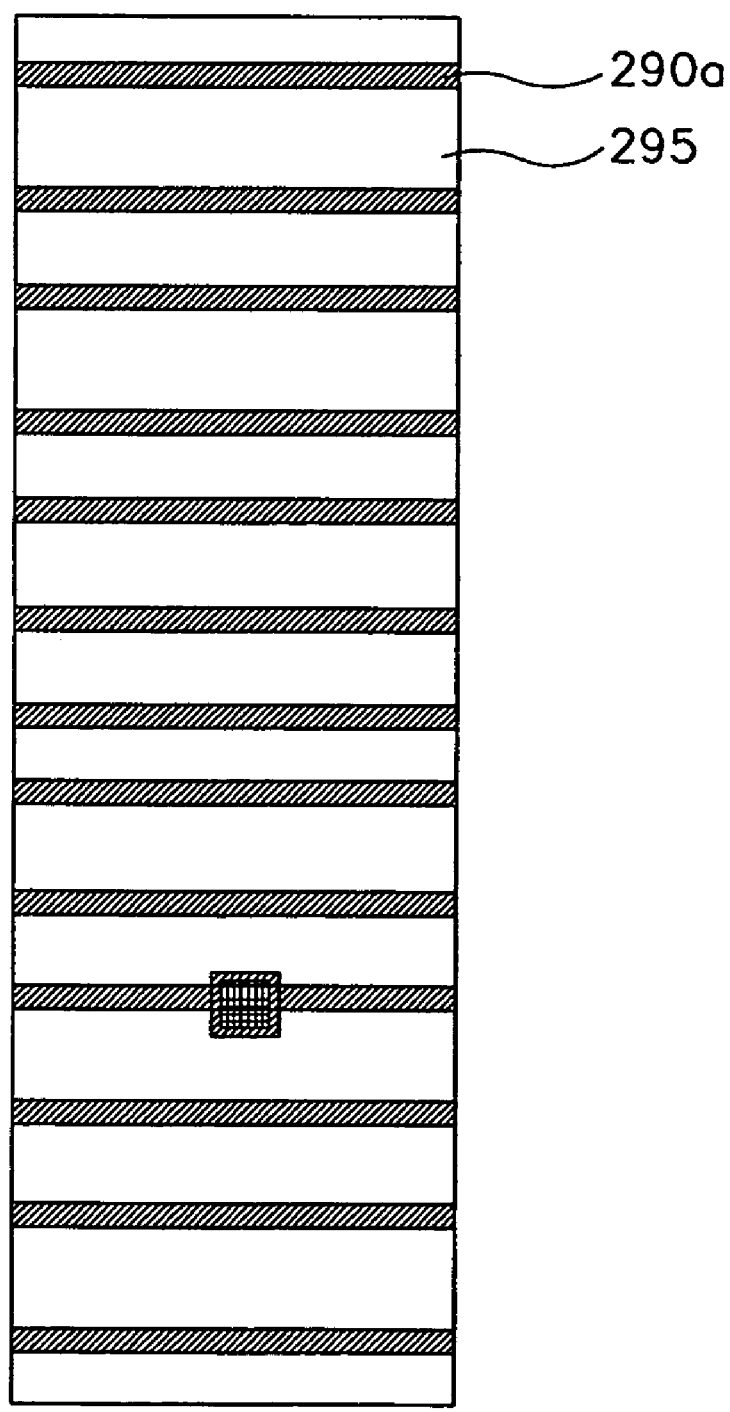
Figure 18C:
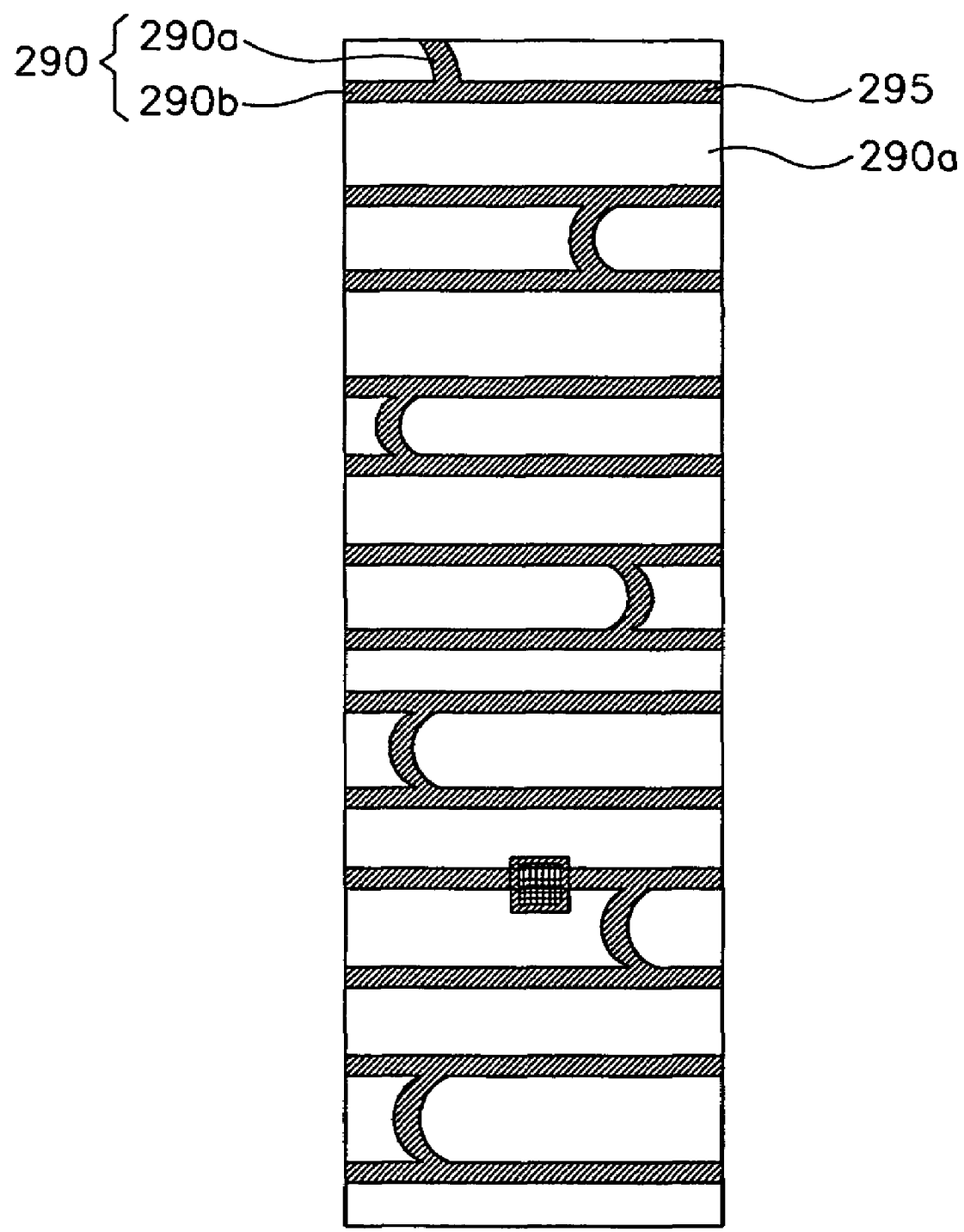

FIGS. 18A, 18B and 18C are plan views of reflective electrodes (or mask patterns) corresponding to a unit pixel in order to form a reflective electrode in accordance with embodiments of the present invention.

Using mask patterns shown in FIGS. 18A, 18B and 18C and FIG. 9, LCDs having a reflective electrode were manufactured in accordance with Embodiment 2.

FIG. 18A shows a mask pattern in which a single second groove is formed between first grooves extending along the horizontal direction, FIG. 18B shows a mask pattern in which only the first groove is formed and FIG. 18C shows a mask pattern in which 0.5 second groove per a horizontal length of a unit pixel is formed between first grooves.

The following Table 2 shows reflectivity values obtained using LCD panels including the reflective electrodes shown in FIGS. 18A, 18B and 18C and FIG. 9.

Upon measuring the reflectivity in the horizontal direction, light was incident with an inclination angle of 30 degrees in an upward direction and upon measuring the reflectivity in the vertical direction, the light was incident with an inclination angle of 30 degrees in left or right direction. At this time, resultant reflectivity was obtained from the following Equation 2.

$R$(Reflectivity)=(Measured reflectivity of an *LCD* panel/Reflectivity of standard reflection plate (BaSO4))×100  Eq. 2

Measured reflectivities from the front side are shown in the below Table 2.

TABLE 2

| Kind of mask | Reflectivity in vertical direction | | Reflectivity in horizontal direction | |
|---|---|---|---|---|
| | W/D reflectivity | C/R | W/D reflectivity | C/R |
| FIG. 18A | 78.5/2.81 | 27.93 | 12.1/0.55 | 22 |
| FIG. 18B | 232.8/11.4 | 20.42 | 0.35/0.17 | 2 |

TABLE 2-continued

| Kind of mask | Reflectivity in vertical direction | | Reflectivity in horizontal direction | |
|---|---|---|---|---|
| | W/D reflectivity | C/R | W/D reflectivity | C/R |
| FIG. 18C | 153/5.16 | 29.65 | 5.1/0.3 | 17 |
| FIG. 9 | 35.4/1.03 | 34.36 | 14/0.38 | 36.84 |

Note 1) W/D reflectivity represents white reflectivity/dark reflectivity. White reflectivity is a value measured in a state in which an LCD panel is not driven and dark reflectivity is a value measured in a state in which an LCD panel is driven.
Note 2) C/R represents contrast ratio.

Also, the reflectivity was measured varying a viewing angle from the front side to a vertical direction or a horizontal direction using the LCD panel including the reflective electrode shown in FIGS. 18A, 18B and 18C and FIG. 9.

Light was incident from a point with an inclination of 30 degrees upward from the front side of the panel and the reflectivity of the reflected light was measured with respect to angles varied up to an angle of 50 degrees upward or along the left direction from the front side. Final reflectivity was obtained from the above Equation 2.

Figure 19A:
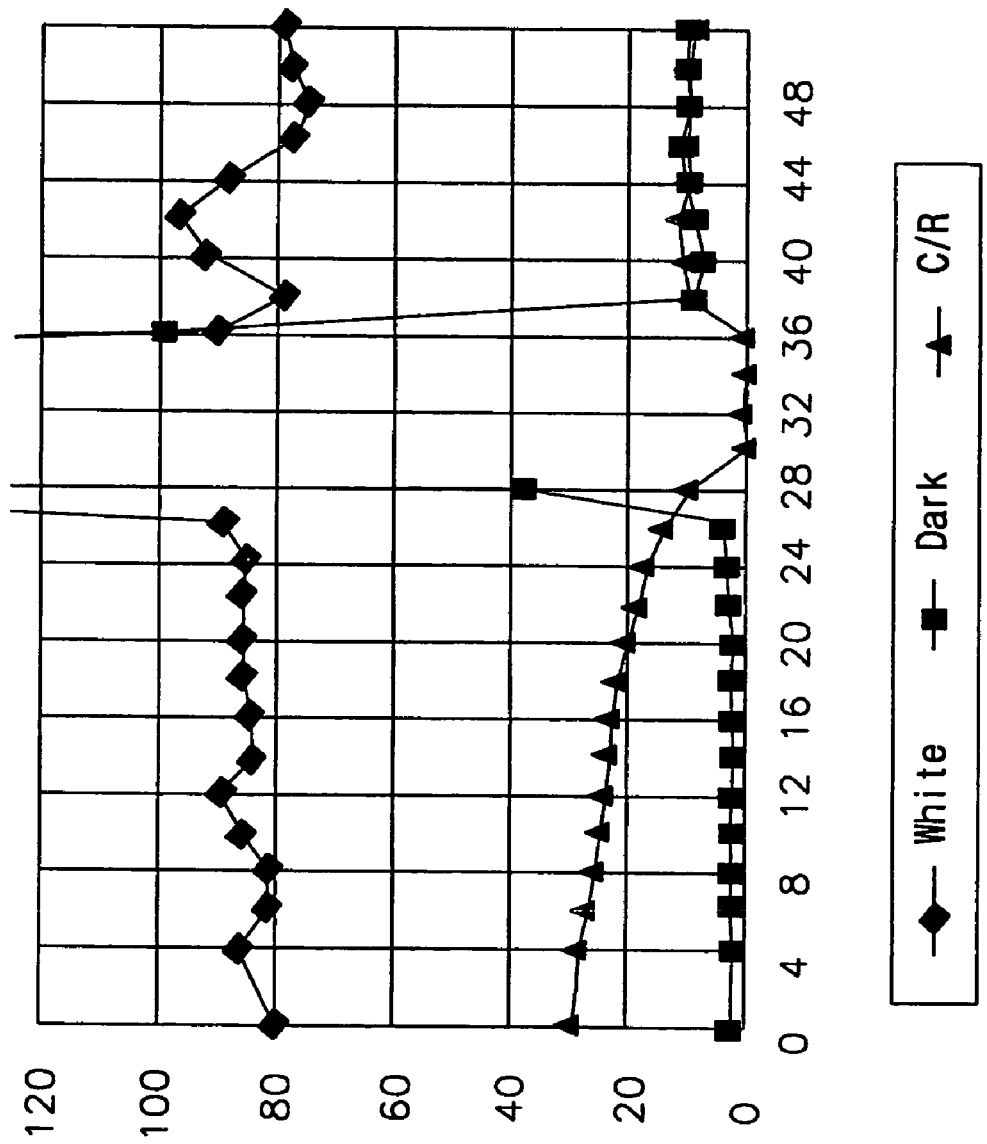

FIGS. 19A and 19B are graphs showing variations in the reflectivity which was measured by using an LCD having the reflective electrode shown in FIG. 18A. Particularly, FIG. 19A shows a variation in the reflectivity which was measured with varying the reflection angle upward from the front side of the LCD panel and FIG. 19B shows a variation in the reflectivity which was measured with varying the reflection angle along the left direction from the front side of the LCD panel.

Figure 20A:
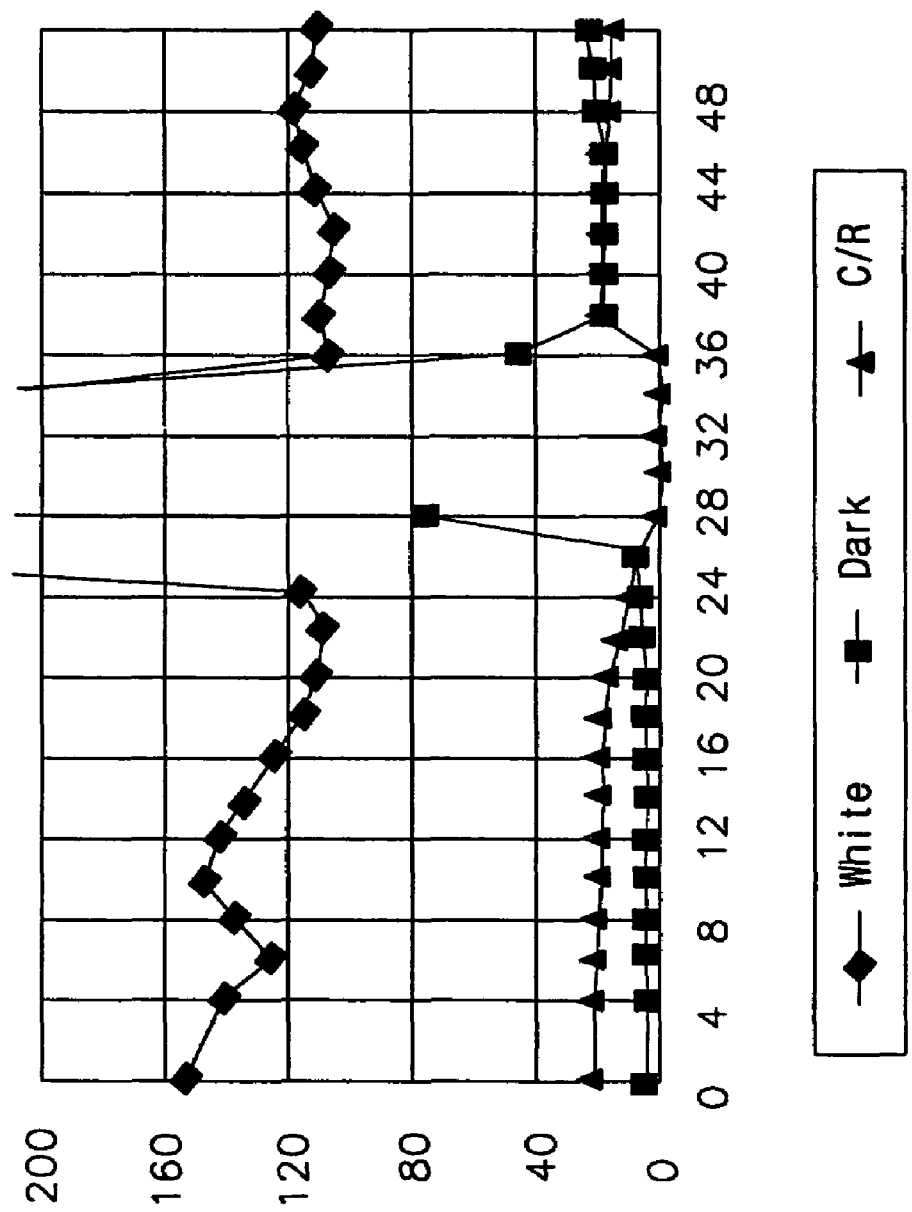

FIGS. 20A and 20B are graphs showing a variation in the reflectivity measured using an LCD having the reflective electrode shown in FIG. 18B. Particularly, FIG. 20A shows a variation in the reflectivity which was measured with varying the reflection angle upward from the front side of the LCD panel and FIG. 20B shows a variation in the reflectivity which was measured with varying the reflection angle along the left direction from the front side of the LCD panel.

Figure 21B:
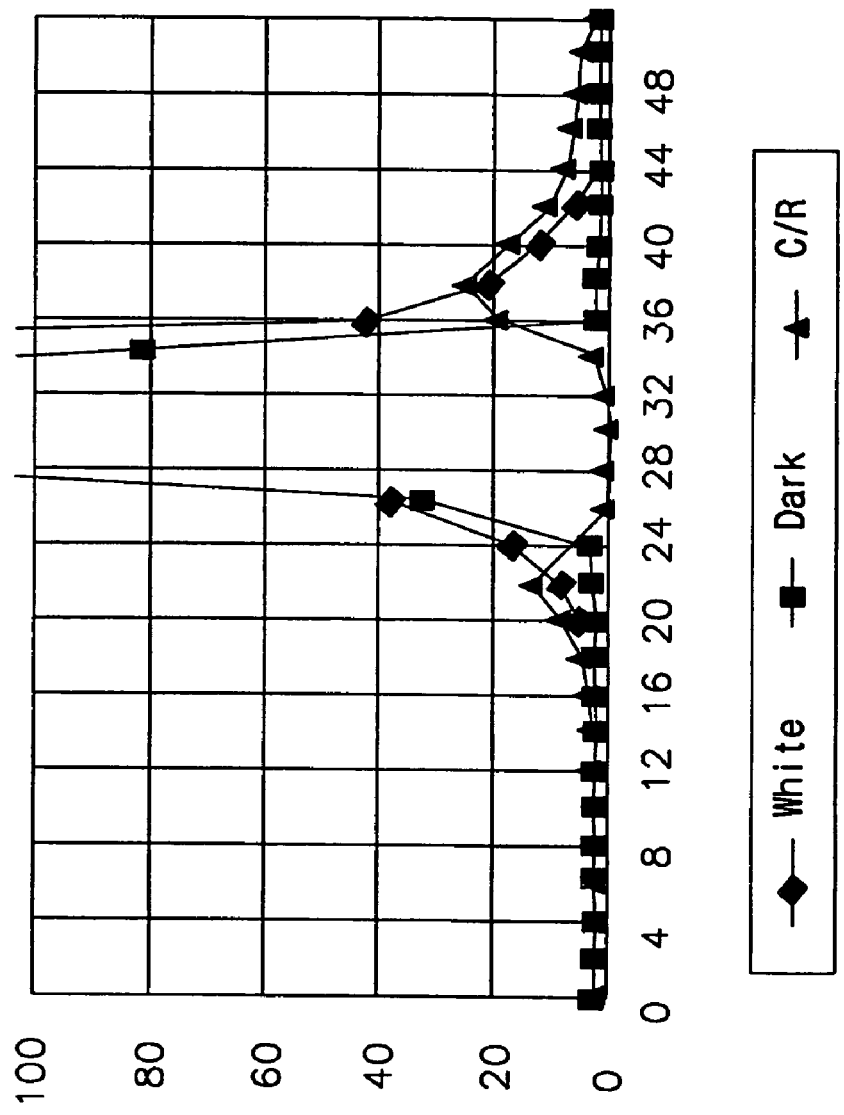

FIGS. 21A and 21B are graphs showing a variation in the reflectivity measured using an LCD having the reflective electrode shown in FIG. 18C. Particularly, FIG. 21A shows a variation in the reflectivity which was measured with varying the reflection angle upward from the front side of the LCD panel and FIG. 21B shows a variation in the reflectivity which was measured with varying the reflection angle along the left direction from the front side of the LCD panel.

Figure 22A:
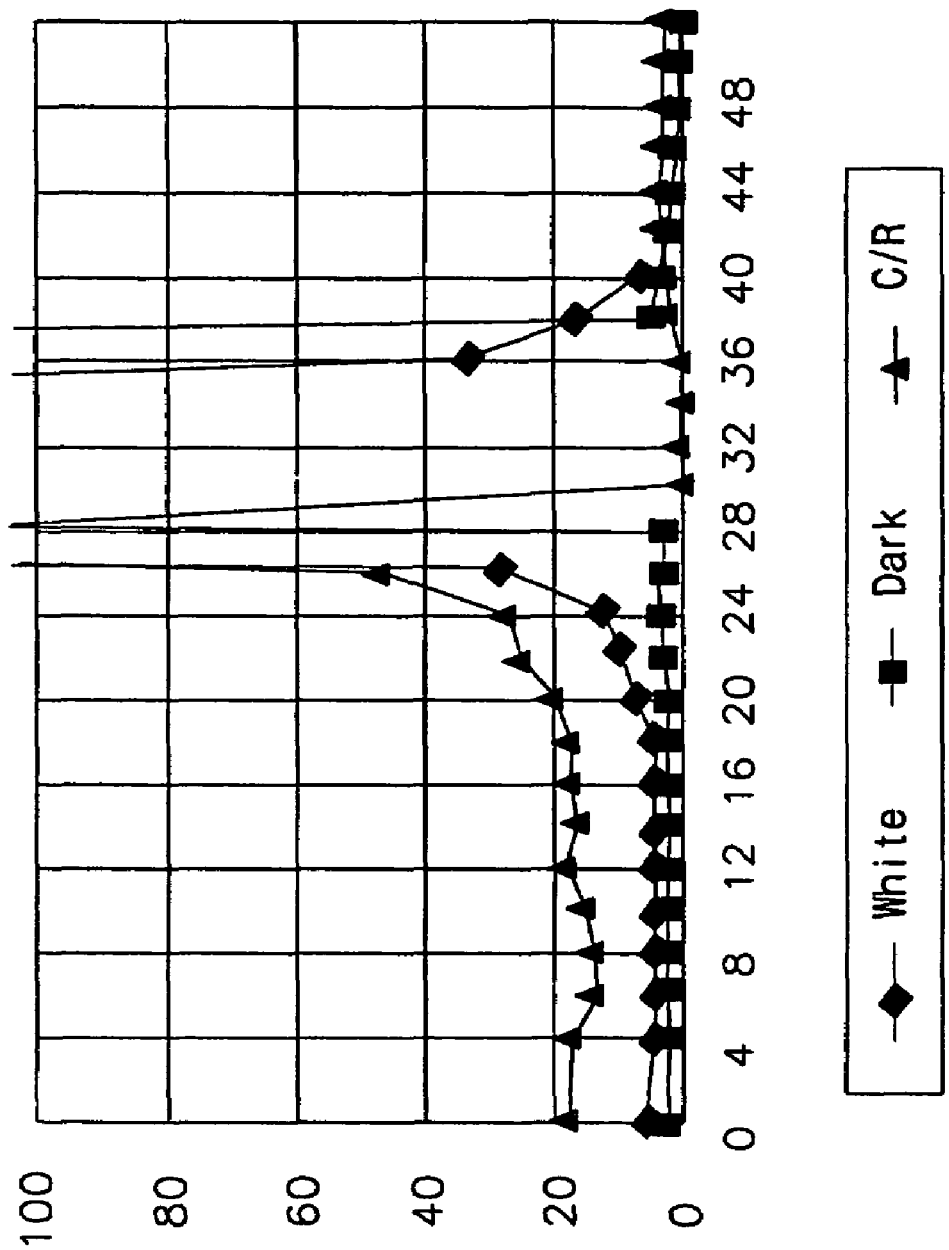
FIGS. 22A and 22B are graphs showing a variation in the reflectivity measured in a view angle using an LCD having the reflective electrode shown in FIG. 9.
Figure 22B:
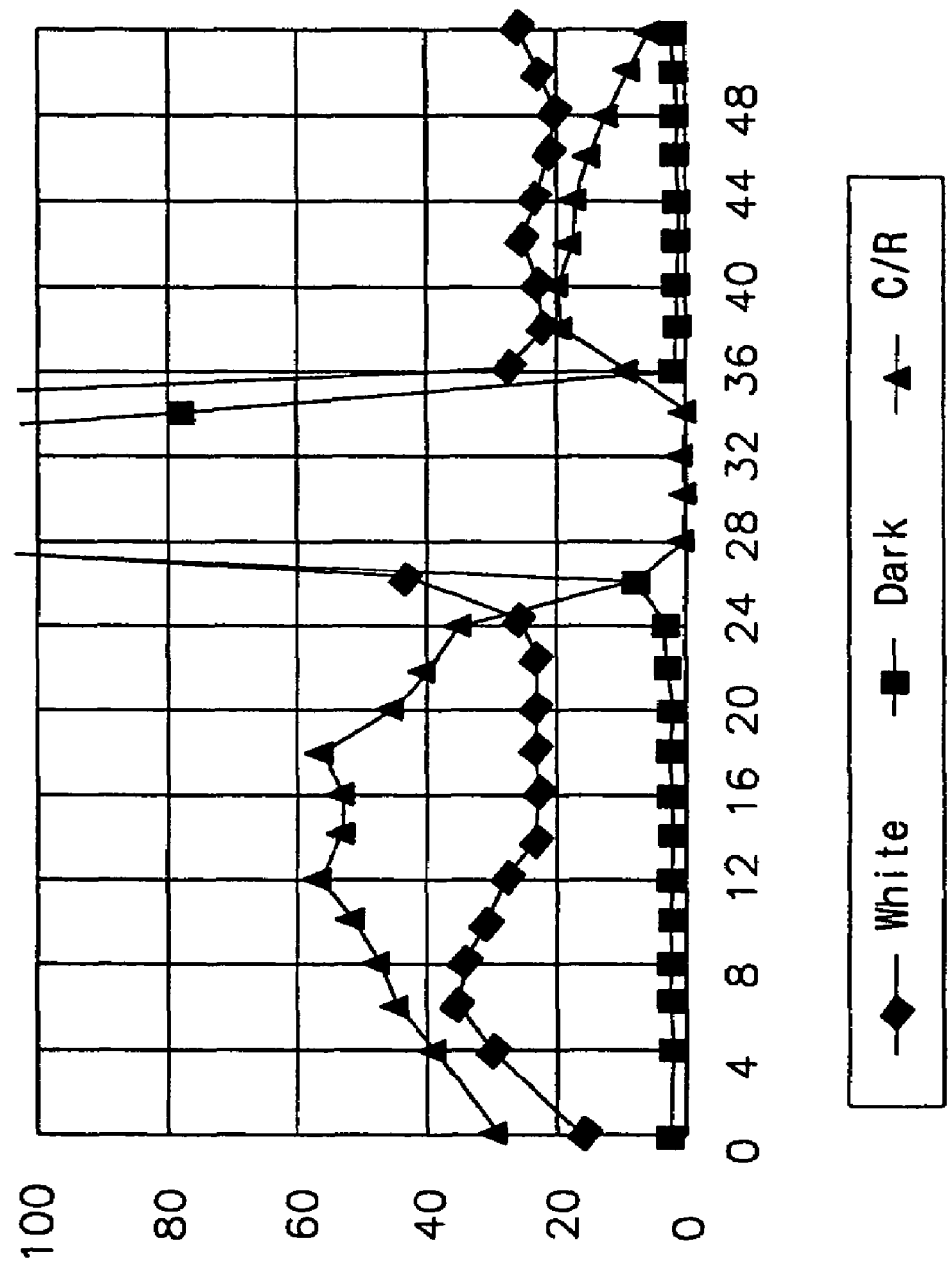

FIGS. 22A and 22B are graphs showing a variation in the reflectivity measured using an LCD having the reflective electrode shown in FIG. 9. Particularly, FIG. 22A shows a variation in the reflectivity which was measured with varying the reflection angle upward from the front side of the LCD panel and FIG. 20B shows a variation in the reflectivity which was measured with varying the reflection angle along the left direction from the front side of the LCD panel.

Through FIGS. 19A, 19B, 20A, 20B, 21A, 21B, 22A and 22B, the vertical axis represents measured reflectivity and horizontal axis represents an angle at the front side of the LCD panel. Also, the symbol ♦ means values measured in white state in which the LCD panel is not driven, ■ means values measured in dark state in which the LCD panel is driven and ▲ means contrast ratio.

As shown in Table 2 and the graphs in FIGS. 19A to 22B, the LCD panel having the reflective electrode in accordance with the present invention shows that the reflectivity in the vertical direction is higher than the reflectivity in the horizontal direction. Accordingly, when such the LCDs are applied to apparatus in which the reflectivity in the vertical direction is especially important, light efficiency can be enhanced.

In addition, when the second grooves are not formed as shown in FIG. 18B, the reflectivity in the vertical direction is too high, and the reflectivity in the horizontal direction is too low. Accordingly, it can be noted that the second grooves are preferably at least 0.5 per a unit pixel.

In case of hand-held terminals, it is proved that the reflectivity in the vertical direction to the reflectivity in the horizontal direction is preferably 2:1 to 3:1 and the contrast ratio is preferably 30:1 to 40:1.

As described above, the reflection type LCD in accordance with the present invention includes a plurality of first grooves arranged continuously along the horizontal direction, a plurality of second grooves arranged discontinuously along the vertical direction and a reflective electrode of directional micro lenses defined by the first grooves and the second grooves, thereby having an enhanced reflection efficiency with respect to a specific direction compared with the conventional reflection type LCD. Accordingly, the contrast and image quality may be improved remarkably.

Also, since the micro lenses are oriented along the horizontal or vertical direction of the pixel, it is suitable for electronic displays that need a high reflectivity in a specific direction.

In addition, since the groove filling member having a variety of shapes is formed at the crossing points of the grooves in the reflective electrode, the reflectivity of the reflective electrode may be improved more highly to largely improve the contrast and image quality.

Further, when forming the organic insulating film prior to forming the reflective electrode, the grooves are formed at an outer region between pixels in the same manner as in the inner region of the pixel. Thus, there does not occur a height difference between the pixel region and the outer region between pixels. Accordingly, the light leakage induced residual image or distortion phenomenon in orientation of liquid crystal may be reduced. Furthermore, a uniform gap between the first substrate and the second substrate even after dispersing the spacers may be obtained.

Although the aforementioned embodiments show and describe an example of an LCD having a reflective electrode, it is apparent that the reflective electrode of the present invention can be applied to electronic displays needing these reflective electrodes. In such a case, the light efficiency can be enhanced by controlling the reflectivity such that the reflectivity in the vertical direction differs from the reflectivity in the horizontal direction.

While the present invention has been described in detail, it should be understood that various changes, substitutions and alterations can be made hereto without departing from the spirit and scope of the invention as defined by the appended claims.

For example, in case of the backlight LCD, the concave-convex structure is not formed on the protective layer, and a transparent conductive material such as ITO and IZO is used as the reflective electrode and pad material.

What is claimed is:

1. A method for manufacturing a liquid crystal display apparatus, comprising the steps of:
   forming a pixel array on a first substrate;
   forming an organic insulating film on the resultant structure of the first substrate;
   forming a plurality of first grooves extending in a first direction and a plurality of second grooves connecting the first grooves that are adjacent to each other, the first grooves and the second grooves being formed at a surface portion of the organic insulating film;
   forming a reflective electrode corresponding to a shape of the surface portion of the organic insulating film on the organic insulating film;
   forming a second substrate facing the first substrate; and
   forming a liquid crystal layer between the first substrate and the second substrate,
   wherein the first and the second grooves are formed such that the reflective electrode has higher reflectivity in a second direction that is substantially perpendicular to the first direction.

2. The method of claim 1, wherein the organic insulating film is formed by a spin coating method to a thickness in a range of about 1 μm to about 3 μm.

3. The method of claim 2, wherein the first grooves and the second grooves are formed by exposing the organic insulating film using a mask having a mask pattern corresponding to the first grooves and the second grooves and developing the exposed organic insulating film.

4. The method of claim 3, wherein the mask pattern comprises a scattering recess pattern to form a scattering recess at a center portion of a region surrounded by the first and second grooves.

5. The method of claim 3, wherein the mask pattern comprises a groove filling pattern to have the grooves of the first regions formed uniform in depth at a crossed portion of the first regions.

6. The method of claim 3, wherein the step of forming the first region and the second region at the surface portion of the organic insulating film further comprises the steps of:
   positioning a first mask having a first pattern over the organic insulating film;
   full-exposing the organic insulating film using the first mask to form a contact hole for connecting the reflective electrode with the pixel array formed on the substrate;
   positioning a second mask having a second pattern over the organic insulating film; and
   lens-exposing the organic insulating film using the second mask to form the first regions and the second regions at the organic insulating film.

7. The method of claim 6, wherein the first pattern has a corresponding shape to the contact hole and the second pattern has a shape corresponding to the first regions or the second regions.

8. The method of claim 3, wherein the first grooves are parallel to each other and have a selected width along the first direction and the second grooves are arranged discontinuously along the second direction between the first grooves.

9. The method of claim 3, wherein the step of forming the first grooves and the second grooves further comprises the steps of:
   positioning a first mask having a first pattern over the organic insulating film;
   partial-exposing the organic insulating film using the first mask to partially form a contact hole for connecting the reflective electrode with the pixel array formed on the substrate;
   positioning a second mask having a second pattern over the organic insulating film; and lens-exposing the organic insulating film using the second mask to form the first grooves and the second grooves at the organic insulating film and to simultaneously complete the contact hole.

10. The method of claim 9, wherein the partial-exposing step is performed with an exposure amount obtained by subtracting a lens-exposure amount for performing the lens-exposing from a full exposure amount enabling to form the contact hole by one exposure process.

11. A method for manufacturing an electronic display device, comprising the steps of:

forming a pixel array on an insulating substrate; and forming a reflective means on the insulating substrate, the reflective means being connected to the pixel array and comprising a plurality of first grooves and a plurality of second grooves, the first grooves being extended in a first direction, such that the reflective means has higher reflectivity in a second direction that is substantially perpendicular to the first direction, and the second grooves connecting the first grooves that are adjacent to each other.

12. The method of claim 11, wherein the step of forming the reflective means is performed after a step of forming a resist film on the insulating substrate.

13. The method of claim 12, wherein the step of forming the resist film comprises the steps of:

positioning a first mask having a first pattern over the resist film;

full-exposing the resist film using a first mask to form a contact hole for connecting a switching means of the pixel array and the reflective means;

positioning a second mask having a second pattern over the resist film; and lens-exposing the photoresist film using the second mask to form regions having a same surface structure as the first regions and second regions at a surface portion of the resist film.

14. The method of claim 12, wherein the step of forming the resist film comprises the steps of:

positioning a first mask having a first pattern over the resist film;

partial-exposing the resist film using the first mask to form a contact hole for connecting a switching means of the pixel array and the reflective means;

positioning a second mask having a second pattern over the resist film; and lens-exposing the resist film using the second mask to form the first grooves and second grooves at a surface portion of the resist film and simultaneously completing the contact hole.

15. The method of claim 11, further comprising the steps of:

forming an organic insulating film on the insulating substrate;

exposing the organic insulating film using a mask having a mask pattern corresponding to the first grooves and the second grooves;

developing the exposed organic insulating film to form the first grooves and the second grooves; and forming the reflective means on the organic insulating film.

* * * * *